US012675795B2

(12) United States Patent (10) Patent No.: US 12,675,795 B2

Hammad et al. (45) Date of Patent: Jul. 7, 2026

(54) SECURE AUTHENTICATION SYSTEM AND METHOD

(71) Applicant: Visa International Service Association, San Francisco, CA (US)

(72) Inventors: Ayman Hammad, Pleasanton, CA (US); Patrick Faith, Pleasanton, CA (US); Krishna Prasad Koganti, Cupertino, CA (US); Ben Rewis, Oakland, CA (US); Brendan Xavier Louis, Tracy, CA (US); Kevin Weller, San Anselmo, CA (US); Benedicto Hernandez Dominguez, San Bruno, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/146,312

(22) Filed: Dec. 23, 2022

(65) Prior Publication Data

US 2023/0133210 A1 May 4, 2023

Related U.S. Application Data

(63) Continuation of application No. 16/024,323, filed on Jun. 29, 2018, now Pat. No. 11,574,312, which is a (Continued)

(51) Int. Cl.
G06Q 20/40 (2012.01)
G06F 21/34 (2013.01)
(Continued)

(52) U.S. Cl.
CPC ........... G06Q 20/409 (2013.01); G06F 21/34 (2013.01); G06Q 20/12 (2013.01);
(Continued)

(58) Field of Classification Search
CPC .. G06Q 20/409; G06Q 20/12; G06Q 20/3674; G06Q 20/3821; G06Q 20/385;
(Continued)

(56) References Cited

U.S. PATENT DOCUMENTS 593,611 A 11/1897 Scribner
5,280,527 A 1/1994 Gullman et al.
(Continued)

FOREIGN PATENT DOCUMENTS

AP 4807 A 5/2019
AU 2010246247 B2 3/2014
(Continued)

OTHER PUBLICATIONS 2.4.2 How VISA Card Verification Values are Used, 2.4.2 "z/OSV1 R3.0 ICSF Application Programmer's Guide" IBM Library Server, Available Online at: http://publibz.boulder.ibm.com/cgibin/bookmgr_OS390/BOOKS/CSFB4Z20/2.4.2?SHEL, 1997, 1 page.
(Continued)

*Primary Examiner* — John W Hayes

(74) *Attorney, Agent, or Firm* — Kilpatrick Townsend & Stockton LLP

(57) ABSTRACT

Apparatuses, methods, and systems pertaining to the verification of portable consumer devices for 3-D Secure Systems are disclosed. In one implementation, a verification token is coupled to a computer by a USB connection so as to use the computer's networking facilities. The verification token reads identification information from a user's portable consumer device (e.g., credit card) and sends the information to a validation entry over a communications network using the computer's networking facilities. The validation entity applies one or more validation tests to the information that it receives from the verification token. If a selected number of tests are passed, the validation entity sends a 3-D (Continued)

Secure datum to the verification token. The verification token may enter the 3-D Secure datum into a hidden field of a Purchase Authentication Page appearing on the computer's display.

20 Claims, 9 Drawing Sheets

Related U.S. Application Data continuation of application No. 15/690,150, filed on Aug. 29, 2017, now Pat. No. 10,043,186, which is a continuation of application No. 14/732,294, filed on Jun. 5, 2015, now Pat. No. 9,792,611, which is a continuation of application No. 13/107,715, filed on May 13, 2011, now Pat. No. 9,105,027, which is a continuation of application No. PCT/US2010/055500, filed on May 14, 2010, and a continuation-in-part of application No. 12/780,657, filed on May 14, 2010, now Pat. No. 9,038,886, which is a continuation-in-part of application No. 12/712,148, filed on Feb. 24, 2010, now Pat. No. 7,891,560.

(60) Provisional application No. 61/258,194, filed on Nov. 4, 2009, provisional application No. 61/178,636, filed on May 15, 2009.

(51) Int. Cl.

| | |
|---|---|
| *G06Q 20/12* | (2012.01) |
| *G06Q 20/36* | (2012.01) |
| *G06Q 20/38* | (2012.01) |
| *G06Q 20/42* | (2012.01) |
| *G06Q 30/06* | (2023.01) |
| *H04L 9/08* | (2006.01) |
| *H04L 9/32* | (2006.01) |
| *H04L 9/40* | (2022.01) |

(52) U.S. Cl.
CPC ..... *G06Q 20/3674* (2013.01); *G06Q 20/3821* (2013.01); *G06Q 20/385* (2013.01); *G06Q 20/40* (2013.01); *G06Q 20/42* (2013.01); *G06Q 20/425* (2013.01); *G06Q 30/06* (2013.01); *H04L 9/0866* (2013.01); *H04L 9/321* (2013.01); *H04L 9/3234* (2013.01); *H04L 9/3273* (2013.01); *H04L 63/0853* (2013.01); *G06F 2221/2129* (2013.01); *G06Q 2220/00* (2013.01); *H04L 63/126* (2013.01); *H04L 2209/56* (2013.01)

(58) Field of Classification Search
CPC ...... G06Q 20/40; G06Q 20/42; G06Q 20/425; G06Q 30/06; G06Q 2220/00; G06F 21/34; G06F 2221/2129; H04L 9/0866; H04L 9/321; H04L 9/3234; H04L 9/3273; H04L 63/0853; H04L 63/126; H04L 2209/56
See application file for complete search history.

(56) References Cited

U.S. PATENT DOCUMENTS

| | | |
|---|---|---|
| 5,336,870 A | 8/1994 | Hughes et al. |
| 5,365,586 A | 11/1994 | Indeck et al. |
| 5,450,537 A | 9/1995 | Hirai et al. |
| 5,477,040 A | 12/1995 | Lalonde |
| 5,550,561 A | 8/1996 | Ziarno |
| 5,613,012 A | 3/1997 | Hoffman et al. |
| 5,625,669 A | 4/1997 | McGregor et al. |
| 5,640,577 A | 6/1997 | Scharmer |
| 5,696,824 A | 12/1997 | Walsh |
| 5,729,591 A | 3/1998 | Bailey |
| 5,742,845 A | 4/1998 | Wagner |
| 5,781,438 A | 7/1998 | Lee et al. |
| 5,794,259 A | 8/1998 | Kikinis |
| 5,883,810 A | 3/1999 | Franklin et al. |
| 5,930,767 A | 7/1999 | Reber et al. |
| 5,953,710 A | 9/1999 | Fleming |
| 5,956,699 A | 9/1999 | Wong et al. |
| 5,974,430 A | 10/1999 | Mutschler, III et al. |
| 6,000,832 A | 12/1999 | Franklin et al. |
| 6,014,635 A | 1/2000 | Harris et al. |
| 6,032,859 A | 3/2000 | Muehlberger et al. |
| 6,044,349 A | 3/2000 | Tolopka et al. |
| 6,044,360 A | 3/2000 | Picciallo |
| 6,055,592 A | 4/2000 | Smith |
| 6,067,621 A | 5/2000 | Yu et al. |
| 6,163,771 A | 12/2000 | Walker et al. |
| 6,227,447 B1 | 5/2001 | Campisano |
| 6,234,389 B1 | 5/2001 | Valliani et al. |
| 6,236,981 B1 | 5/2001 | Hill |
| 6,253,328 B1 | 6/2001 | Smith, Jr. |
| 6,267,292 B1 | 7/2001 | Walker et al. |
| 6,299,062 B1 | 10/2001 | Hwang |
| 6,327,578 B1 | 12/2001 | Linehan |
| 6,341,724 B2 | 1/2002 | Campisano |
| 6,354,496 B1 | 3/2002 | Murphy et al. |
| 6,385,596 B1 | 5/2002 | Wiser et al. |
| 6,421,729 B1 | 7/2002 | Paltenghe et al. |
| 6,422,462 B1 | 7/2002 | Cohen |
| 6,425,523 B1 | 7/2002 | Shem-Ur et al. |
| 6,449,347 B1 | 9/2002 | Ple et al. |
| 6,453,301 B1 | 9/2002 | Niwa |
| 6,490,601 B1 | 12/2002 | Markus et al. |
| 6,499,042 B1 | 12/2002 | Markus |
| 6,560,709 B1 | 5/2003 | Galovich |
| 6,571,339 B1 | 5/2003 | Danneels et al. |
| 6,592,044 B1 | 7/2003 | Wong et al. |
| 6,636,833 B1 | 10/2003 | Flitcroft et al. |
| 6,685,095 B2 | 2/2004 | Roustaei et al. |
| 6,738,749 B1 | 5/2004 | Chasko |
| 6,748,367 B1 | 6/2004 | Lee |
| 6,805,287 B2 | 10/2004 | Bishop et al. |
| 6,850,996 B2 | 2/2005 | Wagner |
| 6,873,974 B1 | 3/2005 | Schutzer |
| 6,879,965 B2 | 4/2005 | Fung et al. |
| 6,891,953 B1 | 5/2005 | DeMello et al. |
| 6,901,387 B2 | 5/2005 | Wells et al. |
| 6,907,476 B2 | 6/2005 | Wagner |
| 6,931,382 B2 | 8/2005 | Laage et al. |
| 6,938,019 B1 | 8/2005 | Uzo |
| 6,941,285 B2 | 9/2005 | Sarcanin |
| 6,947,908 B1 | 9/2005 | Slater |
| 6,980,670 B1 | 12/2005 | Hoffman et al. |
| 6,983,882 B2 | 1/2006 | Cassone |
| 6,990,470 B2 | 1/2006 | Hogan et al. |
| 6,991,157 B2 | 1/2006 | Bishop et al. |
| 6,993,658 B1 | 1/2006 | Engberg et al. |
| 7,007,840 B2 | 3/2006 | Davis |
| 7,051,929 B2 | 5/2006 | Li |
| 7,062,706 B2 | 6/2006 | Maxwell et al. |
| 7,069,249 B2 | 6/2006 | Stolfo et al. |
| 7,080,048 B1 | 7/2006 | Sines et al. |
| 7,103,576 B2 | 9/2006 | Mann, III et al. |
| 7,111,324 B2 | 9/2006 | Elteto et al. |
| 7,113,930 B2 | 9/2006 | Eccles et al. |
| 7,136,835 B1 | 11/2006 | Flitcroft et al. |
| 7,159,180 B2 | 1/2007 | Ward |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,210,169 B2 | 4/2007 | Smith et al. |
| 7,216,292 B1 | 5/2007 | Snapper et al. |
| 7,231,045 B1 | 6/2007 | Parrott |
| 7,254,560 B2 | 8/2007 | Singhal |
| 7,254,569 B2 | 8/2007 | Goodman et al. |
| 7,257,581 B1 | 8/2007 | Steele et al. |

(56) References Cited

U.S. PATENT DOCUMENTS

| | | | |
|---|---|---|---|
| 7,264,154 B2 | 9/2007 | Harris | |
| 7,275,263 B2 | 9/2007 | Bajikar et al. | |
| 7,275,685 B2 | 10/2007 | Gray et al. | |
| 7,287,692 B1 * | 10/2007 | Patel | G06Q 20/10 |
| | | | 705/64 |
| 7,292,999 B2 | 11/2007 | Hobson et al. | |
| 7,334,184 B1 | 2/2008 | Simons | |
| 7,343,351 B1 | 3/2008 | Bishop et al. | |
| 7,346,587 B2 | 3/2008 | Goldstein et al. | |
| 7,347,361 B2 | 3/2008 | Lovett | |
| 7,350,139 B1 | 3/2008 | Simons | |
| 7,350,230 B2 | 3/2008 | Forrest | |
| 7,353,382 B2 | 4/2008 | Labrou et al. | |
| 7,356,706 B2 | 4/2008 | Scheurich | |
| 7,366,703 B2 | 4/2008 | Gray et al. | |
| 7,379,919 B2 | 5/2008 | Hogan et al. | |
| RE40,444 E | 7/2008 | Linehan | |
| 7,412,420 B2 | 8/2008 | Holdsworth | |
| 7,412,422 B2 | 8/2008 | Shiloh | |
| 7,415,443 B2 | 8/2008 | Hobson et al. | |
| 7,427,033 B1 | 9/2008 | Roskind | |
| 7,430,540 B1 | 9/2008 | Asani | |
| 7,431,202 B1 | 10/2008 | Meador et al. | |
| 7,437,575 B2 | 10/2008 | Dennis et al. | |
| 7,437,757 B2 | 10/2008 | Holdsworth | |
| 7,444,676 B1 | 10/2008 | Asghari-Kamrani et al. | |
| 7,469,151 B2 | 12/2008 | Khan et al. | |
| 7,483,845 B2 | 1/2009 | Vetelainen | |
| 7,512,975 B2 | 3/2009 | Aissi | |
| 7,523,859 B2 | 4/2009 | Patel et al. | |
| 7,533,063 B2 | 5/2009 | Kianian | |
| 7,533,828 B2 | 5/2009 | Ong | |
| 7,543,738 B1 | 6/2009 | Saunders et al. | |
| 7,548,889 B2 | 6/2009 | Bhambri et al. | |
| 7,567,934 B2 | 7/2009 | Flitcroft et al. | |
| 7,567,936 B1 | 7/2009 | Peckover et al. | |
| 7,568,631 B2 | 8/2009 | Gibbs et al. | |
| 7,571,139 B1 | 8/2009 | Giordano et al. | |
| 7,571,142 B1 | 8/2009 | Flitcroft et al. | |
| 7,580,898 B2 | 8/2009 | Brown et al. | |
| 7,584,153 B2 | 9/2009 | Brown et al. | |
| 7,593,896 B1 | 9/2009 | Flitcroft et al. | |
| 7,599,863 B2 | 10/2009 | Sines et al. | |
| 7,606,560 B2 | 10/2009 | Labrou et al. | |
| 7,627,531 B2 | 12/2009 | Breck et al. | |
| 7,627,895 B2 | 12/2009 | Gifford et al. | |
| 7,635,084 B2 * | 12/2009 | Wang | G06Q 20/3674 |
| | | | 235/375 |
| 7,650,314 B1 | 1/2010 | Saunders | |
| 7,660,779 B2 | 2/2010 | Goodman et al. | |
| 7,664,699 B1 | 2/2010 | Powell | |
| 7,685,037 B2 | 3/2010 | Reiners et al. | |
| 7,694,130 B1 | 4/2010 | Martinez | |
| 7,702,578 B2 | 4/2010 | Fung et al. | |
| 7,707,120 B2 | 4/2010 | Dominguez et al. | |
| 7,712,655 B2 | 5/2010 | Wong | |
| 7,716,596 B2 | 5/2010 | Cao et al. | |
| 7,734,527 B2 | 6/2010 | Uzo | |
| 7,753,265 B2 | 7/2010 | Harris | |
| 7,757,953 B2 | 7/2010 | Hart et al. | |
| 7,761,374 B2 | 7/2010 | Sahota et al. | |
| 7,770,789 B2 * | 8/2010 | Oder, II | G06Q 20/40 |
| | | | 705/64 |
| 7,784,685 B1 | 8/2010 | Hopkins, III | |
| 7,793,851 B2 * | 9/2010 | Mullen | G06K 19/07703 |
| | | | 235/383 |
| 7,801,826 B2 | 9/2010 | Labrou et al. | |
| 7,805,376 B2 * | 9/2010 | Smith | G06Q 20/382 |
| | | | 705/64 |
| 7,805,378 B2 | 9/2010 | Berardi et al. | |
| 7,818,264 B2 | 10/2010 | Hammad | |
| 7,827,115 B2 | 11/2010 | Weller et al. | |
| 7,828,220 B2 | 11/2010 | Mullen | |
| 7,835,960 B2 | 11/2010 | Breck et al. | |
| 7,841,523 B2 | 11/2010 | Il et al. | |
| 7,841,539 B2 | 11/2010 | Hewton | |
| 7,844,550 B2 | 11/2010 | Walker et al. | |
| 7,848,980 B2 * | 12/2010 | Carlson | G06Q 20/40 |
| | | | 705/35 |
| 7,849,014 B2 | 12/2010 | Erikson | |
| 7,849,020 B2 | 12/2010 | Johnson | |
| 7,853,529 B1 | 12/2010 | Walker et al. | |
| 7,853,995 B2 | 12/2010 | Chow et al. | |
| 7,865,414 B2 * | 1/2011 | Fung | G06Q 20/382 |
| | | | 705/26.1 |
| 7,873,579 B2 | 1/2011 | Hobson et al. | |
| 7,873,580 B2 | 1/2011 | Hobson et al. | |
| 7,890,393 B2 | 2/2011 | Talbert et al. | |
| 7,891,560 B2 | 2/2011 | Hammad | |
| 7,891,563 B2 * | 2/2011 | Oder, II | G06Q 20/382 |
| | | | 235/383 |
| 7,896,238 B2 | 3/2011 | Fein et al. | |
| 7,908,216 B1 | 3/2011 | Davis et al. | |
| 7,922,082 B2 | 4/2011 | Muscato | |
| 7,931,195 B2 | 4/2011 | Mullen | |
| 7,937,324 B2 | 5/2011 | Patterson | |
| 7,938,318 B2 | 5/2011 | Fein et al. | |
| 7,954,705 B2 | 6/2011 | Mullen | |
| 7,959,076 B1 | 6/2011 | Hopkins, III | |
| 7,966,257 B2 | 6/2011 | DiGioacchino | |
| 7,996,288 B1 | 8/2011 | Stolfo | |
| 8,025,223 B2 | 9/2011 | Saunders et al. | |
| 8,046,256 B2 | 10/2011 | Chien et al. | |
| 8,060,448 B2 | 11/2011 | Jones | |
| 8,060,449 B2 | 11/2011 | Zhu | |
| 8,074,877 B2 | 12/2011 | Mullen et al. | |
| 8,074,879 B2 | 12/2011 | Harris | |
| 8,082,210 B2 | 12/2011 | Hansen et al. | |
| 8,095,113 B2 | 1/2012 | Kean et al. | |
| 8,099,363 B1 * | 1/2012 | Kilchenstein, Jr. | G06Q 20/40 |
| | | | 705/35 |
| 8,104,679 B2 | 1/2012 | Brown | |
| RE43,157 E | 2/2012 | Bishop et al. | |
| 8,109,436 B1 | 2/2012 | Hopkins, III | |
| 8,121,942 B2 | 2/2012 | Carlson et al. | |
| 8,121,956 B2 | 2/2012 | Carlson et al. | |
| 8,126,449 B2 | 2/2012 | Beenau et al. | |
| 8,132,723 B2 | 3/2012 | Hogg et al. | |
| 8,171,525 B1 | 5/2012 | Pelly et al. | |
| 8,175,973 B2 | 5/2012 | Davis et al. | |
| 8,190,523 B2 | 5/2012 | Patterson | |
| 8,196,813 B2 | 6/2012 | Vadhri | |
| 8,205,791 B2 | 6/2012 | Randazza et al. | |
| 8,219,489 B2 | 7/2012 | Patterson | |
| 8,224,702 B2 | 7/2012 | Mengerink et al. | |
| 8,225,385 B2 | 7/2012 | Chow et al. | |
| 8,229,852 B2 | 7/2012 | Carlson | |
| 8,265,993 B2 | 9/2012 | Chien et al. | |
| 8,280,777 B2 | 10/2012 | Mengerink et al. | |
| 8,281,991 B2 | 10/2012 | Wentker et al. | |
| 8,313,022 B2 | 11/2012 | Hammad et al. | |
| 8,326,759 B2 | 12/2012 | Hammad | |
| 8,328,095 B2 | 12/2012 | Oder, II et al. | |
| 8,336,088 B2 | 12/2012 | Raj et al. | |
| 8,346,666 B2 | 1/2013 | Lindelsee et al. | |
| 8,376,225 B1 | 2/2013 | Hopkins, III | |
| 8,380,177 B2 | 2/2013 | Laracey | |
| 8,387,873 B2 | 3/2013 | Saunders et al. | |
| 8,401,539 B2 | 3/2013 | Beenau et al. | |
| 8,401,898 B2 | 3/2013 | Chien et al. | |
| 8,401,968 B1 * | 3/2013 | Schattauer | G06Q 30/06 |
| | | | 705/37 |
| 8,402,555 B2 | 3/2013 | Grecia | |
| 8,403,211 B2 | 3/2013 | Brooks et al. | |
| 8,412,623 B2 | 4/2013 | Moon et al. | |
| 8,412,837 B1 | 4/2013 | Emigh et al. | |
| 8,417,642 B2 | 4/2013 | Oren | |
| 8,433,116 B2 | 4/2013 | Butler et al. | |
| 8,447,699 B2 | 5/2013 | Batada et al. | |
| 8,453,223 B2 | 5/2013 | Svigals et al. | |
| 8,453,226 B2 | 5/2013 | Hammad | |
| 8,453,925 B2 | 6/2013 | Fisher et al. | |
| 8,458,487 B1 | 6/2013 | Palgon et al. | |

(56)  References Cited

U.S. PATENT DOCUMENTS

| | | | |
|---|---|---|---|
| 8,484,134 B2 | 7/2013 | Hobson et al. | |
| 8,485,437 B2 | 7/2013 | Mullen et al. | |
| 8,494,959 B2 | 7/2013 | Hathaway et al. | |
| 8,498,908 B2 | 7/2013 | Mengerink et al. | |
| 8,504,475 B2 | 8/2013 | Brand et al. | |
| 8,504,478 B2 | 8/2013 | Saunders et al. | |
| 8,510,816 B2 | 8/2013 | Quach et al. | |
| 8,528,067 B2 * | 9/2013 | Hurry | G06Q 20/355 |
| | | | 713/172 |
| 8,533,860 B1 | 9/2013 | Grecia | |
| 8,534,564 B2 | 9/2013 | Hammad | |
| 8,538,845 B2 | 9/2013 | Liberty | |
| 8,555,079 B2 | 10/2013 | Shablygin et al. | |
| 8,566,168 B1 | 10/2013 | Bierbaum et al. | |
| 8,567,670 B2 | 10/2013 | Stanfield et al. | |
| 8,571,939 B2 | 10/2013 | Lindsey et al. | |
| 8,577,336 B2 | 11/2013 | Mechaley, Jr. | |
| 8,577,803 B2 | 11/2013 | Chatterjee et al. | |
| 8,577,813 B2 | 11/2013 | Weiss | |
| 8,578,176 B2 | 11/2013 | Mattsson | |
| 8,583,494 B2 | 11/2013 | Fisher | |
| 8,584,251 B2 | 11/2013 | McGuire et al. | |
| 8,589,237 B2 | 11/2013 | Fisher | |
| 8,589,271 B2 | 11/2013 | Evans | |
| 8,589,291 B2 | 11/2013 | Carlson et al. | |
| 8,595,098 B2 | 11/2013 | Starai et al. | |
| 8,595,812 B2 | 11/2013 | Bomar et al. | |
| 8,595,850 B2 | 11/2013 | Spies et al. | |
| 8,602,293 B2 | 12/2013 | Hammad | |
| 8,606,638 B2 * | 12/2013 | Dragt | G06Q 20/204 |
| | | | 705/26.1 |
| 8,606,700 B2 | 12/2013 | Carlson et al. | |
| 8,606,720 B1 | 12/2013 | Baker et al. | |
| 8,615,468 B2 | 12/2013 | Varadarajan | |
| 8,620,754 B2 | 12/2013 | Fisher | |
| 8,635,157 B2 | 1/2014 | Smith et al. | |
| 8,646,059 B1 | 2/2014 | Von Behren et al. | |
| 8,651,374 B2 | 2/2014 | Brabson et al. | |
| 8,656,180 B2 | 2/2014 | Shablygin et al. | |
| 8,751,391 B2 | 6/2014 | Freund | |
| 8,751,642 B2 | 6/2014 | Vargas et al. | |
| 8,762,263 B2 | 6/2014 | Gauthier et al. | |
| 8,793,186 B2 | 7/2014 | Patterson | |
| 8,827,154 B2 | 9/2014 | Hammad | |
| 8,838,982 B2 | 9/2014 | Carlson et al. | |
| 8,856,539 B2 | 10/2014 | Weiss | |
| 8,887,308 B2 | 11/2014 | Grecia | |
| 8,893,967 B2 | 11/2014 | Hammad | |
| 9,038,886 B2 | 5/2015 | Hammad | |
| 9,065,643 B2 | 6/2015 | Hurry et al. | |
| 9,070,128 B1 | 6/2015 | Adams et al. | |
| 9,070,129 B2 | 6/2015 | Sheets et al. | |
| 9,100,826 B2 | 8/2015 | Weiss | |
| 9,105,027 B2 | 8/2015 | Hammad et al. | |
| 9,160,741 B2 | 10/2015 | Wentker et al. | |
| 9,229,964 B2 | 1/2016 | Stevelinck | |
| 9,245,267 B2 | 1/2016 | Singh | |
| 9,249,241 B2 | 2/2016 | Dai et al. | |
| 9,256,871 B2 | 2/2016 | Anderson et al. | |
| 9,280,765 B2 | 3/2016 | Hammad | |
| 9,317,848 B2 | 4/2016 | Hammad | |
| 9,372,971 B2 | 6/2016 | Hammad | |
| 9,424,413 B2 | 8/2016 | Hammad | |
| 9,530,137 B2 | 12/2016 | Weiss | |
| 9,582,801 B2 | 2/2017 | Hammad | |
| 9,589,268 B2 | 3/2017 | Hammad | |
| 9,646,303 B2 | 5/2017 | Karpenko et al. | |
| 9,680,942 B2 | 6/2017 | Dimmick | |
| 9,715,681 B2 | 7/2017 | Hammad | |
| 9,792,611 B2 | 10/2017 | Hammad et al. | |
| 9,904,919 B2 | 2/2018 | Hammad | |
| 10,009,177 B2 | 6/2018 | Hammad | |
| 10,043,186 B2 | 8/2018 | Hammad et al. | |
| 10,049,360 B2 | 8/2018 | Hammad | |
| 10,282,724 B2 | 5/2019 | Hammad | |
| 10,387,871 B2 | 8/2019 | Hammad | |
| 10,572,864 B2 | 2/2020 | Hammad | |
| 10,657,528 B2 | 5/2020 | Hammad | |
| 10,846,683 B2 | 11/2020 | Hammad | |
| 10,997,573 B2 | 5/2021 | Hammad | |
| 11,574,312 B2 | 2/2023 | Hammad et al. | |
| 11,995,633 B2 | 5/2024 | Hammad | |
| 2001/0029485 A1 | 10/2001 | Brody et al. | |
| 2001/0032182 A1 | 10/2001 | Kumar et al. | |
| 2001/0032192 A1 | 10/2001 | Putta et al. | |
| 2001/0034720 A1 | 10/2001 | Armes | |
| 2001/0042785 A1 | 11/2001 | Walker et al. | |
| 2001/0051924 A1 | 12/2001 | Uberti | |
| 2001/0054003 A1 | 12/2001 | Chien et al. | |
| 2001/0054148 A1 | 12/2001 | Hoornaert et al. | |
| 2002/0007320 A1 | 1/2002 | Hogan et al. | |
| 2002/0016749 A1 | 2/2002 | Borecki et al. | |
| 2002/0023054 A1 | 2/2002 | Gillespie | |
| 2002/0029193 A1 | 3/2002 | Ranjan et al. | |
| 2002/0035539 A1 * | 3/2002 | O'Connell | G06Q 20/04 |
| | | | 705/39 |
| 2002/0035548 A1 | 3/2002 | Hogan et al. | |
| 2002/0038286 A1 | 3/2002 | Koren et al. | |
| 2002/0044689 A1 | 4/2002 | Roustaei et al. | |
| 2002/0055909 A1 | 5/2002 | Fung et al. | |
| 2002/0059146 A1 | 5/2002 | Keech | |
| 2002/0073045 A1 | 6/2002 | Rubin et al. | |
| 2002/0077837 A1 | 6/2002 | Krueger et al. | |
| 2002/0091877 A1 | 7/2002 | Karidis | |
| 2002/0107791 A1 | 8/2002 | Nobrega et al. | |
| 2002/0111919 A1 * | 8/2002 | Weller | G06Q 20/12 |
| | | | 705/67 |
| 2002/0112171 A1 | 8/2002 | Ginter et al. | |
| 2002/0116341 A1 | 8/2002 | Hogan et al. | |
| 2002/0120584 A1 | 8/2002 | Hogan et al. | |
| 2002/0128977 A1 | 9/2002 | Nambiar et al. | |
| 2002/0133467 A1 | 9/2002 | Hobson et al. | |
| 2002/0147913 A1 | 10/2002 | Lun Yip | |
| 2002/0170960 A1 | 11/2002 | Ehrensvard et al. | |
| 2003/0028481 A1 | 2/2003 | Flitcroft et al. | |
| 2003/0038835 A1 | 2/2003 | DeFelice | |
| 2003/0057219 A1 | 3/2003 | Risolia | |
| 2003/0097561 A1 | 5/2003 | Wheeler et al. | |
| 2003/0115142 A1 | 6/2003 | Brickell et al. | |
| 2003/0126094 A1 | 7/2003 | Fisher et al. | |
| 2003/0130955 A1 | 7/2003 | Hawthorne | |
| 2003/0142855 A1 | 7/2003 | Kuo et al. | |
| 2003/0191709 A1 | 10/2003 | Elston et al. | |
| 2003/0191945 A1 | 10/2003 | Keech | |
| 2003/0200184 A1 * | 10/2003 | Dominguez | G06Q 20/425 |
| | | | 705/78 |
| 2003/0212642 A1 | 11/2003 | Weller et al. | |
| 2004/0010462 A1 | 1/2004 | Moon et al. | |
| 2004/0019564 A1 * | 1/2004 | Goldthwaite | G06Q 20/425 |
| | | | 705/44 |
| 2004/0039651 A1 | 2/2004 | Grunzig et al. | |
| 2004/0050928 A1 | 3/2004 | Bishop et al. | |
| 2004/0058705 A1 | 3/2004 | Morgan et al. | |
| 2004/0059682 A1 | 3/2004 | Hasumi et al. | |
| 2004/0093281 A1 | 5/2004 | Silverstein et al. | |
| 2004/0104268 A1 | 6/2004 | Bailey | |
| 2004/0127256 A1 * | 7/2004 | Goldthwaite | G06K 7/0073 |
| | | | 455/466 |
| 2004/0139008 A1 | 7/2004 | Mascavage, III | |
| 2004/0143532 A1 | 7/2004 | Lee | |
| 2004/0158532 A1 | 8/2004 | Breck et al. | |
| 2004/0188519 A1 | 9/2004 | Cassone | |
| 2004/0210449 A1 | 10/2004 | Breck et al. | |
| 2004/0210498 A1 | 10/2004 | Freund | |
| 2004/0210821 A1 | 10/2004 | Kasser | |
| 2004/0226999 A1 | 11/2004 | Ruat et al. | |
| 2004/0230489 A1 * | 11/2004 | Goldthwaite | G07F 7/082 |
| | | | 705/26.1 |
| 2004/0232225 A1 | 11/2004 | Bishop et al. | |
| 2004/0236632 A1 | 11/2004 | Maritzen et al. | |
| 2004/0242201 A1 * | 12/2004 | Sasakura | H04W 12/082 |
| | | | 455/410 |
| 2004/0248554 A1 | 12/2004 | Khan et al. | |
| 2004/0254890 A1 | 12/2004 | Sancho et al. | |

(56) References Cited

U.S. PATENT DOCUMENTS

| | | | |
|---|---|---|---|
| 2004/0260646 A1 | 12/2004 | Berardi et al. | |
| 2004/0267672 A1 | 12/2004 | Gray et al. | |
| 2005/0036611 A1* | 2/2005 | Seaton, Jr. | G06Q 20/4012 |
| | | | 380/44 |
| 2005/0037735 A1 | 2/2005 | Coutts | |
| 2005/0043997 A1 | 2/2005 | Sahota et al. | |
| 2005/0065875 A1 | 3/2005 | Beard | |
| 2005/0077349 A1 | 4/2005 | Bonalle et al. | |
| 2005/0080730 A1 | 4/2005 | Sorrentino | |
| 2005/0108178 A1 | 5/2005 | York | |
| 2005/0108569 A1 | 5/2005 | Bantz et al. | |
| 2005/0109838 A1 | 5/2005 | Linlor | |
| 2005/0127164 A1 | 6/2005 | Wankmueller | |
| 2005/0156026 A1 | 7/2005 | Ghosh et al. | |
| 2005/0187873 A1 | 8/2005 | Labrou et al. | |
| 2005/0199709 A1 | 9/2005 | Linlor | |
| 2005/0246293 A1 | 11/2005 | Ong | |
| 2005/0250538 A1 | 11/2005 | Narasimhan et al. | |
| 2005/0269401 A1 | 12/2005 | Spitzer et al. | |
| 2005/0269402 A1 | 12/2005 | Spitzer et al. | |
| 2005/0278461 A1 | 12/2005 | Ohta | |
| 2005/0289052 A1* | 12/2005 | Wankmueller | G06Q 20/102 |
| | | | 705/40 |
| 2006/0016879 A1 | 1/2006 | Kean | |
| 2006/0026098 A1 | 2/2006 | Peckover et al. | |
| 2006/0131390 A1 | 6/2006 | Kim | |
| 2006/0142058 A1 | 6/2006 | Elias et al. | |
| 2006/0168653 A1 | 7/2006 | Contrera | |
| 2006/0175396 A1 | 8/2006 | Call et al. | |
| 2006/0235795 A1 | 10/2006 | Johnson et al. | |
| 2006/0237528 A1 | 10/2006 | Bishop et al. | |
| 2006/0253389 A1 | 11/2006 | Hagale et al. | |
| 2006/0278704 A1 | 12/2006 | Saunders et al. | |
| 2006/0294023 A1 | 12/2006 | Lu | |
| 2006/0294095 A1 | 12/2006 | Berk et al. | |
| 2007/0005685 A1 | 1/2007 | Chau et al. | |
| 2007/0022058 A1 | 1/2007 | Labrou et al. | |
| 2007/0083444 A1 | 4/2007 | Matthews et al. | |
| 2007/0107044 A1 | 5/2007 | Yuen et al. | |
| 2007/0114274 A1 | 5/2007 | Gibbs et al. | |
| 2007/0118745 A1 | 5/2007 | Buer | |
| 2007/0129955 A1 | 6/2007 | Dalmia et al. | |
| 2007/0136193 A1 | 6/2007 | Starr | |
| 2007/0136211 A1* | 6/2007 | Brown | G06Q 20/385 |
| | | | 705/75 |
| 2007/0170247 A1* | 7/2007 | Friedman | G06Q 20/42 |
| | | | 235/379 |
| 2007/0178883 A1 | 8/2007 | Nandagopal | |
| 2007/0179885 A1 | 8/2007 | Bird et al. | |
| 2007/0185820 A1 | 8/2007 | Talker | |
| 2007/0185821 A1 | 8/2007 | Wells et al. | |
| 2007/0203850 A1 | 8/2007 | Singh et al. | |
| 2007/0208671 A1* | 9/2007 | Brown | G06Q 20/341 |
| | | | 705/65 |
| 2007/0228148 A1 | 10/2007 | Rable | |
| 2007/0245414 A1 | 10/2007 | Chan et al. | |
| 2007/0272743 A1 | 11/2007 | Christie et al. | |
| 2007/0284433 A1 | 12/2007 | Domenica et al. | |
| 2007/0284443 A1 | 12/2007 | Anson et al. | |
| 2007/0288377 A1 | 12/2007 | Shaked | |
| 2007/0290034 A1 | 12/2007 | Routhenstein | |
| 2007/0291995 A1 | 12/2007 | Rivera | |
| 2008/0001744 A1 | 1/2008 | Batra et al. | |
| 2008/0011823 A1 | 1/2008 | Patel et al. | |
| 2008/0014867 A1 | 1/2008 | Finn | |
| 2008/0015988 A1* | 1/2008 | Brown | G06Q 20/40 |
| | | | 705/44 |
| 2008/0029607 A1 | 2/2008 | Mullen | |
| 2008/0034221 A1 | 2/2008 | Hammad et al. | |
| 2008/0035738 A1 | 2/2008 | Mullen | |
| 2008/0040276 A1 | 2/2008 | Hammad et al. | |
| 2008/0040285 A1* | 2/2008 | Wankmueller | G06Q 20/3674 |
| | | | 705/67 |
| 2008/0052226 A1 | 2/2008 | Agarwal et al. | |
| 2008/0054068 A1 | 3/2008 | Mullen | |
| 2008/0054079 A1 | 3/2008 | Mullen | |
| 2008/0054081 A1 | 3/2008 | Mullen | |
| 2008/0065554 A1 | 3/2008 | Hogan et al. | |
| 2008/0065555 A1 | 3/2008 | Mullen | |
| 2008/0071681 A1 | 3/2008 | Khalid | |
| 2008/0097925 A1 | 4/2008 | King | |
| 2008/0103984 A1 | 5/2008 | Choe et al. | |
| 2008/0110983 A1 | 5/2008 | Ashfield | |
| 2008/0114678 A1 | 5/2008 | Bennett et al. | |
| 2008/0120214 A1 | 5/2008 | Steele et al. | |
| 2008/0126260 A1 | 5/2008 | Cox | |
| 2008/0142582 A1 | 6/2008 | Corioni | |
| 2008/0154770 A1* | 6/2008 | Rutherford | G07F 7/1008 |
| | | | 705/44 |
| 2008/0162312 A1 | 7/2008 | Sklovsky et al. | |
| 2008/0177796 A1 | 7/2008 | Eldering | |
| 2008/0201264 A1* | 8/2008 | Brown | G06Q 20/40 |
| | | | 705/67 |
| 2008/0201265 A1 | 8/2008 | Hewton | |
| 2008/0203152 A1 | 8/2008 | Hammad et al. | |
| 2008/0228646 A1 | 9/2008 | Myers et al. | |
| 2008/0228653 A1 | 9/2008 | Holdsworth | |
| 2008/0243702 A1 | 10/2008 | Hart et al. | |
| 2008/0245855 A1 | 10/2008 | Fein et al. | |
| 2008/0245861 A1 | 10/2008 | Fein et al. | |
| 2008/0275779 A1 | 11/2008 | Lakshminarayanan | |
| 2008/0283591 A1 | 11/2008 | Oder, II et al. | |
| 2008/0289022 A1 | 11/2008 | Chiu | |
| 2008/0302869 A1 | 12/2008 | Mullen | |
| 2008/0302876 A1 | 12/2008 | Mullen | |
| 2008/0305769 A1 | 12/2008 | Rubinstein | |
| 2008/0306876 A1 | 12/2008 | Horvath et al. | |
| 2008/0313264 A1 | 12/2008 | Pestoni | |
| 2008/0319869 A1 | 12/2008 | Carlson et al. | |
| 2008/0319905 A1 | 12/2008 | Carlson | |
| 2009/0006262 A1* | 1/2009 | Brown | H04L 9/32 |
| | | | 705/64 |
| 2009/0006646 A1 | 1/2009 | Duarte | |
| 2009/0010488 A1 | 1/2009 | Matsuoka et al. | |
| 2009/0018959 A1 | 1/2009 | Doran et al. | |
| 2009/0037173 A1* | 2/2009 | Hansen | G06Q 20/341 |
| | | | 704/E15.001 |
| 2009/0037333 A1 | 2/2009 | Flitcroft et al. | |
| 2009/0037388 A1 | 2/2009 | Cooper et al. | |
| 2009/0043702 A1 | 2/2009 | Bennett | |
| 2009/0044268 A1 | 2/2009 | Tak | |
| 2009/0048971 A1 | 2/2009 | Hathaway et al. | |
| 2009/0055277 A1 | 2/2009 | Myers et al. | |
| 2009/0055893 A1 | 2/2009 | Manessis et al. | |
| 2009/0103730 A1 | 4/2009 | Ward et al. | |
| 2009/0104888 A1 | 4/2009 | Cox | |
| 2009/0106112 A1 | 4/2009 | Dalmia et al. | |
| 2009/0106138 A1 | 4/2009 | Smith et al. | |
| 2009/0106160 A1 | 4/2009 | Skowronek | |
| 2009/0124234 A1 | 5/2009 | Fisher et al. | |
| 2009/0125446 A1 | 5/2009 | Saunders et al. | |
| 2009/0132413 A1 | 5/2009 | Engelbrecht | |
| 2009/0134217 A1 | 5/2009 | Flitcroft et al. | |
| 2009/0143104 A1 | 6/2009 | Loh et al. | |
| 2009/0157555 A1 | 6/2009 | Biffle et al. | |
| 2009/0159673 A1 | 6/2009 | Mullen et al. | |
| 2009/0159700 A1 | 6/2009 | Mullen et al. | |
| 2009/0159707 A1 | 6/2009 | Mullen et al. | |
| 2009/0160617 A1* | 6/2009 | Mullen | G06K 19/07 |
| | | | 340/10.1 |
| 2009/0173782 A1 | 7/2009 | Muscato | |
| 2009/0200371 A1 | 8/2009 | Kean et al. | |
| 2009/0219430 A1 | 9/2009 | Okamoto et al. | |
| 2009/0228707 A1* | 9/2009 | Linsky | H04L 63/1475 |
| | | | 380/283 |
| 2009/0235339 A1* | 9/2009 | Mennes | H04L 9/3273 |
| | | | 726/5 |
| 2009/0248583 A1 | 10/2009 | Chhabra | |
| 2009/0249462 A1 | 10/2009 | Chhabra | |
| 2009/0254486 A1 | 10/2009 | Hutchison et al. | |
| 2009/0254986 A1 | 10/2009 | Harris et al. | |
| 2009/0255987 A1 | 10/2009 | Olivares Baena | |
| 2009/0265260 A1 | 10/2009 | Aabye et al. | |

(56)　　　　　　References Cited

U.S. PATENT DOCUMENTS

| 2009/0276347 A1 | 11/2009 | Kargman |
| 2009/0281948 A1 | 11/2009 | Carlson |
| 2009/0289110 A1 | 11/2009 | Regen et al. |
| 2009/0292631 A1 | 11/2009 | Wells et al. |
| 2009/0294527 A1 | 12/2009 | Brabson et al. |
| 2009/0307132 A1* | 12/2009 | Phillips .................. G06Q 40/02 |
| | | 345/173 |
| 2009/0307133 A1 | 12/2009 | Holloway et al. |
| 2009/0307139 A1 | 12/2009 | Mardikar et al. |
| 2009/0307140 A1 | 12/2009 | Mardikar |
| 2009/0307493 A1 | 12/2009 | Smith |
| 2009/0308921 A1 | 12/2009 | Mullen |
| 2009/0313168 A1 | 12/2009 | Manessis |
| 2009/0319430 A1 | 12/2009 | Faith et al. |
| 2009/0319431 A1 | 12/2009 | Aiello et al. |
| 2009/0319784 A1 | 12/2009 | Faith et al. |
| 2009/0327131 A1 | 12/2009 | Beenau et al. |
| 2010/0008535 A1 | 1/2010 | Abulafia et al. |
| 2010/0023400 A1 | 1/2010 | DeWitt |
| 2010/0088237 A1 | 4/2010 | Wankmueller |
| 2010/0094755 A1 | 4/2010 | Kloster |
| 2010/0100481 A1 | 4/2010 | Doran et al. |
| 2010/0106644 A1 | 4/2010 | Annan et al. |
| 2010/0114776 A1 | 5/2010 | Weller et al. |
| 2010/0120408 A1 | 5/2010 | Beenau et al. |
| 2010/0125516 A1 | 5/2010 | Wankmueller et al. |
| 2010/0133334 A1 | 6/2010 | Vadhri |
| 2010/0133335 A1 | 6/2010 | Maguid et al. |
| 2010/0138347 A1 | 6/2010 | Chen |
| 2010/0145860 A1 | 6/2010 | Pelegero |
| 2010/0153266 A1* | 6/2010 | Plunkett .................. G06Q 20/04 |
| | | 705/40 |
| 2010/0161433 A1 | 6/2010 | White |
| 2010/0174556 A1 | 7/2010 | Wilkins et al. |
| 2010/0176935 A1 | 7/2010 | Phillips |
| 2010/0185545 A1 | 7/2010 | Royyuru et al. |
| 2010/0186073 A1 | 7/2010 | Curtis |
| 2010/0191613 A1 | 7/2010 | Raleigh |
| 2010/0199089 A1* | 8/2010 | Vysogorets ............. G06F 21/34 |
| | | 713/168 |
| 2010/0211505 A1 | 8/2010 | Saunders et al. |
| 2010/0223184 A1 | 9/2010 | Perlman |
| 2010/0223186 A1 | 9/2010 | Hogan et al. |
| 2010/0228668 A1 | 9/2010 | Hogan et al. |
| 2010/0235284 A1* | 9/2010 | Moore .................. G06Q 20/401 |
| | | 709/204 |
| 2010/0257102 A1* | 10/2010 | Perlman .................. G06Q 30/06 |
| | | 705/44 |
| 2010/0258620 A1 | 10/2010 | Torreyson et al. |
| 2010/0260388 A1 | 10/2010 | Garrett et al. |
| 2010/0274692 A1 | 10/2010 | Hammad |
| 2010/0274721 A1 | 10/2010 | Hammad |
| 2010/0291904 A1 | 11/2010 | Musfeldt et al. |
| 2010/0293189 A1 | 11/2010 | Hammad |
| 2010/0293381 A1 | 11/2010 | Hammad |
| 2010/0299267 A1 | 11/2010 | Faith et al. |
| 2010/0306076 A1 | 12/2010 | Taveau et al. |
| 2010/0318801 A1 | 12/2010 | Roberge et al. |
| 2010/0325041 A1 | 12/2010 | Berardi et al. |
| 2010/0327054 A1 | 12/2010 | Hammad |
| 2010/0332393 A1 | 12/2010 | Weller et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0106707 A1 | 5/2011 | Hwang et al. |
| 2011/0108623 A1 | 5/2011 | Hammad |
| 2011/0125597 A1 | 5/2011 | Oder, II et al. |
| 2011/0140841 A1 | 6/2011 | Bona et al. |
| 2011/0153437 A1 | 6/2011 | Archer et al. |
| 2011/0153496 A1 | 6/2011 | Royyuru |
| 2011/0153498 A1 | 6/2011 | Makhotin et al. |
| 2011/0154466 A1 | 6/2011 | Harper et al. |
| 2011/0154467 A1 | 6/2011 | Bomar et al. |
| 2011/0161233 A1 | 6/2011 | Tieken |
| 2011/0178926 A1 | 7/2011 | Lindelsee et al. |
| 2011/0184867 A1 | 7/2011 | Varadarajan |
| 2011/0191244 A1 | 8/2011 | Dai |
| 2011/0208658 A1 | 8/2011 | Makhotin |
| 2011/0238511 A1 | 9/2011 | Park et al. |
| 2011/0238573 A1 | 9/2011 | Varadarajan |
| 2011/0238579 A1 | 9/2011 | Coppinger |
| 2011/0240740 A1 | 10/2011 | Li et al. |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276418 A1 | 11/2011 | Velani |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2011/0307710 A1 | 12/2011 | McGuire et al. |
| 2012/0018506 A1 | 1/2012 | Hammad et al. |
| 2012/0018511 A1 | 1/2012 | Hammad |
| 2012/0023567 A1 | 1/2012 | Hammad |
| 2012/0024946 A1 | 2/2012 | Tullis et al. |
| 2012/0028609 A1 | 2/2012 | Hruska |
| 2012/0030047 A1 | 2/2012 | Fuentes et al. |
| 2012/0031969 A1 | 2/2012 | Hammad |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0116976 A1 | 5/2012 | Hammad et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143754 A1 | 6/2012 | Patel |
| 2012/0143767 A1 | 6/2012 | Abadir |
| 2012/0143772 A1 | 6/2012 | Abadir |
| 2012/0153028 A1 | 6/2012 | Poznansky et al. |
| 2012/0158580 A1 | 6/2012 | Eram et al. |
| 2012/0158593 A1 | 6/2012 | Garfinkle et al. |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0271770 A1 | 10/2012 | Harris et al. |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |

(56) References Cited

U.S. PATENT DOCUMENTS

| | | |
|---|---|---|
| 2013/0017784 A1* | 1/2013 | Fisher .................. G06Q 20/325 |
| | | 455/41.1 |
| 2013/0018757 A1 | 1/2013 | Anderson et al. |
| 2013/0019098 A1 | 1/2013 | Gupta et al. |
| 2013/0031006 A1 | 1/2013 | McCullagh et al. |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder ("J.D."), II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191227 A1 | 7/2013 | Pasa et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226802 A1 | 8/2013 | Hammad et al. |
| 2013/0226813 A1 | 8/2013 | Voltz |
| 2013/0238499 A1 | 9/2013 | Hammad |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346305 A1 | 12/2013 | Mendes |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0249945 A1 | 9/2014 | Gauthier et al. |
| 2014/0294701 A1 | 10/2014 | Dai et al. |
| 2014/0297534 A1 | 10/2014 | Patterson |
| 2014/0310183 A1 | 10/2014 | Weber |
| 2014/0324690 A1 | 10/2014 | Allen et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0081544 A1 | 3/2015 | Schulz et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0134540 A1 | 5/2015 | Law |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0278799 A1 | 10/2015 | Palanisamy |
| 2015/0287037 A1 | 10/2015 | Salmon et al. |
| 2015/0312038 A1 | 10/2015 | Palanisamy |
| 2015/0319158 A1 | 11/2015 | Kumnick |
| 2015/0324736 A1 | 11/2015 | Sheets et al. |
| 2015/0332262 A1 | 11/2015 | Lingappa |
| 2015/0356560 A1 | 12/2015 | Shastry et al. |

(56) References Cited

U.S. PATENT DOCUMENTS

| | | |
|---|---|---|
| 2015/0363781 A1 | 12/2015 | Badenhorst |
| 2015/0379515 A1 | 12/2015 | Hammad et al. |
| 2016/0028550 A1 | 1/2016 | Gaddam et al. |
| 2016/0036790 A1 | 2/2016 | Shastry et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0092874 A1 | 3/2016 | O'Regan et al. |
| 2016/0103675 A1 | 4/2016 | Aabye et al. |
| 2016/0119296 A1 | 4/2016 | Laxminarayanan et al. |
| 2016/0132878 A1 | 5/2016 | O'Regan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0171479 A1 | 6/2016 | Prakash et al. |
| 2016/0173483 A1 | 6/2016 | Wong et al. |
| 2016/0197725 A1 | 7/2016 | Hammad |
| 2016/0210628 A1 | 7/2016 | McGuire |
| 2016/0217461 A1 | 7/2016 | Gaddam et al. |
| 2016/0218875 A1 | 7/2016 | Le Saint et al. |
| 2016/0224976 A1 | 8/2016 | Basu et al. |
| 2016/0224977 A1 | 8/2016 | Sabba et al. |
| 2016/0232527 A1 | 8/2016 | Patterson |
| 2016/0239842 A1 | 8/2016 | Cash et al. |
| 2016/0269391 A1 | 9/2016 | Gaddam et al. |
| 2016/0275501 A1 | 9/2016 | Hammad |
| 2016/0308995 A1 | 10/2016 | Youdale et al. |
| 2016/0371683 A1 | 12/2016 | Maus et al. |
| 2017/0046696 A1 | 2/2017 | Powell et al. |
| 2017/0076288 A1 | 3/2017 | Awasthi |
| 2017/0103387 A1 | 4/2017 | Weber |
| 2017/0109745 A1 | 4/2017 | Al-Bedaiwi et al. |
| 2017/0116596 A1 | 4/2017 | Tsui |
| 2017/0148013 A1 | 5/2017 | Rajurkar et al. |
| 2017/0163617 A1 | 6/2017 | Laxminarayanan et al. |
| 2017/0163629 A1 | 6/2017 | Law et al. |
| 2017/0186001 A1 | 6/2017 | Reed et al. |
| 2017/0200156 A1 | 7/2017 | Karpenko et al. |
| 2017/0200165 A1 | 7/2017 | Laxminarayanan et al. |
| 2017/0201520 A1 | 7/2017 | Chandoor et al. |
| 2017/0220818 A1 | 8/2017 | Nagasundaram et al. |
| 2017/0221054 A1 | 8/2017 | Flurscheim et al. |
| 2017/0221056 A1 | 8/2017 | Karpenko et al. |
| 2017/0228723 A1 | 8/2017 | Taylor et al. |
| 2017/0228728 A1 | 8/2017 | Sullivan |
| 2017/0236113 A1 | 8/2017 | Chitalia et al. |
| 2017/0293914 A1 | 10/2017 | Girish et al. |
| 2017/0295155 A1 | 10/2017 | Wong |
| 2017/0337549 A1 | 11/2017 | Wong |
| 2017/0364903 A1 | 12/2017 | Lopez |
| 2017/0364914 A1 | 12/2017 | Howard |
| 2017/0373852 A1 | 12/2017 | Cassin et al. |
| 2018/0005238 A1 | 1/2018 | Hammad et al. |
| 2018/0006821 A1 | 1/2018 | Kinagi |
| 2018/0075081 A1 | 3/2018 | Chipman |
| 2018/0247303 A1 | 8/2018 | Raj et al. |
| 2018/0262334 A1 | 9/2018 | Hammad |
| 2018/0268399 A1 | 9/2018 | Spector et al. |
| 2018/0268405 A1 | 9/2018 | Lopez |
| 2018/0285875 A1 | 10/2018 | Law et al. |
| 2018/0308095 A1 | 10/2018 | Hammad et al. |
| 2018/0315050 A1 | 11/2018 | Hammad |
| 2018/0324184 A1 | 11/2018 | Kaja et al. |
| 2018/0324584 A1 | 11/2018 | Lopez |
| 2019/0020478 A1 | 1/2019 | Girish et al. |
| 2019/0066069 A1 | 2/2019 | Faith et al. |
| 2019/0147439 A1 | 5/2019 | Wang et al. |
| 2019/0303915 A1 | 10/2019 | Hammad |
| 2019/0356489 A1 | 11/2019 | Palanisamy |
| 2019/0384896 A1 | 12/2019 | Jones |
| 2019/0392431 A1 | 12/2019 | Chitalia et al. |
| 2020/0151690 A1 | 5/2020 | Hammad |
| 2020/0267153 A1 | 8/2020 | Kang et al. |
| 2020/0314644 A1 | 10/2020 | Dean et al. |

FOREIGN PATENT DOCUMENTS

| | | | | |
|---|---|---|---|---|
| AU | 2010292125 B2 | 11/2014 | | |
| AU | 2010315111 B2 | 3/2015 | | |
| BR | 308951 A | 1/2005 | | |
| CA | 2449748 A1 * | 12/2002 | ........... | H04W 12/50 |
| CA | 2604348 A1 * | 9/2006 | .......... | G06Q 20/325 |
| CA | 2449748 C | 11/2012 | | |
| CA | 2816020 C | 1/2020 | | |
| CN | 101110113 A | 1/2008 | | |
| CN | 101211436 A | 7/2008 | | |
| CN | 101485128 A | 7/2009 | | |
| CN | 101512957 A | 8/2009 | | |
| CN | 101582121 A | 11/2009 | | |
| CN | 103270524 A | 8/2013 | | |
| CN | 103503010 B | 12/2017 | | |
| EA | 11495 B1 | 4/2009 | | |
| EP | 1028401 A2 | 8/2000 | | |
| EP | 1168265 A1 | 1/2002 | | |
| EP | 1840814 A1 | 10/2007 | | |
| EP | 2098985 A2 | 9/2009 | | |
| EP | 2156397 A1 | 2/2010 | | |
| GB | 2459850 A | 11/2009 | | |
| IN | 301451 | 9/2018 | | |
| JP | 2006350593 A | 12/2006 | | |
| JP | 2008210370 A | 9/2008 | | |
| KR | 20000054496 A | 9/2000 | | |
| KR | 1020030020189 A | 3/2003 | | |
| KR | 1020050019674 A | 3/2005 | | |
| KR | 1020060022304 A | 3/2006 | | |
| KR | 1020060096821 A | 9/2006 | | |
| KR | 1020060111200 A | 10/2006 | | |
| KR | 1020070100076 A | 10/2007 | | |
| KR | 1020080026802 A | 3/2008 | | |
| KR | 1020080039330 A | 5/2008 | | |
| KR | 1020080051198 A | 6/2008 | | |
| KR | 1020090021388 A | 3/2009 | | |
| KR | 1020090044619 A | 5/2009 | | |
| KR | 1020100110642 A | 10/2010 | | |
| MX | 314802 | 10/2013 | | |
| MX | 318796 | 3/2014 | | |
| RU | 2252451 C2 | 5/2005 | | |
| RU | 2331110 C2 | 8/2008 | | |
| RU | 2011148229 A | 6/2013 | | |
| WO | 0014648 A1 | 3/2000 | | |
| WO | 0116900 A2 | 3/2001 | | |
| WO | 0117296 A1 | 3/2001 | | |
| WO | 0135304 A1 | 5/2001 | | |
| WO | 0184509 A2 | 11/2001 | | |
| WO | 0188785 A1 | 11/2001 | | |
| WO | 0201520 A1 | 1/2002 | | |
| WO | 0135304 A9 | 5/2002 | | |
| WO | 02059727 A2 | 8/2002 | | |
| WO | 03047208 A1 | 6/2003 | | |
| WO | 03073389 A2 | 9/2003 | | |
| WO | 03075192 A1 | 9/2003 | | |
| WO | 2004042536 A2 | 5/2004 | | |
| WO | 2004051585 A2 | 6/2004 | | |
| WO | 2005001618 A2 | 1/2005 | | |
| WO | 2005001635 A2 | 1/2005 | | |
| WO | 2005001751 A1 | 1/2005 | | |
| WO | 2005073931 A2 | 8/2005 | | |
| WO | 2005109360 A1 | 11/2005 | | |
| WO | 2006028488 A2 | 3/2006 | | |
| WO | 2006099294 A1 | 9/2006 | | |
| WO | 2006113834 A2 | 10/2006 | | |
| WO | 2008014554 A1 | 2/2008 | | |
| WO | 2009003030 A2 | 12/2008 | | |
| WO | 2009025605 A2 | 2/2009 | | |
| WO | 2009032523 A1 | 3/2009 | | |
| WO | 2009052634 A1 | 4/2009 | | |
| WO | 2009136404 A2 | 11/2009 | | |
| WO | 2010078522 A1 | 7/2010 | | |
| WO | 2010129357 A2 | 11/2010 | | |
| WO | 2011057007 A2 | 5/2011 | | |
| WO | 2011031988 A3 | 7/2011 | | |
| WO | 2012054763 A2 | 4/2012 | | |
| WO | 2012058309 A2 | 5/2012 | | |
| WO | 2012068078 A2 | 5/2012 | | |

(56)            References Cited

FOREIGN PATENT DOCUMENTS

| WO | 2012098556 A1 | 7/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |

OTHER PUBLICATIONS

Petition for Inter Partes Review of U.S. Pat. No. 8,533,860 Challenging Claims 1-30 Under 35 U.S.C. § 312 and 37 C.F.R. § 42.104, USPTO Patent Trial and Appeal Board, IPR 2016-00600, Feb. 17, 2016, 65 pages.
Security Concerns Usher in "Disposable" Credit Cards, Credit Card News, Sep. 15, 2000, 2 pages.
U.S. Appl. No. 12/768,661, Non-Final Office Action mailed on Dec. 27, 2011, 6 pages.
U.S. Appl. No. 12/778,446, Optimizing Transaction Scenarios With Automated Decision Making, filed on May 12, 2010, 56 pages.
U.S. Appl. No. 12/778,459, Peer-to-Peer and Group Financial Management Systems and Methods, filed on May 12, 2010, 58 pages.
U.S. Appl. No. 12/778,485, System and Method for Promotion Processing and Authorization, filed on May 12, 2010, 60 pages.
U.S. Appl. No. 12/780,657, Final Office Action mailed on Sep. 13, 2012, 16 pages.
U.S. Appl. No. 12/780,657, Non-Final Office Action mailed on Feb. 29, 2012, 13 pages.
U.S. Appl. No. 12/780,657, Non-Final Office Action mailed on May 23, 2014, 8 pages.
U.S. Appl. No. 12/780,801, Final Office Action mailed on Oct. 25, 2016, 12 pages.
U.S. Appl. No. 12/780,801, Final Office Action mailed on May 21, 2015, 9 pages.
U.S. Appl. No. 12/780,801, Non-Final Office Action mailed on Apr. 13, 2016, 11 pages.
U.S. Appl. No. 12/780,801, Non-Final Office Action mailed on Oct. 27, 2014, 9 pages.
U.S. Appl. No. 12/878,947, Final Office Action mailed on Sep. 14, 2012, 15 pages.
U.S. Appl. No. 12/878,947, Non-Final Office Action mailed on Apr. 5, 2012, 15 pages.
U.S. Appl. No. 12/939,963, Verification of Portable Consumer Devices for 3-D Secure Services, filed Nov. 4, 2010, 115 pages.
U.S. Appl. No. 13/010,564, Non-Final Office Action mailed on Mar. 11, 2014, 12 pages.
U.S. Appl. No. 13/107,715, Final Office Action mailed on Nov. 14, 2012, 17 pages.
U.S. Appl. No. 13/107,715, Non-Final Office Action mailed on Apr. 13, 2012, 15 pages.
U.S. Appl. No. 13/107,715, Non-Final Office Action mailed on Jun. 20, 2014, 19 pages.
U.S. Appl. No. 13/250,918, Non-Final Office Action mailed on Nov. 23, 2012, 20 pages.
U.S. Appl. No. 13/250,981, Non-Final Office Action mailed on Nov. 26, 2012, 19 pages.
U.S. Appl. No. 13/250,981, Non-Final Office Action mailed on Apr. 26, 2013, 9 pages.
U.S. Appl. No. 13/347,495, Non-Final Office Action mailed on Apr. 11, 2012, 12 pages.
U.S. Appl. No. 13/347,495, Office Action Response filed on May 25, 2012, 15 pages.
U.S. Appl. No. 13/411,400, Final Office Action mailed on Mar. 2, 2015, 18 pages.
U.S. Appl. No. 13/411,400, Non-Final Office Action mailed on Jul. 10, 2014, 16 pages.
U.S. Appl. No. 13/411,400, Non-Final Office Action mailed on Aug. 28, 2015, 19 pages.

U.S. Appl. No. 13/413,484, Final Office Action mailed on Aug. 27, 2018, 18 pages.
U.S. Appl. No. 13/413,484, Final Office Action mailed on Jan. 25, 2017, 19 pages.
U.S. Appl. No. 13/413,484, Final Office Action mailed on Mar. 3, 2014, 19 pages.
U.S. Appl. No. 13/413,484, Non-Final Office Action mailed on Jul. 31, 2013, 13 pages.
U.S. Appl. No. 13/413,484, Non-Final Office Action mailed on Jun. 14, 2016, 14 pages.
U.S. Appl. No. 13/413,484, Non-Final Office Action mailed on Feb. 6, 2018, 16 pages.
U.S. Appl. No. 13/963,538, Non-Final Office Action mailed on Apr. 29, 2015, 8 pages.
U.S. Appl. No. 14/071,040, Non-Final Office Action mailed on Oct. 15, 2015, 9 pages.
U.S. Appl. No. 14/511,034, Non-Final Office Action mailed on Mar. 2, 2016, 8 pages.
U.S. Appl. No. 14/600,523, Secure Payment Processing Using Authorization Request, filed Jan. 20, 2015, 42 pages.
U.S. Appl. No. 14/681,668, Final Office Action mailed on Apr. 20, 2017, 14 pages.
U.S. Appl. No. 14/681,668, Non-Final Office Action mailed on Aug. 25, 2016, 13 pages.
U.S. Appl. No. 14/732,294, Non-Final Office Action mailed on Sep. 7, 2016, 9 pages.
U.S. Appl. No. 14/952,444, Tokenization Request via Access Device, filed Nov. 25, 2015, 78 pages.
U.S. Appl. No. 14/952,514, Systems Communications With Non-Sensitive Identifiers, filed Nov. 25, 2015, 72 pages.
U.S. Appl. No. 14/955,716, Provisioning Platform for Machine-to-Machine Devices, filed Dec. 1, 2015, 61 pages.
U.S. Appl. No. 14/966,948, Automated Access Data Provisioning, filed Dec. 11, 2015, 52 pages.
U.S. Appl. No. 15/004,705, Cloud-Based Transactions With Magnetic Secure Transmission, filed Jan. 22, 2016, 161 pages.
U.S. Appl. No. 15/008,388, Methods for Secure Credential Provisioning, filed on Jan. 27, 2016, 90 pages.
U.S. Appl. No. 15/011,366, Token Check Offline, filed Jan. 29, 2016, 60 pages.
U.S. Appl. No. 15/019,157, Token Processing Utilizing Multiple Authorizations, filed Feb. 9, 2016, 62 pages.
U.S. Appl. No. 15/041,495, Peer Forward Authorization of Digital Requests, filed Feb. 11, 2016, 63 pages.
U.S. Appl. No. 15/070,446, Non-Final Office Action mailed on Dec. 16, 2016, 7 pages.
U.S. Appl. No. 15/070,446, Non-Final Office Action mailed on Jul. 14, 2017, 8 pages.
U.S. Appl. No. 15/252,595, Final Office Action mailed on Oct. 18, 2019, 10 pages.
U.S. Appl. No. 15/252,595, Non-Final Office Action mailed on Mar. 21, 2019, 10 pages.
U.S. Appl. No. 15/252,595, Non-Final Office Action mailed on Aug. 9, 2018, 9 pages.
U.S. Appl. No. 15/258,258, Non-Final Office Action mailed on Aug. 23, 2017, 9 pages.
U.S. Appl. No. 15/265,282, Self-Cleaning Token Valut, filed Sep. 14, 2016, 52 pages.
U.S. Appl. No. 15/462,658, Replacing Token on a Multi-Token User Device, filed Mar. 17, 2017, 58 pages.
U.S. Appl. No. 15/585,077, System and Method Using Interaction Token, filed May 2, 2017, 36 pages.
U.S. Appl. No. 15/618,500, Non-Final Office Action mailed on Jun. 26, 2019, 8 pages.
U.S. Appl. No. 15/977,921, Notice of Allowance mailed on Mar. 21, 2019, 10 pages.
U.S. Appl. No. 16/028,941, Non-Final Office Action mailed on Jun. 9, 2020, 16 pages.
U.S. Appl. No. 16/269,222, Advisory Action mailed on May 19, 2022, 5 pages.
U.S. Appl. No. 16/269,222, Final Office Action mailed on Mar. 8, 2022, 23 pages.

(56) References Cited

OTHER PUBLICATIONS

U.S. Appl. No. 16/269,222, Non-Final Office Action mailed on Sep. 29, 2021, 17 pages.

U.S. Appl. No. 16/269,222, Non-Final Office Action mailed on Jun. 15, 2022, 21 pages.

U.S. Appl. No. 16/311,144, Encryption Key Exchange Process Using Access Device, filed Dec. 18, 2018, 83 pages.

U.S. Appl. No. 16/347,175, Access Identifier Provisioning to Application, filed May 2, 2019, 39 pages.

U.S. Appl. No. 16/415,360, Method and System for Access Token Processing, filed May 17, 2019, 37 pages.

U.S. Appl. No. 16/446,984, Notice of Allowance mailed on Jul. 21, 2020, 11 pages.

U.S. Appl. No. 16/745,161, Non-Final Office Action mailed on Sep. 16, 2020, 11 pages.

U.S. Appl. No. 16/950,186, Non-Final Office Action mailed on May 12, 2022, 9 pages.

U.S. Appl. No. 61/061,936, Method and System of Authenticating a Financial Presentation Device Using a Token, filed Jun. 16, 2008, 14 pages.

U.S. Appl. No. 61/112,124, Online Challenge-Response, filed Nov. 6, 2008, 11 pages.

U.S. Appl. No. 61/178,636, Dynamic Data Authentication, filed May 15, 2009, 33 pages.

U.S. Appl. No. 61/256,095, Systems and Methods for Brokered Authentication Express Seller Links, filed Oct. 29, 2009, 40 pages.

U.S. Appl. No. 61/256,136, Sponsored Accounts for Computer-Implemented Payment System, filed Oct. 29, 2009, 64 pages.

U.S. Appl. No. 61/256,141, Optimizing Transaction Scenarios With Automated Decision Making, filed Oct. 29, 2009, 38 pages.

U.S. Appl. No. 61/256,143, System and Method for Promotion Processing, filed Oct. 29, 2009, 29 pages.

U.S. Appl. No. 61/256,147, Peer-to-Peer and Group Financial Management Systems and Methods, filed Oct. 29, 2009, 41 pages.

U.S. Appl. No. 61/258,194, Apparatuses, Methods, and Systems Pertaining to the Verification of Portable Consumer Devices for 3-D Secure Servicess, filed Nov. 4, 2009, 59 pages.

U.S. Appl. No. 61/738,832, Management of Sensitive Data, filed Dec. 18, 2012, 22 pages.

U.S. Appl. No. 61/751,763, Payments Bridge, filed Jan. 11, 2013, 64 pages.

U.S. Appl. No. 61/879,632, Systems and Methods for Managing Mobile Cardholder Verification Methods, filed Sep. 18, 2013, 24 pages.

U.S. Appl. No. 61/892,407, Issuer Over-the-Air Update Method and System, filed Oct. 17, 2013, 28 pages.

U.S. Appl. No. 61/894,749, Methods and Systems for Authentication and Issuance of Tokens in a Secure Environment, filed Oct. 23, 2013, 67 pages.

U.S. Appl. No. 61/926,236, Methods and Systems for Provisioning Mobile Devices With Payment Credentials and Payment Token Identifiers, filed Jan. 10, 2014, 51 pages.

U.S. Appl. No. 62/000,288, Payment System Canonical Address Format, filed May 19, 2014, 58 pages.

U.S. Appl. No. 62/003,717, Mobile Merchant Application, filed May 28, 2014, 58 pages.

U.S. Appl. No. 62/024,426, Secure Transactions Using Mobile Devices, filed Jul. 14, 2014, 102 pages.

U.S. Appl. No. 62/037,033, Sharing Payment Token, filed Aug. 13, 2014, 36 pages.

U.S. Appl. No. 62/038,174, Customized Payment Gateway, filed Aug. 15, 2014, 42 pages.

U.S. Appl. No. 62/042,050, Payment Device Authentication and Authorization System, filed Aug. 26, 2014, 120 pages.

U.S. Appl. No. 62/053,736, Completing Transactions Without a User Payment Device, filed Sep. 22, 2014, 31 pages.

U.S. Appl. No. 62/054,346, Mirrored Token Vault, filed Sep. 23, 2014, 38 pages.

U.S. Appl. No. 62/103,522, Methods and Systems for Wallet Provider Provisioning, filed Jan. 14, 2015, 39 pages.

U.S. Appl. No. 62/108,403, Wearables With NFC HCE, filed Jan. 27, 2015, 32 pages.

U.S. Appl. No. 62/117,291, Token and Cryptogram Using Transaction Specific Information, filed Feb. 17, 2015, 25 pages.

U.S. Appl. No. 62/128,709, Tokenizing Transaction Amounts, filed Mar. 5, 2015, 30 pages.

Indian Application No. 8609/CHENP/2011, First Examiner Report mailed on Mar. 9, 2018, 7 pages.

Australian Application No. AU2010246247, Office Action Response filed on Nov. 11, 2013, 15 Pages.

Australian Application No. AU2010292125, First Examiner Report mailed on Jul. 9, 2014, 3 pages.

Australian Application No. AU2010315111, First Examination Report mailed on Jul. 31, 2014, 5 pages.

Australian Application No. AU2011316932, First Examiner Report mailed on Mar. 1, 2016, 2 pages.

Australian Application No. AU2011319944, First Examiner Report mailed on Mar. 24, 2016, 3 pages.

Canadian Application No. CA2,759,950, Office Action mailed on Oct. 1, 2013, 4 pages.

Canadian Application No. CA2,759,950, Office Action mailed on Oct. 28, 2014, 7 pages.

Canadian Application No. CA2,816,020, Office Action mailed on Jul. 11, 2017, 7 pages.

Cai et al., Authorization Mechanisms for Mobile Commerce Implementations in Enhanced Prepaid Solutions, Bell Labs Technical Journal, vol. 8, No. 4, 2004, pp. 121-131.

Chinese Application No. CN201180062091.6, Office Action mailed on Nov. 4, 2015, 14 pages (9 pages of Original Document and 5 pages of English Translation).

Chinese Application No. CN201180062091.6, Office Action mailed on Jun. 7, 2016, 6 pages (3 pages of Original Document and 3 pages of English Translation).

Chinese Application No. CN201180062718.8, Office Action mailed on Nov. 27, 2015, 17 pages (12 pages of Original Document and 5 pages of English Translation).

Chinese Application No. CN201180062718.8, Office Action mailed on Aug. 3, 2016, 6 pages (3 pages of Original Document and 3 pages of English Translation).

Chinese Application No. CN201280021548.3, Office Action mailed on Jun. 15, 2017, 12 pages (5 pages of Original Document and 7 pages of English Translation).

Chinese Application No. CN201280021548.3, Office Action mailed on Dec. 2, 2015, 20 pages (15 pages of Original Document and 5 pages of English Translation).

Chinese Application No. CN201280021548.3, Office Action mailed on Aug. 3, 2016, 25 pages (14 pages of Original Document and 11 pages of English Translation).

Chinese Application No. CN201280021548.3, Office Action mailed on Dec. 5, 2016, 28 pages (15 pages of Original Document and 13 pages of English Translation).

European Application No. EP10772579.8, Extended European Search Report mailed on May 24, 2013, 6 pages.

European Application No. EP10772579.8, Office Action mailed on Feb. 4, 2014, 7 pages.

European Application No. EP10772579.8, Office Action mailed on Dec. 11, 2015, 8 pages.

European Application No. EP10772579.8, Office Action mailed on Nov. 11, 2016, 8 pages.

European Application No. EP10775620.7, Extended European Search Report mailed on Dec. 12, 2013, 8 pages.

European Application No. EP10816167.0, Extended European Search Report mailed on Dec. 17, 2013, 3 pages.

European Application No. EP10816167.0, Office Action mailed on Jan. 20, 2014, 5 pages.

European Application No. EP12754487.2, Extended European Search Report mailed on Jul. 17, 2014, 7 pages.

European Application No. EP12754487.2, Office Action mailed on Oct. 21, 2015, 7 pages.

Gillick, Global Platform Made Simple Guide: Trusted Execution Environment (TEE) Guide, Global Platform, Available Online at: https://web.archive.org/web/20120212221931/http://www.globalplatform.org/mediaguidetee.asp, Feb. 12, 2012, 4 pages.

(56) References Cited

OTHER PUBLICATIONS

Indian Application No. IN4789/CHENP/2012, First Examination Report mailed on Jun. 24, 2019, 6 pages.

English Translation of JP2006350593, Anticounterfeit System for Credit Card or Cash Card Using Anticounterfeit Code, and Anticounterfeit Method, Dec. 28, 2006, 58 pages.

Mexican Application No. MX/A/2011/011408, Office Action mailed on Jul. 13, 2013, 2 pages.

Mexican Application No. MX/A/2011/011408, Office Action mailed on Nov. 1, 2013, 2 pages.

Mexican Application No. MX/A/2012/005226, Office Action mailed on May 5, 2013, 2 pages.

International Application No. PCT/US2010/032825, International Search Report mailed on Dec. 1, 2010, 3 pages.

International Application No. PCT/US2010/032825, International Written Opinion mailed on Dec. 1, 2010, 6 pages.

International Application No. PCT/US2010/034960, International Search Report and Written Opinion mailed on Dec. 22, 2010, 12 pages.

International Application No. PCT/US2010/048455, International Search Report and Written Opinion mailed on May 30, 2011, 9 pages.

International Application No. PCT/US2010/055500, International Preliminary Report on Patentability mailed on May 18, 2012, 9 pages.

International Application No. PCT/US2010/055500, International Search Report and Written Opinion mailed on May 27, 2011, 12 pages.

International Application No. PCT/US2011/057154, International Search Report and Written Opinion mailed on Jun. 1, 2012, 10 pages.

International Application No. PCT/US2011/057889, International Search Report and Written Opinion mailed on Jun. 1, 2012, 10 pages.

International Application No. PCT/US2012/027586, International Search Report and Written Opinion mailed on Sep. 3, 2012, 11 pages.

Ratha et al., Enhancing Security and Privacy in Biometrics-Based Authentication Systems, IBM Systems Journal, vol. 40, No. 3, 2001, pp. 614-634.

Reisinger, PayPal Offers SMS Security Key for Mobile Users, Available Online at: http://news.cnet/com/8301-17939_1209-10106410-2.html, Nov. 24, 2008, pp. 1-3.

Russian Application No. RU2011148229, Office Action mailed on Feb. 5, 2013, 7 pages (4 pages of Original Document and 3 pages of English Translation).

Russian Application No. RU2012122806, Office Action mailed on Jun. 22, 2012, 2 pages (English Translation only).

Russian Application No. RU2012122806, Office Action mailed on Oct. 8, 2012, 4 pages (3 pages of Original Document and 1 page of English Translation).

Varshney, Supporting Group-Oriented Mobile Services Transactions, IT Professional, vol. 9, Nov.-Dec. 2007, pp. 10-15.

U.S. Appl. No. 16/950,186, Non-Final Office Action mailed Feb. 17, 2023, 9 pages.

Application No. AP/P/2015/008826 , Notice of Allowance, Mailed on Nov. 21, 2018, 5 pages.

Application No. CA2,816,020 , Notice of Allowance, Mailed on May 21, 2019, 1 page.

Application No. CA2,816,020 , Office Action, Mailed on Jun. 21, 2018, 6 pages.

EP12754487.2 , "Summons to Attend Oral Proceedings", Jul. 5, 2019, 12 pages.

IN3945/CHENP/2013 , "First Examination Report", Jul. 16, 2019, 7 pages.

U.S. Appl. No. 16/269,222 , Final Office Action, Mailed on Apr. 6, 2023, 20 pages.

U.S. Appl. No. 16/950,186 , Final Office Action, Mailed on Aug. 3, 2023, 11 pages.

U.S. Appl. No. 16/269,222 , "Corrected Notice of Allowability", Feb. 14, 2024, 2 pages.

U.S. Appl. No. 16/269,222 , Notice of Allowance, Mailed on Jan. 23, 2024, 10 pages.

U.S. Appl. No. 16/950,186 , Final Office Action, Mailed on Feb. 1, 2024, 11 pages.

U.S. Appl. No. 16/950,186, Notice of Allowance, Mailed on May 1, 2024, 11 pages.

U.S. Appl. No. 18/957,088, Non-Final Office, Mailed on Jul. 29, 2025, 8 pages.

U.S. Appl. No. 18/792,198 , Notice of Allowance, Mailed on Apr. 23, 2025, 10 pages.

U.S. Appl. No. 18/958,613 , Notice of Allowance, Mailed on Jun. 24, 2025, 10 pages.

* cited by examiner

42

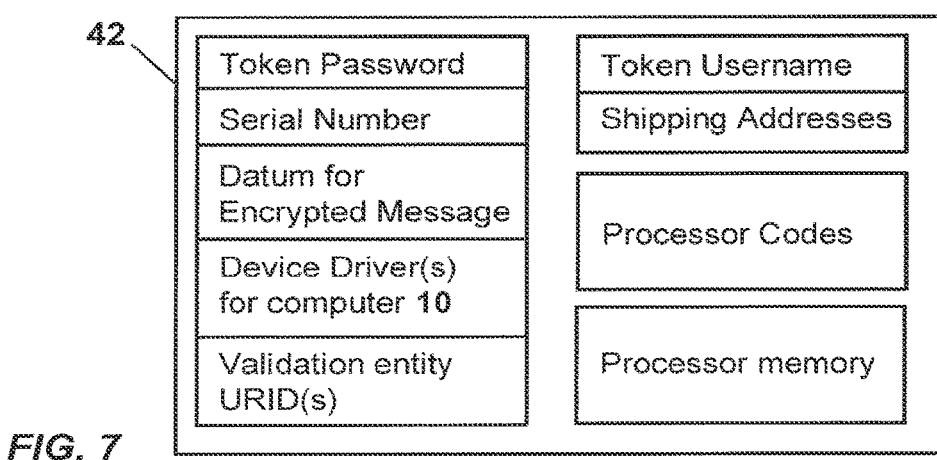

| Token Password | Token Username |
|---|---|
| Serial Number | Shipping Addresses |
| Datum for Encrypted Message | Processor Codes |
| Device Driver(s) for computer 10 | |
| Validation entity URID(s) | Processor memory |

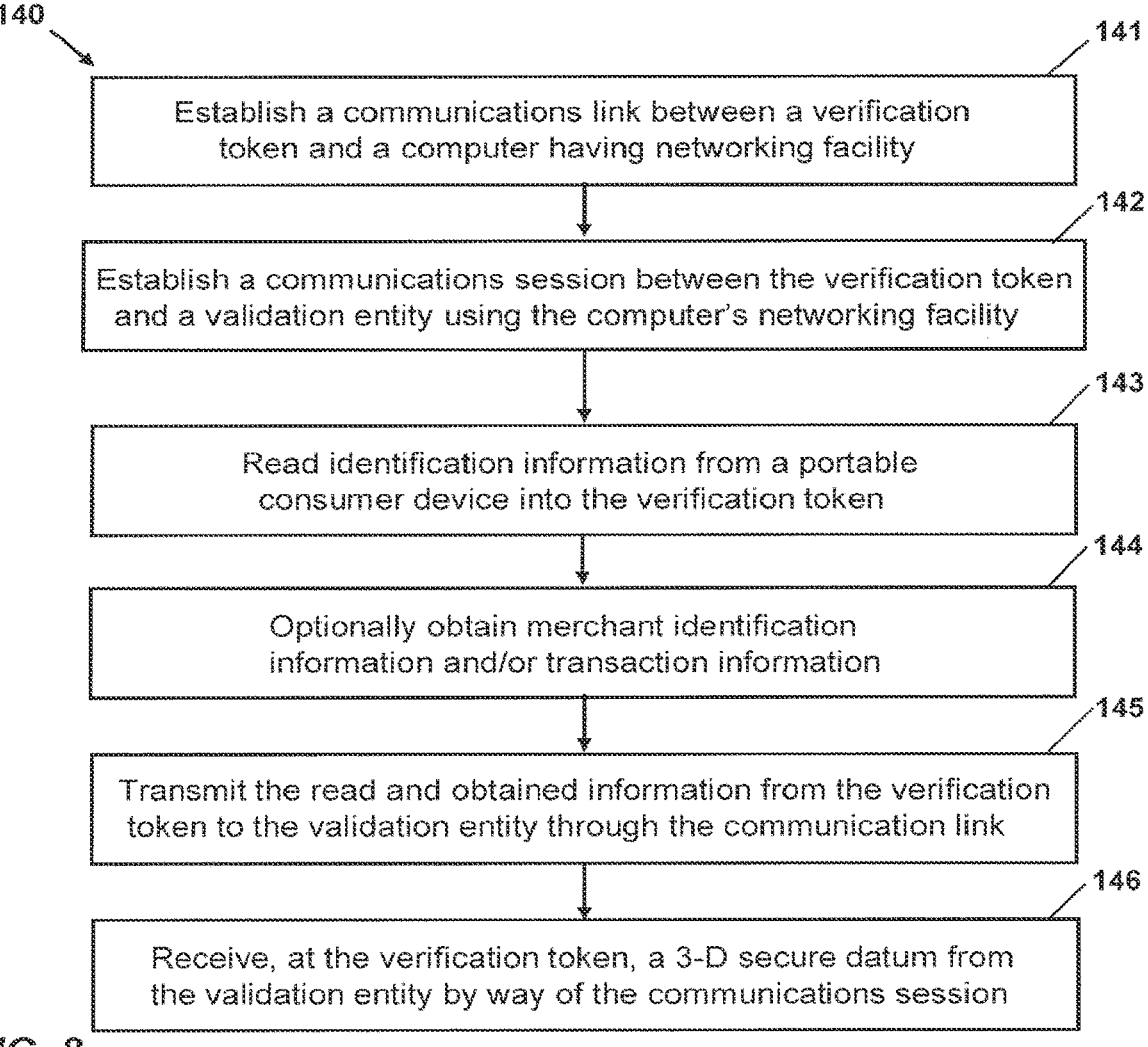

141
Establish a communications link between a verification token and a computer having networking facility 142
Establish a communications session between the verification token and a validation entity using the computer's networking facility 143
Read identification information from a portable consumer device into the verification token 144
Optionally obtain merchant identification information and/or transaction information 145
Transmit the read and obtained information from the verification token to the validation entity through the communication link 146
Receive, at the verification token, a 3-D secure datum from the validation entity by way of the communications session

*FIG. 8*

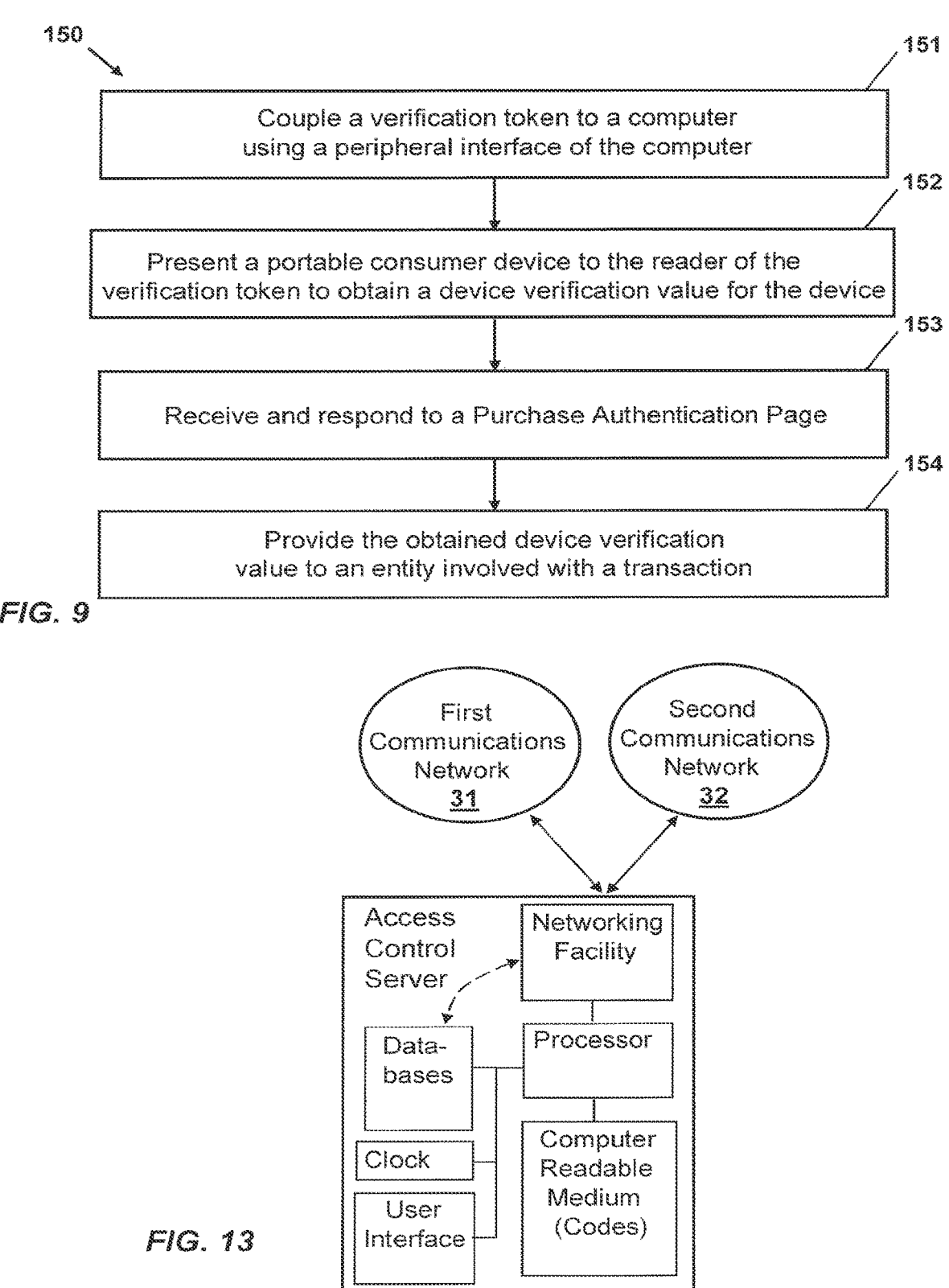

150

151
Couple a verification token to a computer
using a peripheral interface of the computer

152
Present a portable consumer device to the reader of the
verification token to obtain a device verification value for the device

153
Receive and respond to a Purchase Authentication Page

154
Provide the obtained device verification
value to an entity involved with a transaction

*FIG. 9*

First Communications Network 31

Second Communications Network 32

Access Control Server

Networking Facility

Data-bases

Processor

Clock

Computer Readable Medium (Codes)

User Interface

*FIG. 13*

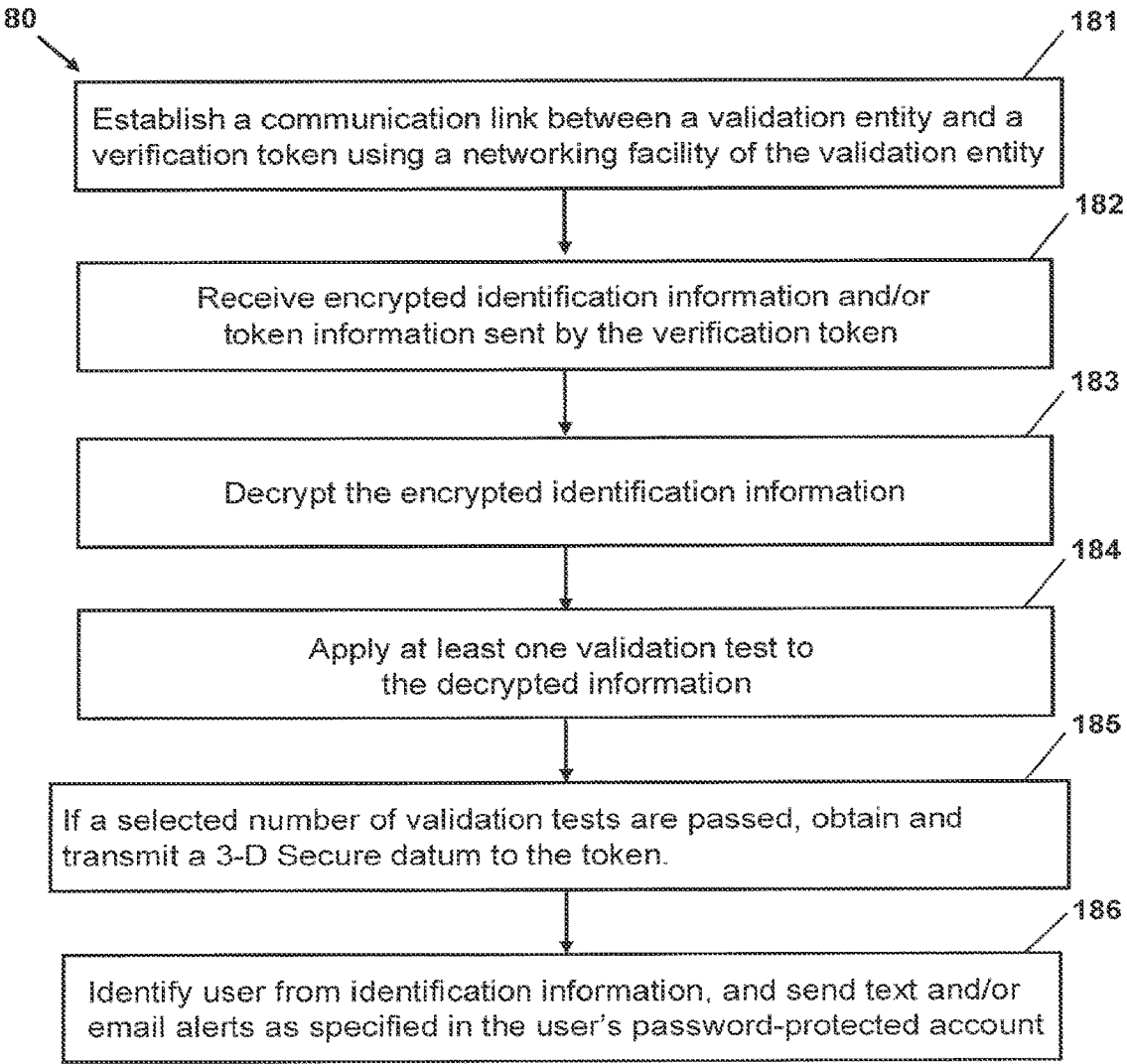

180

181

Establish a communication link between a validation entity and a verification token using a networking facility of the validation entity

182

Receive encrypted identification information and/or token information sent by the verification token

183

Decrypt the encrypted identification information

184

Apply at least one validation test to the decrypted information

185

If a selected number of validation tests are passed, obtain and transmit a 3-D Secure datum to the token.

186

Identify user from identification information, and send text and/or email alerts as specified in the user's password-protected account

*FIG. 10*

SECURE AUTHENTICATION SYSTEM AND METHOD

CROSS-REFERENCES TO RELATED APPLICATIONS

This application is a continuation of U.S. patent application Ser. No. 16/024,323, filed Jun. 29, 2018, which is a continuation of U.S. patent application Ser. No. 15/690,150, filed Aug. 29, 2017, now U.S. Pat. No. 10,043,186, which is a continuation of U.S. patent application Ser. No. 14/732, 294, filed Jun. 5, 2015, now U.S. Pat. No. 9,792,611, which is a continuation of U.S. patent application Ser. No. 13/107, 715, filed May 13, 2011, now U.S. Pat. No. 9,105,027, which is a continuation of PCT Patent Application No. PCT/US2010/055500, filed Nov. 4, 2010, which claims the benefit of U.S. Provisional Patent Application No. 61/258, 194, filed Nov. 4, 2009, the contents of all of which are hereby incorporated in their entirety by reference for all purposes. U.S. patent application Ser. No. 13/107,715 is also a continuation-in-part of U.S. patent application Ser. No. 12/780,657, filed May 14, 2010, now U.S. Pat. No. 9,038, 886, issued May 26, 2015, which is a continuation-in-part of U.S. patent application Ser. No. 12/712,148, filed Feb. 24, 2010 now U.S. Pat. No. 7,891,560, issued Feb. 22, 2011, which claims the benefit of U.S. Provisional Patent Application No. 61/178,636, filed May 15, 2009, the contents of all of the above applications being hereby incorporated in their entirety by reference for all purposes.

BACKGROUND

As methods and devices for engaging in financial transactions have increased, old problems such as fraud and counterfeiting persist.

One of the primary sources of fraud, which is prevalent in the credit card industry, is skimming. Skimming refers to the electronic copying of a card's magnetic stripe data to create counterfeit cards.

Skimming is predominantly a phenomenon afflicting static magnetic stripe based transactions. This is because the magnetic stripe, which is placed on the back of a transaction card and stores a variety of data on three separate tracks, is a passive medium. In other words, the digital content of the magnetic stripe can be perfectly copied, without any difference between the copy and the original.

One of the primary means by which skimming can be prevented is for the consumer to closely monitor the whereabouts of his transaction card. This may allow the consumer to prevent the card from being swiped through inappropriate devices. However, as contactless cards evolve, the classic skimming problem comes along with it when using static data. In fact, in a wireless environment the opportunity to skim magnetic stripe data is more prevalent. In a wireless environment, a potential skimmer need not physically possess the card to be skimmed nor have access to any of the physical equipment (e.g., POS terminal, communication lines, etc.) which is required for skimming in a wire based environment. A skimmer can, without the knowledge of the consumer or merchant, intercept the wireless transaction and copy the data being transmitted from the card to POS terminal.

To address the above problems, a dCVV or a dynamic card verification value can be used. For example, various systems and methods for generating dCVV's are discussed in U.S. patent application Ser. No. 10/642,878 entitled "Method and System for Generating a Dynamic Verification Value" filed on Aug. 18, 2003, and in U.S. patent application Ser. No. 11/764,376 entitled "On-Line Payment Transactions" filed on Jan. 29, 2008. Both of these applications are incorporated herein by reference in their entirely for all purposes.

In addition to generating a dCVV, a dCVV can be more effective for preventing fraud when it is securely received by a consumer. However, securely receiving and using a dCVV cannot overly interfere with a consumer's experience conducting a transaction. A consumer might not use the dCVV or a consumer might conduct fewer transactions if the inconvenience of receiving and using a dCVV is too great.

Embodiments of the invention are directed to addressing the above problems, and other problems, individually and collectively.

SUMMARY

Apparatuses, methods, and systems pertaining to the verification of portable consumer devices, particularly within the framework of 3-D Secure Services (e.g., Verified by Visa) are disclosed.

One exemplary embodiment of the invention is directed to a verification token for obtaining a device verification value for a portable consumer device. The exemplary verification token comprises a peripheral interface adapted to communicatively couple to a peripheral interface of a computer; a reader adapted to read identification information from portable consumer devices; a computer-readable medium; a data processor electrically coupled to the peripheral interface of the verification token, the reader, and the computer-readable medium; and a plurality of codes embodied on the computer-readable medium that direct the data processor to conduct various tasks. One code directs the data processor to receive identification information read from a portable consumer device by the reader. Another code directs the data processor to communicate with a computer by way of the peripheral interface of the verification token and to gain access to a networking facility of the computer. Another code directs the data processor to transmit by way of the networking facility of the computer at least a portion of the received identification information to an entity that can provide a 3-D Secure datum. And another code directs the data processor to receive, after transmitting said identification information 3-D Secure datum from the entity by way of the networking facility of the computer. The verification token may send the identification information to the computer in a number of forms, including: (1) unaltered form ("clear form"), (2) encrypted form, (3) hashed formed (e.g., encoded), (4) signed form, (5) or any combination of these forms. These forms may be generated by the portable consumer device, the verification token, the computer, or any combination thereof. In addition, the verification token and the entity (e.g., validation entity or gateway) may perform a mutual authentication process before the verification token sends the identification information. As used in the claims, the term "entity that can provide a 3-D secure datum" encompasses a validation entity, a gateway, or any combination thereof.

In a further embodiment of this, the token includes a code that directs the data processor to cause the received 3-D Secure datum to be inserted into a posting field of a Purchase Authentication Page sent to the computer by an entity of a 3-D secure system.

In some implementations of these exemplary embodiments, the above codes and identification information are stored independently of the computer and are secure from programs (including spyware and other malicious programs) running on the computer. In this implementation, the identification information is put in secure form (e.g., encrypted, hashed, signed, or combination thereof) by the verification token before the information is provided to the computer. Accordingly, securing the information is not dependent upon the security of the computer. Symmetric or asymmetric keys may be used for encryption and signing. The keys for a verification token may be unique with respect to other verification tokens. Keys, and particularly symmetric keys, may be based upon a uniquely assigned serial number for the verification token, which the token communicates to the validation entity and/or gateway. Both the verification token and the validation entity and/or gateway may have a shared secret on how to derive a key from the serial number, such as by manipulating and/or replacing selected digits of the serial number. A number of keys may be derived from the unique serial number using respective shared secrets. Thus, the challenge and response messages used in a mutual authentication process may be signed using respective keys derived from the serial number.

Another exemplary embodiment of the invention is directed to a method of obtaining a 3-D Secure datum for a portable consumer device. The exemplary method comprises establishing a communications link between a verification token and a computer, the computer having a networking facility; reading identification information from a portable consumer device into the verification token; transmitting the read identification information from the verification token to an entity that can provide a 3-D Secure datum (e.g., a validation entity, or a gateway in communication a validation entity) through the networking facility of the computer; and after transmitting the identification information, receiving, at the verification token, a 3-D Secure datum from the entity by way of the networking facility of the computer. The identification information may be transmitted from the token to the computer in a number of forms, including: (1) unaltered form ("clear form"), (2) encrypted form, (3) hashed formed (e.g., encoded), (4) signed form, (5) or any combination of these forms. These forms may be generated by the portable consumer device, the verification token, the computer, or any combination thereof. In addition, the method may include causing the verification token to authenticate the validation entity and/or gateway, such as through a mutual authentication process, before transmitting the identification information to the validation entity and/or gateway.

Another exemplary embodiment of the invention is directed to a validation entity that provides 3-D Secure datums to verification tokens. The exemplary validation entity comprises a computer-readable medium, a data processor electrically coupled to the computer-readable medium, and code embodied on the computer-readable medium that directs the data processor to perform various actions. The exemplary validation entity further comprises: code that directs a data processor to receive a request for a 3-D Secure datum for a portable consumer device associated with a user, the request comprising identification information pertaining to the portable consumer device; code that directs the data processor to apply at least one validation test pertaining to the received request; and code that directs the data processor to send, if the at least one validation test is passed, a 3-D Secure datum to a verification token associated with the user or to an entity configured to forward the 3-D Secure datum to the token.

Another exemplary embodiment of the invention is directed to a computer program product that provides 3-D Secure datums. The exemplary product comprises: code that directs a data processor to receive a request for a 3-D Secure datum for a portable consumer device associated with a user, the request comprising identification information pertaining to the portable consumer device; code that directs the data processor to apply at least one validation test pertaining to the received request; and code that directs the data processor to send, if the at least one validation test is passed, a 3-D Secure datum to a verification token associated with the user or to an entity configured to forward the 3-D Secure datum to the token.

In each of the embodiments described above, and in each of the embodiments described below, the communications between the computer and the validation entity may be facilitated by, and/or conveyed through, a gateway (e.g., a proxy server, server entity, etc.) that is disposed between the computer and the validation entity. The gateway may act as an intermediary between a plurality of verification tokens and their associated computers on the one side, and a plurality of validation entities on the other side. The gateway may receive one or more initial communications from a verification token (via a computer in communication with the token), and may determine from information in the one or more initial communications an appropriate one of the validation entities to use to fulfill the token's request for a 3-D Secure datum. For example, each verification token may be configured to operate with portable consumer devices issued by many different issuing banks or other such entities, and one or more of the validation entities may be configured to process requests from portable consumer devices issued by respective issuing banks or other such entities. The gateway may determine an appropriate one of validation entities to use based upon the identification information that the token read from a portable consumer device and sent to the gateway in an initial communication. In one implementation, the gateway redirects the token to the determined appropriate validation entity, with further communications occurring directly between the verification token and the appropriate validation entity. In another implementation, the communications between the verification token and the appropriate validation entity may be conveyed through the gateway (after the gateway has initially determined the identity of the appropriate validation entity based upon one or more initial communications with the token). This latter implementation may comprise relatively simple passing through of communications between the token and the appropriate validation entity with minimal processing by the gateway, or may comprise having the gateway virtually present itself as the appropriate validation entity to the verification token. Such virtual presentation may involve the gateway decrypting each message from the verification token, communicating with the appropriate validation entity to formulate a response to the token's message, and encrypting and sending a response message to the verification token. The gateway may also conduct one or more validation tests on behalf of the appropriate validation entity, particularly those related to validating the verification token. In this case, the gateway does not need to send to the appropriate validation entity those communications it receives from the token that pertain to validation tests that the gateway is handling. The gateway may be associated with, or operated by, a payment processing network.

Other exemplary embodiments of the invention are directed a computer program product that can be used by an exemplary Access Control Server to utilize 3-D Secure datums. The exemplary Access Control Server comprises: a computer-readable medium, a data processor electrically coupled to the computer-readable medium, and various code embodied on the computer-readable medium that directs the data processor to perform various actions. The exemplary computer program product comprises: code that directs the data processor to send a Purchase Authentication Page to a computer, the Purchase Authentication Page having a user response posting field to receive a response from a user; code that directs the data processor to receive a returned Purchase Authentication Page from the computer, the returned Purchase Authentication Page having a user response disposed in the user response posting field and a 3-D secure datum; code that directs the data processor to compare at least a portion of the received user response to a stored user response to make a first determination of whether a match exists; code that directs the data processor to compare the received 3-D secure datum to a stored 3-D secure to make a second determination of whether a match exists; and code that directs the data processor to generate a Payer Authentication Response message based on at least the first and second determinations.

Other exemplary embodiments of the invention are directed a computer program product that can be used by an exemplary 3-D Secure Gateway to manage the flow of messages among selected components of a 3-D Secure System.

To reiterate, the communications between the computer and the validation entity in each of the above embodiment may be conveyed through a server disposed between the computer and the validation entity, as described above.

Further embodiments and details regarding embodiments of the invention are provided below in the Detailed Description with reference to the Figures.

BRIEF DESCRIPTION OF THE DRAWINGS

FIG. 7 illustrates an exemplary implementation of a computer-readable memory that can be used by a verification token of the invention.

FIG. 8 illustrates exemplary methods of the invention that can be used by a verification token of the invention.

FIG. 9 illustrates exemplary methods of the invention that can be used by a user of a verification token of the invention.

FIG. 10 illustrates exemplary methods of the invention that can be used by a validation entity of the invention.

FIG. 13 illustrates an exemplary Access Control Server of the invention.

DETAILED DESCRIPTION

Embodiments disclosed herein pertain to the verification of portable consumer devices. A portable consumer device comprises a device that holds identification information pertaining to an account held by a user with another entity, which is typically an entity that holds, extends, or credits items of value to the user (e.g., monetary funds, credits, debts, etc.). Portable consumer devices encompass credit cards, charge cards, debit cards, bank cards, prepaid cards, access cards, security cards, and other cards that identify an account held by a user with another entity. The cards are capable of existing in both passive forms (e.g., card with a magnetic stripe) and active forms (e.g., integrated circuit cards, smartcards), and further encompass portable electronic devices that, in whole or in part, function as such cards. Such portable electronic devices can include memory cards, account tokens, fobs, stickers, cellular telephones (including near-field communications phone), keychain devices (such as the Speedpass™ commercially available from Exxon-Mobil Corp.), personal digital assistants, other mobile electronic devices, transponders, smart media, and pagers.

Figure 1:
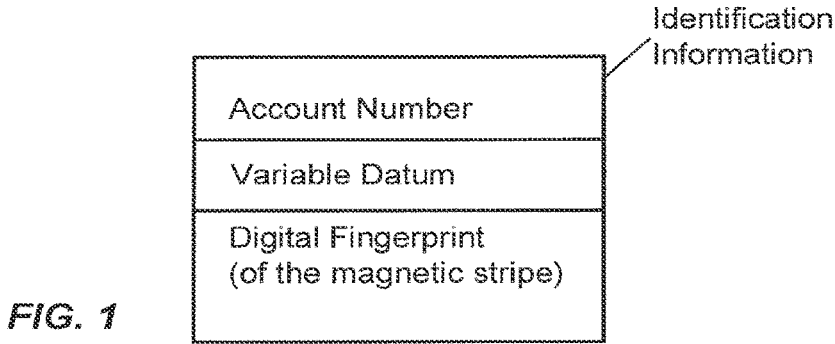
FIG. 1 illustrates an exemplary form of identification information held by (e.g., embodied on) a consumer portable.

The identification information held by (e.g., embodied on) a consumer portable device comprises at least an account number, and preferably at least one of the following: a digital fingerprint of a magnetic stripe of the portable consumer device, or a variable datum that varies each time the portable consumer device is read for its identification information, as illustrated in FIG. 1. The magnetic stripe carries at least the account number of the device. The account number identifies the consumer account within at least one payment processing network, and may comprise a primary account number (PAN); it may also comprise alphanumeric characters. The digital fingerprint of the magnetic stripe is representative of the distribution of magnetic particles that form the magnetic stripe, and is generated by a specialized card reader that samples the distribution of magnetic particles when the card is swiped. The variable datum typically comprises number characters, but may comprise alphanumeric characters. The values of the variable datum vary in a way that is known to both the portable consumer device and an authorization entity, the latter of which may be an issuing bank or a payment processing network. The variable datum encompasses the dynamic CVV ("dCVV") and CVC3 card verification values generated by smartcards (both the contact and contactless forms), as well as cryptograms generated by many smartcards (e.g., cryptogram 17). The datum values may be pre-stored in a computer-readable medium of the device and in a computer-readable medium of the authorization entity, or may be generated by each of the device and the entity as needed (e.g., "generated on the fly") using a confidential algorithm known to the device and the entity or by a known algorithm that uses confidential keys or confidential information. The variable datum may comprise, or may be accompanied by, a counter value that indicates the number of times the portable consumer device has generated the variable datum; the counter value may assist the authorization entity in retrieving the variable datum from the entity's computer-readable medium, or in generating the variable datum from the algorithm. However, a counter value is not necessary, and the authorization entity may deduce the number of times the device has generated the variable datum from the history of authorization requests made for the device, or an algorithm that does not require a counter may be used.

The identification information may further comprise the name of the account holder (e.g., the user), the expiration date of the card, service codes, and discretionary data. As an example, the identification information may include the conventional "payment data" stored on the tracks of the magnetic stripe of a conventional credit card (e.g., Track 1, Track 2, and/or Track 3).

The identification information of a portable consumer device is read by a reader, which is an electrical component that can read the identification information from a portable consumer device and provide the identification information to another electrical component. A reader may comprise one or more of the following: a magnetic stripe reader (which may include fingerprint sampling circuitry), a card contact reader, and a contactless reader, the latter of which is commonly known as an RFID reader (RFID being an acronym for radio-frequency identification). A reader for reading fingerprints of magnetic stripes may include a security module that comprises a proprietary algorithm that generates a digital fingerprint from the sampled fingerprint data and that encrypts the digital fingerprint with a nonce word using an encryption key. Readers are predominantly found at point-of-sales locations of merchants.

General Card Processing. A typical credit card transaction flow using a portable consumer device at a point-of-sales location is described next. The user's portable consumer device is provided to the user by or on behalf of an issuing bank. The issuing bank extends credit to the user, represents the user in credit card transactions, and pays merchants for the purchases made by the user. A user presents his or her portable consumer device to a merchant at a point-of-sales location to pay for an item or service. The merchant uses a reader to read the user's portable consumer device, and sends the identification information read from the device along with merchant's information and the transaction amount to an acquiring bank. The merchant may also read the portable consumer device for the printed card verification value (e.g., the CVV value printed on the backs of many credit cards), and may send this along as part of the transaction information sent to the acquiring bank. The acquiring bank represents, and vouches for, the merchant in credit card transactions. The acquiring bank forwards the transaction information to a payment processing network, such as VisaNet™, for authorization. A payment processing network generally encompasses a collection of one or more data processing server computers, subsystems, networks, and operations used to support and deliver one or more of the following: authorization services, exception file services, and clearing and settlement services. Payment processing networks encompass bank processing networks, credit-card payment processing network, etc. An exemplary payment processing network may include VisaNet™. Exemplary payment processing networks are able to process one or more of the following: credit-card transactions, debit-card transactions, and other types of commercial transactions. A payment processing network may use any suitable wired or wireless network, including the Internet, to communicate with acquiring banks and issuing banks.

Prior to the occurrence of a credit-card transaction, the payment processing network has established a protocol with each issuing bank on how the bank's transactions are to be authorized. In some cases, such as when the transaction amount is below a threshold value, the payment processing network will authorize the transaction based on information that it has about the user's account without consulting the issuing bank, and will accept the liability if the transaction turns out to be fraudulent. In other cases, such as when the transaction amount is above a threshold value, the payment processing network will forward the transaction information on to the issuing bank for verification and authorization. As part of the authorization process, the payment network or the issuing bank may verify the digital fingerprint or the varying datum provided by the portable consumer device. The digital fingerprint is stored at the issuing bank, and may be securely provided to the payment processing network by the issuing bank for storage and subsequent use. The algorithm for generating the varying datum is stored at the issuing bank, and may be securely provided to the payment processing network for storage and subsequent use. As also part of the authorization process, the payment network or the issuing bank may verify the printed card verification value (e.g., CVV), which is stored at the issuing bank, and may be securely provided by the issuing bank to the payment processing network for storage and subsequent use. The degree to which the payment processing network is involved in the verification of the consumer portable device and the authorization of the transaction is typically configured according to the wishes of the issuing bank. Once the transaction is authorized, the payment processing network sends an authorization indication (e.g., authorization code) to the acquiring bank, which sends the authorization indication on to the merchant. In order to reduce fraud, merchants are not allowed to store digital fingerprints, variable datum, and printed card verification values (CVVs) for more than 24 hours.

In the credit card industry, the authorization indication takes the form of an authorization code, which is five or six alphanumeric characters, by convention. It serves as proof to the merchant and the card holder that the issuing bank or payment processing network has authorized the transaction, and may be used by the merchant or the card holder as proof of authorization if the issuing bank later disputes the transaction, such as during settlement. The authorization code is not the same as the card verification value (or the dCVV2 value described below) since it does not have the same purpose as the card verification value, which is to serve as proof that the card was presented to the merchant when the transaction was conducted, and cannot be entered into the CVV field of a merchant POS terminal or merchant website (which only accepts 3 or 4 numeric digits). The authorization code is also not the same as a 3-D Secure datum since it does not have the same purpose as the 3-D Secure datum, which is to serve as proof that the card was presented to the merchant when the transaction was conducted.

When a user wishes to make an online purchase with a merchant over the Internet, the user types in the credit card account number, cardholder name, expiration date, and the printed card verification value into respective fields on the merchant's checkout page. In this case, the card's magnetic fingerprint or the card's variable datum is not used in the transaction, and they are not available to the payment processing network or the issuing bank to aid in verifying that the card was actually present during the transaction. Accordingly, there is a greater risk of fraud with such online purchases. For example, a store clerk can copy down the account information and printed verification value during a transaction at a point-of-sales location, and can later use the copied information to make an online purchase. As another example, a hacker can install spyware on the user's computer to intercept the account information and printed verification value, and use it to make fraudulent purchases at other online merchants. Other avenues of potential fraud exist. Embodiments of the invention are directed to mitigating these types of fraudulent activity.

Figure 2:
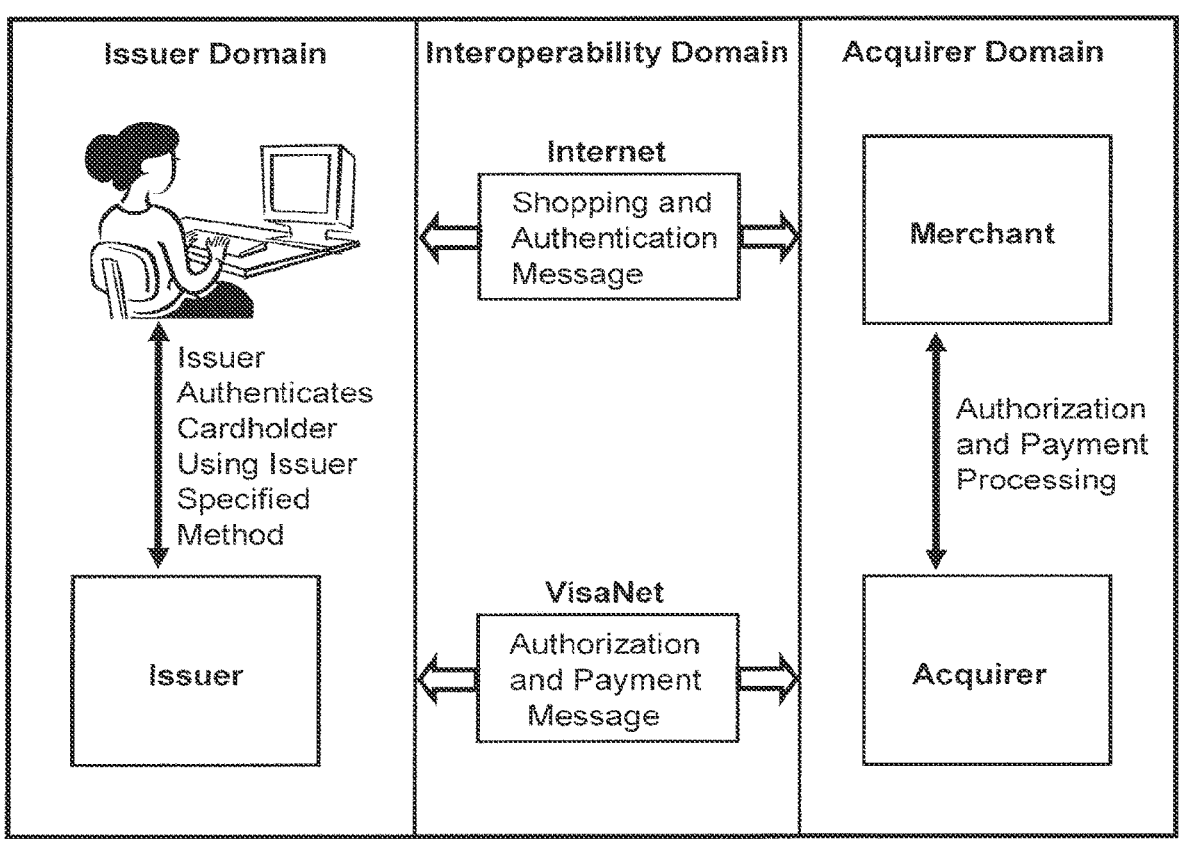
FIG. 2 provides an overview of the 3-D Secure System.

The Existing 3-D Secure System. To provide a more secure on-line transaction process, the 3-D Secure System ("Verified by Visa" system) has been previously developed and deployed. This system defines a three domain (3-D) model within which the entities involved in 3-D Secure System ("Verified by Visa" system) work together to authenticate and authorize an online payment transaction. Referring to FIG. 2, the 3-D model divides payment systems as follows: (1) Issuer Domain-Systems and functions of the issuer and its customers (cardholders); (2) Acquirer Domain—Systems and functions of the acquirer and its customers (merchants); and (3) Interoperability Domain— Systems, functions, and messages that allow Issuer Domain systems and Acquirer Domain systems to interoperate worldwide. Third parties operate many of the systems in the Issuer and Acquirer Domains on behalf of Visa members in accordance with Visa nonmember agent requirements. FIG. 2 provides a simple illustration of the participants in their associated domains. The Three Domain Model enables issuers to authenticate their cardholders during online purchases. Acquirers and merchants have a flexible framework that can embrace a variety of technical approaches. Interoperability between the issuer and acquirer is achieved through the use of a common protocol and the Visa interoperability services.

The cardholder 1 shops online, providing the account holder name, card number, and expiration date on the Merchant Checkout page, either directly or by way of software such as a digital wallet, and then indicates readiness to finalize the transaction. In response, a software module at the Merchant website 20, called a Merchant Server Plug-in (MPI), contacts a Directory Server in the Interoperability Domain to see if the card number can be authenticated through the 3-D Secure System. If so, the Merchant Server Plug-in opens a communication frame or window on the cardholder's browser on the cardholder's computer 10, and directs the communication frame or window to contact an Access Control Server (ACS) associated with the Issuer 60. (The MPI is in the Acquirer domain, and the ACS is in the Issuer domain.) The direction to the communication frame or window may comprise a URL to the ACS, along with a parameter or datum that the ACS can use to ascertain the account number (PAN) of the cardholder's card. The Access Control Server takes control of the communication frame or window, and presents a Purchase Authentication Page to the cardholder 1, which requests information, such as a password or an answer to a question, needed to authenticate the cardholder. The cardholder 1 provides information needed for authentication, and the Access Control Server conducts an authentication procedure, which may include testing the received information against information stored at the Access Control Server. The Access Control Server then sends a message to the Merchant Server Plug-in (MPI) indicating whether or not the cardholder could be authenticated. In this manner, the cardholder's computer browser acts as a conduit to transport messages between the Merchant Server Plug-in (in the Acquirer Domain) and the Access Control Server (in the Issuer Domain). If the cardholder 1 is indicated as being authenticated, the Merchant 20 may proceed to process the transaction under the 3-D Secure System program. If the cardholder 1 is not indicated as being authenticated, the Merchant 20 may decline the transaction, or select another authorization route.

An issuer 60 in the 3-D Secure service system is a Visa member financial institution that: (1) enters into a contractual relationship with the cardholder for issuance of one or more Visa cards; (2) determines the cardholder's eligibility to participate in the 3-D Secure service; (3) defines card number ranges eligible to participate in the 3-D Secure service; (4) provides data about those card number ranges to the Directory Server; and (5) performs enrollment of the cardholder for each payment card account (via the Access Control Server, a separate Enrollment Server, or manually).

The Access Control Server (ACS) performs the following tasks (functions): (1) to verify whether 3-D Secure authentication (or proof of attempted authentication) is available for a particular card number; and (2) to authenticate the cardholder for a specific transaction or to provide proof of attempted authentication when authentication is not available. Although these functions are described as belonging to a single logical ACS, implementations may divide the processing by function or by other characteristics such as card number range among multiple physical servers.

The Acquirer Domain has the Merchant 20, Merchant Server Plug-in (MPI), and the Acquiring Bank 50 (the Acquirer). Existing merchant software handles the shopping experience, obtains the card number, and then invokes the Merchant Server Plug-in (MPI) to conduct payment authentication. After payment authentication, the merchant software may submit an authorization request to the acquirer 50, if appropriate. The Merchant Server Plug-in (MPI) creates and processes payment authentication messages, then returns control to the merchant software. As part of processing the authentication response message from the issuer 60, the MPI may validate the digital signature in the message; alternatively, a separate server, the acquirer 50, or a third party may perform this function. The Acquirer 50 is a Visa member financial institution that: (1) enters into a contractual relationship with a merchant 20 for purposes of accepting Visa cards; and (2) determines the merchant's eligibility to participate in the 3-D Secure service. Following payment authentication, the acquirer 50 performs its traditional role: (1) receives authorization requests from the merchant 20; (2) forwards them to an authorization system/payment processing system 70 (such as provided by VisaNet); (3) provides authorization responses to the merchant 20; and (4) submits the completed transaction to the settlement system (such as provided by VisaNet).

The Interoperability Domain has a Directory Server, a Commercial Certificate Authority, a Certificate Authority, a Authentication History Server, and a payment processing network 70 (such as VisaNet). The Directory Server is operated by a credit processing company or association (such as Visa, MasterCard, etc.) and performs the following actions: (1) receives messages from merchants 20 querying a specific card number; (2) determines whether the card number is in a participating card range; (3) directs the request for cardholder authentication to the appropriate Access Control Server (ACS) (which may or may not provide attempts functionality) or responds directly to the merchant 20; (4) receives the response from the ACS indicating whether payment authentication (or proof of attempted authentication) is available for the cardholder account; and (5) forwards the response to the merchant 20. The Commercial Certificate Authority generates selected certificates for the use of 3-D Secure entities, including SSL/TLS client and server certificates. The Certificate Authority generates selected certificates for the use of 3-D Secure entities, including: (1) Signing certificates; and (2) Root certificates. The Authentication History Server, which may be operated by a credit processing company or association (such as Visa, MasterCard, etc.), performs the following actions: (1) receives a message from the Access Control Server (ACS) for each attempted payment authentication (whether or not authentication was successful); and (2) stores the records received. A copy of the data stored by the Authentication History Server is available to acquirers 50 and issuers 60 in case of disputes. Following payment authentication, the payment processing network 70 performs its traditional role: (1) receives authorization requests from the acquirer 50; (2) forwards them to the issuer 60; (3) provides responses from the issuer 60 to the acquirer 50; and (4) provides clearing and settlement services to the acquirer 50 and issuer 60.

The Payment Authentication Process in the conventional 3-D Secure system is described next, with a high-level narrative outline of the major actions in a 3-D Secure payment authentication. When checking out at the conclusion of shopping, the cardholder 1 supplies billing and payment card information, or uses merchant capabilities or software such as a digital wallet to do this. When the cardholder 1 indicates the decision to buy, Merchant Server Plug-in (MPI) software is activated. MPI software may be located at the merchant shopping site 20, at the acquirer 50, or at a third-party processor site. The MPI sends a message to the Directory Server to determine whether authentication services are available for the cardholder 1 (the cardholder has previously enrolled in the 3-D Secure system). If the response indicates that the cardholder 1 is enrolled and authentication is available or if proof of authentication attempt is available, the response message instructs the MPI on how to contact the Access Control Server (ACS) of the associated issuer 60. If the account number of the cardholder 1 falls outside of participating card ranges, the Directory Server returns the transaction to the merchant's commerce server 20 via the MPI and the merchant proceeds with a standard authorization request.

If the cardholder 1 is enrolled in the 3-D Secure system service, the MPI sends an authentication request to the Access Control Server (ACS) of the associated issuer 60. This is usually sent via the cardholder's browser. The Access Control Server authenticates the cardholder 1 by causing an authentication dialog window or frame to be displayed to the cardholder 1 asking for a password or an answer to a question. The user provides the password or answer, and returns it to the Access Control Server, which verifies the password or answer. The Access Control Server formats and digitally signs an authentication response (the authentication response may be derived from the authentication request), then returns it to the Merchant Server Plug-in (MPI). If the authentication response indicates successful authentication or proof of authentication attempt, the merchant 20 forwards an authorization request with the requisite data to its acquirer 50 or the acquirer's processor for submission into the payment processing network 70, such as VisaNet.

Figure 3:
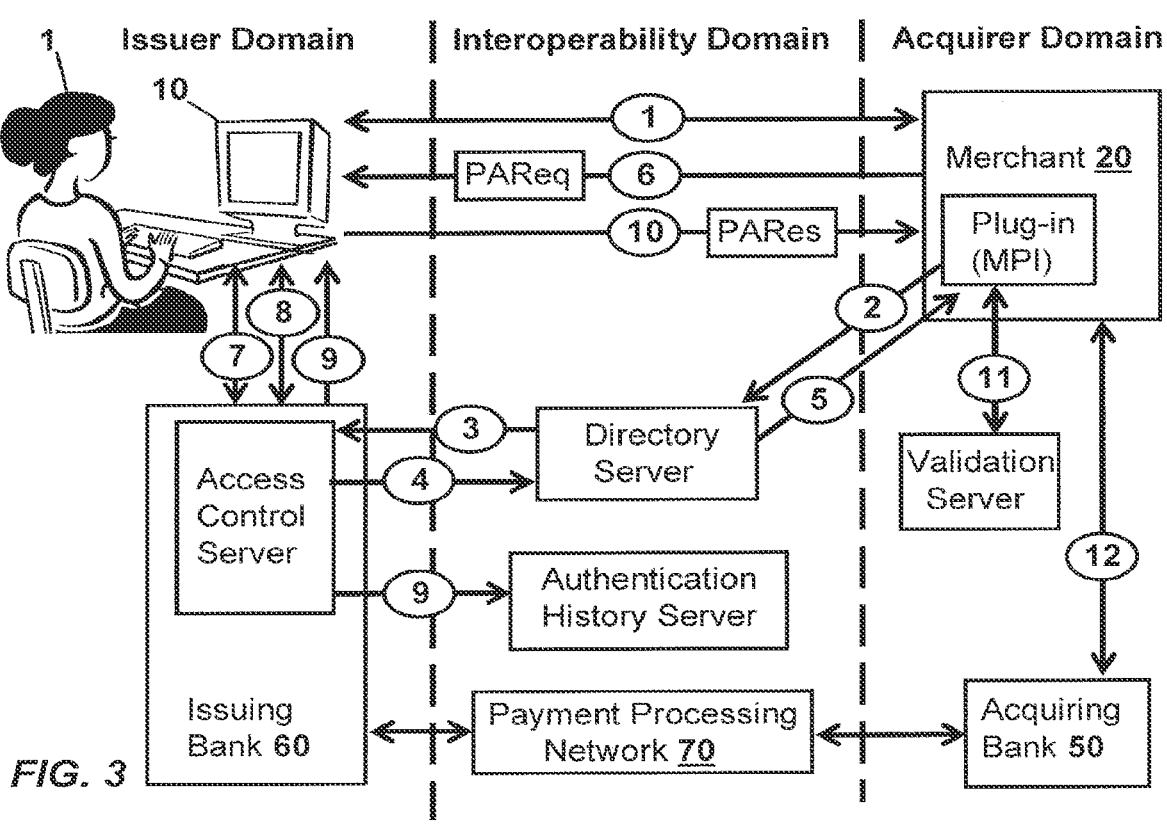
FIG. 3 illustrates exemplary communication flows in a conventional 3-D Secure System.

The system is illustrated in further detail with the following 12 actions shown in FIG. 3. In action #1, the cardholder (user) 1 browses at a merchant site 20, selects items, and then finalizes the purchase. At this point, the merchant 20 has all the necessary data to process the transaction, including card number (PAN) and expiration date, and information about the cardholder's user device information (e.g., information about the computing device that the cardholder is using to make the transaction). In action #2, the Merchant Server Plug-in (MPI) sends the device's card number (account number, PAN), and user device information if applicable, to the Directory Server. In action #3, the Directory Server queries the appropriate Access Control Server (ACS) to determine whether authentication (or proof of attempted authentication) is available for the card number (PAN) and device type (in other words, determines whether device 5 participates in the 3-D Secure System). If an appropriate ACS is not available, the Directory Server creates a response for the MPI, and processing continues with action #5, described below. In action #4, the Access Control Server (ACS) responds to the Directory Server, indicating whether authentication (or proof of attempted authentication) is available for the card number. In action #5, the Directory Server forwards the ACS response (or its own response) to the Merchant Server Plug-in (MPI). If neither authentication nor proof of attempted authentication is available, the merchant 20, acquirer 50, or payment processing network 70 submits a traditional authorization request, and the remaining below actions are not performed. If the above services are available for the card, the Directory Server provides the Merchant Server Plug-in (MPI) with a URL of the Access Control Server (ACS) to which the MPI can contact the ACS for authentication, which is done in the next action.

In action #6, the MPI sends a Payer Authentication Request (PAReq) to the Access Control Server (ACS) via the cardholder's computing device using the URL for the ACS provided to it by the Directory Server. The PAReq message requests the issuer to authenticate its cardholder, and contains the cardholder information (e.g., PAN, expiration date, etc.), merchant information, and transaction-specific information necessary to do so. As part of sending the PAReq, the Merchant Server Plug-in can open a communication frame or window on the cardholder's browser, and can direct the communication frame or window to contact an Access Control Server (ACS) associated with the Issuer and provide the PAReq message. Other contact approaches are possible using the XML language. In action #7, the Access Control Server receives the PAReq, and takes control of the communication frame or window, and presents a Purchase Authentication Page to the cardholder, which requests information, such as a password or an answer to a question, needed to authenticate the cardholder. In action #8, the Access Control Server (ACS) receives back a filled-out Purchase Authentication Page from the cardholder 1, and either authenticates the cardholder 1 by using processes applicable to the card number (password, chip, PIN, etc.), or if attempts ACS functionality is available, creates the proof of authentication attempt. The Access Control Server then formats a Payer Authentication Response (PARes) message with the appropriate values and signs it. In action #9, the Access Control Server returns the PARes to the Merchant Server Plug-in (MPI) via the cardholder's computing device. The Access Control Server sends selected data to the Authentication History Server (AHS). In action #10, the MPI receives the Payer Authentication Response (PARes). In action #11, the MPI validates the PARes signature (either by performing the validation itself or by passing the message to a separate Validation Server). In action #12, if appropriate, the merchant 20 proceeds with the authorization exchange with its acquirer 50. Following action #12, the acquirer 50 processes the authorization request with the payment processing network 70 and returns the authorization response to the merchant 20.

Figure 4:
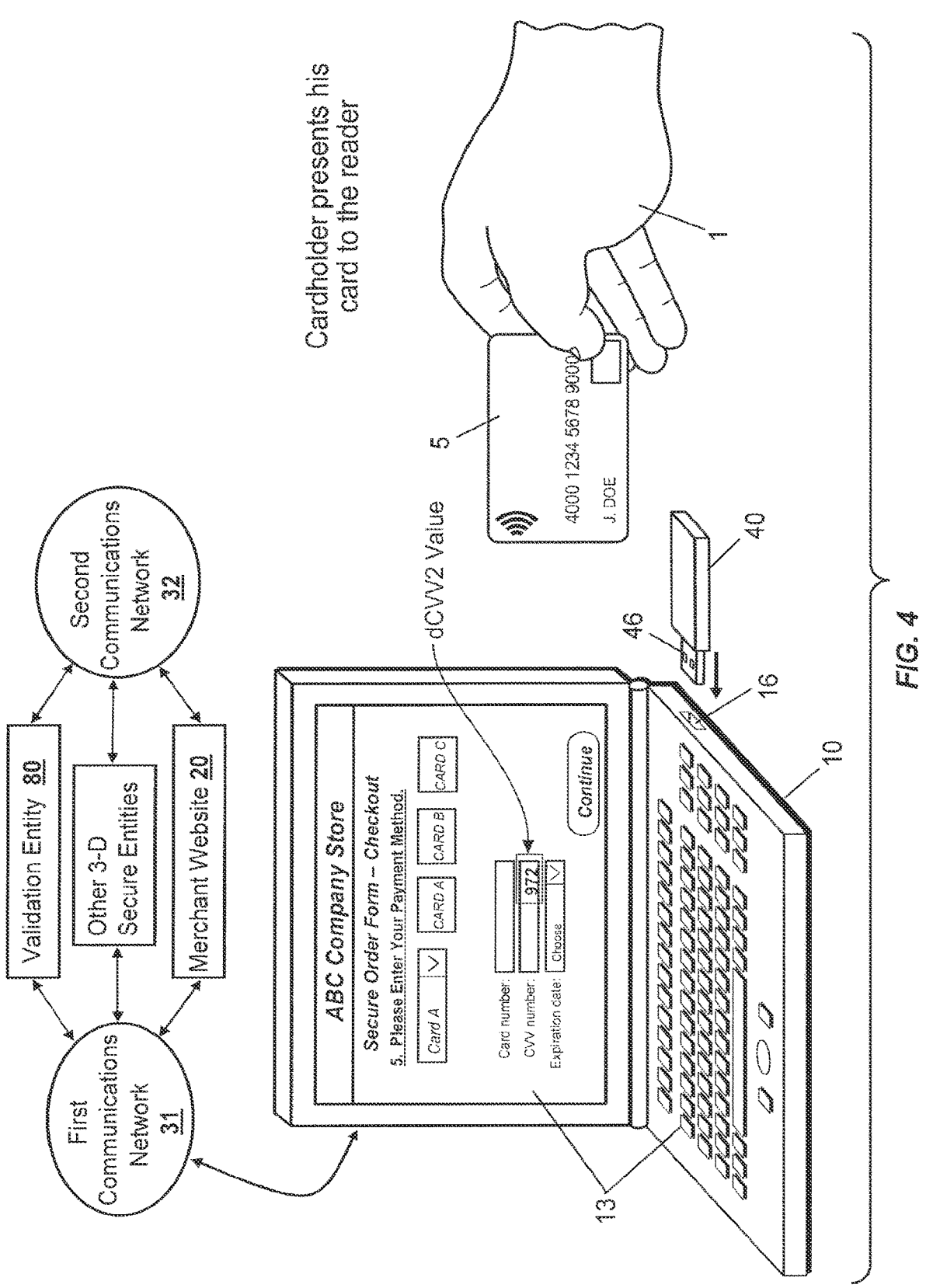
FIG. 4 illustrates exemplary embodiments of the invention.

Integration of Card Presentation and Verification into the 3-D Secure System. The present invention provides the ability to verify that a personal consumer device (e.g., credit card) is present during an online transaction under the 3-D secure system, and to provide the issuing bank with an assurance that the card was presented during the transaction by the user. Referring to FIG. 4, a user 1 is provided with a verification token 40 that is communicatively coupled to the user's computer 10, such as through a USB port 16 or a Bluetooth wireless connection. The verification token 40 may have a peripheral interface 46 adapted to communicatively couple to a peripheral interface 16 of computer 10. Verification token 40 is capable of reading one of the user's portable consumer devices 5 (e.g., credit card) for the device's identification information (shown in FIG. 1), of preferably reading merchant and/or transaction information from a web page on the user's computer 10, and of securely conveying the read information to a validation entity 80 via a first communications network 31 using a networking facility of the user's computer 10 that is coupled to network 31. Both the user's computer 10 and validation entity 80 are coupled to a first communications network 31, which is described below in greater detail and which may include the Internet. Validation entity 80 performs one or more validation tests on read information that it has received, and if the one or more validation tests are passed, it sends a 3-D secure datum to verification token 40 via first communications network 31 and the networking facility of the user's computer 10. The 3-D secure datum may comprise a sequence of binary digit values, preferably selected to be difficult for a fraudster to guess, and may represent number, alphanumerical character sequence, a cryptogram, or a signed message. The 3-D secure datum may be generated by the Access Control Server (ACS) of the 3-D secure system (previously described with reference to FIG. 3) and provided to validation entity 80, or it may be generated by validation entity 80 and provided to the Access Control Server. The value of the 3-D secure datum may depend upon one or more of the following: the identification information of the user's portable consumer device 5, the identity of the merchant 20, the transaction amount, the day of the transaction, the time of the transaction, a serial number of the Token 40, the IP address or other information about the user's computer 10. The 3-D secure datum is not an authorization code, and does not serve as proof that the issuing bank 60 has authorized the transaction.

Verification token 40 then inserts the received 3-D secure datum into the Purchase Authentication Page in step #7 of the 3-D Secure System process described above with reference to FIG. 3. Then, in step #8, the Access Control Server (ACS) receives the Purchase Authentication with the 3-D secure datum provided by token 40, and compares it to the 3-D secure datum that it previously gave to validation entity 80 or previously received from validation entity 80. If the two versions of the 3-D secure datum match, then the ACS has a degree of assurance, based on the validation tests performed by validation entity 80, that the user's portable consumer device 5 was physically presented to token 40 during the transaction. Validation entity 80 and the merchant website may communication with the Access Control Server and other entities of the 3-D Secure System through a second communications network 32, which may include the Internet and/or one or more private networks (thus, networks 31 and 32 may have some overlap or may be the same, depending upon implementation).

At the time the verification token 40 and validation entity 80 seek to obtain the 3-D secure datum, neither know whether merchant 20 is a participant in the 3-D secure system. As another option for verifying that the user's consumer portable device 5 was presented as part of the transaction, validation entity 80 may be further configured to provide a dynamic card verification value (called a dCVV2 value herein) to verification token 40, and verification token 40 may be further configured to insert the dCVV2 value into the card verification value (CVV) field of the merchant's checkout page, or may be configured to present the dCVV2 value to user 1 so that user 1 can enter the dCVV2 value into the CVV field. Validation entity 80 may provide the dCVV2 value to a payment processing network or the issuing bank, which may then check the value against the dCVV2 value received from the merchant to verify that the user's portable consumer device was physically presented to token 40 during the transaction.

Figure 5:
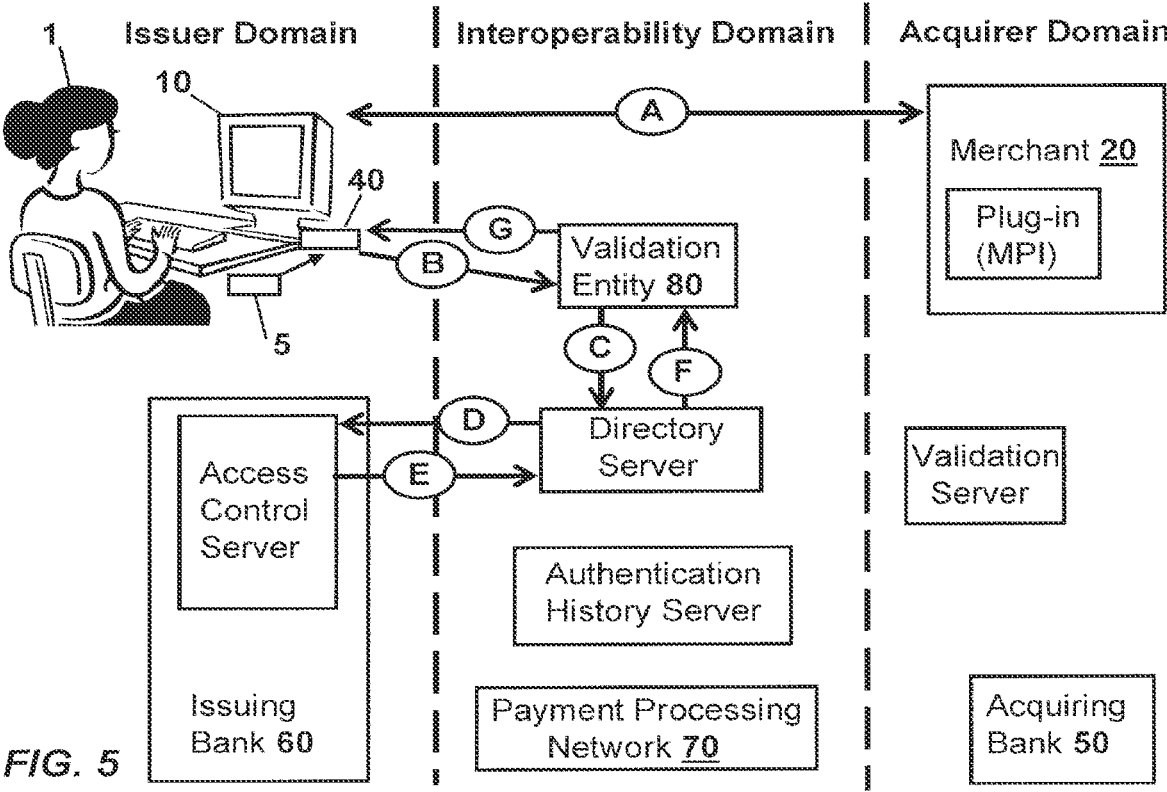
FIG. 5 illustrates exemplary communication flows in exemplary embodiments of the invention.

Given that that broad outline of the processes and entities involved, a more detailed description is given next. The 3-D secure system described in FIG. 3 may be modified to utilize the services provided by verification token 40 and validation entity 80 in the following exemplary manner. In the modified 3-D secure system, the following actions # A-# H are performed prior to action #1 of the 3-D Secure system previously described in FIG. 3. In action # A, the cardholder browses at a merchant site (merchant 20), selects items, and then presents his portable consumer device 5 to token 40 while at the merchant's checkout page. This action is illustrated in FIGS. 4 and 5. In response, token 40 reads the identification information from the device, optionally reads merchant and/or transaction information from payment page of the merchant's site, and sends the collected information as a validation request to validation entity 80 over first communications network 31. This action is illustrated as action # B in FIG. 5. The validation request preferably includes the account number of device 5 (e.g, PAN), a variable datum or digital fingerprint (as described above in FIG. 1), preferably a merchant identifier that identifies the merchant in some way, and preferably a transaction identifier that identifies the transaction in same way, such as transaction amount. The validation request may also contain information about the user's computer, such as CPU serial number, and/or may contain the serial number of the token. These pieces of information may, however, be communicated to validation entity 80 before the validation request is made.

In response, the validation entity 80 compares the received identification information (e.g., PAN and variable datum or fingerprint) with its records for portable consumer device 5 to obtain a degree of assurance that device 5 was actually presented to token 40. If a sufficient degree of assurance is obtained, validation entity 80 sends a message to the Directory Server with the account number (PAN) of device 5, the merchant identifier and/or the transaction identifier, and optionally a 3-D Secure datum, as described above. This is illustrated as action # C in FIG. 5. (Action # C may before or occur after validation entity 80 has performed one or more validation tests, which are described below in greater detail.) In action # D, the Directory Server identifies the Access Control Server (ACS) for the PAN received from validation entity 80, and forwards the account number (PAN), the merchant identifier and/or the transaction identifier, and optionally a 3-D Secure datum to the identified Access Control Server (ACS). The forwarded message may include an indication that information from the portable consumer device 5 has been collected by token 40, and that token 40 is present with the user's computer 10. In action # E, the Access Control Server (ACS) responds to the Directory Server by sending an indication of whether the card number is participating in the 3-D Secure service (the "participation indication"), and by sending a 3-D Secure datum if one was not previously provided by validation entity 80. The Access Control Server also saves the account number (PAN), the merchant identifier and/or the transaction identifier, the indication of token 40 being present in computer 10, and the 3-D Secure datum in a computer record for later reference when modified action #8 is performed, as described below.

In action # F, the Directory Server forwards to validation entity 80 the participation indication and the 3-D Secure datum, if the datum was not previously provided by validation entity 80. In action # G, validation entity 80 sends the dCVV2 value, 3-D Secure participation indication, and the 3-D Secure datum to verification token 40, which receives these items. The participation indication may be incorporated into the 3-D Secure datum by having one or more selected values, such as a NULL value, indicate non-participation, and all other values indicate participation. In action # H, verification token 40 fills in the merchant checkout page with the payment information and dCVV2 value (if appropriate), as described below in greater detail. If a CVV field is present, token 40 fills the field in with the dCVV2 value. (At this point, token 40 may not know whether the merchant is a participating member of the 3-D Secure system.)

The actions #1-#12 previously described with reference to FIG. 3 may now take place, with the following modifications to Actions #7 and #8. In modified action #7, the Access Control Server receives the PAReq, and takes control of the communication frame or window, as described above, and presents a Purchase Authentication Page to the cardholder. The Purchase Authentication Page is modified to include a posting field to receive a 3-D Secure datum from token 40. In one implementation, the posting field is hidden and not visible to user 1. Validation token 40 is further modified to include instructions that direct its processor to monitor the user's browser for the presences of the Purchase Authentication Page, and to insert the 3-D Secure datum received from validation entity 80 into the posting field present in the Purchase Authentication Page. The user then enters his password or gives the answer to a question, and submits the filled-out Purchase Authentication Page to the Access Control Server.

In modified action #8, the Access Control Server (ACS) receives the back a filled-out Purchase Authentication Page from computer 10, and authenticates user 1 by comparing the 3-D Secure datum provided in the posting field with the earlier 3-D Secure datum that it provided to, or received from, validation entity 80. The Access Control Server can find the earlier 3-D Secure datum from the computer record that it stored in the above-described action # E. (The computer record has the account number, the merchant identifier and/or the transaction identifier, and the 3-D Secure datum; the computer record and other such records for other cards can be stored according to account number, and the Access Control Server can find the record by a search according to account number). If the two 3-D Secure datums match, then the Access Control Server gains a high degree of assurance that consumer portable device 5 was in the possession of user 1 (the cardholder/shopper) at the time the purchase transaction was made. The Access Control Server also may use its standard verification approach using the password or answer entered by user 1 (the cardholder/shopper) to gain additional assurance. If the two 3-D Secure datums do not match, the Access Control Server may still use its standard verification approach, or may decide to not authenticate the cardholder.

In the above described-embodiments, validation token 40 enters the 3-D Secure datum into a dedicated posting filed of the Purchase Authentication Page, where the positing field is preferable hidden. However, the provision of the 3-D Secure datum to the Access Control Server by Token 40 can be done in other ways, called herein "variations." These variations are briefly described here, and more fully described below after Token 40 is fully described. In a first variation, token 40 enters the 3-D secure datum into the password field of the Purchase Authentication Page rather than a dedicated posting field. In a second variation, token 40 appends the 3-D secure datum to the password that the user has entered into the password field of the Purchase Authentication Page. In a third variation, the Purchase Authentication Page is initially presented to the user in hidden form (e.g., not visible on the computer screen to the user), and token 40 returns the Purchase Authentication Page to the Access Control Server with the 3-D Secure datum placed in a dedicate posting field or an existing field, such as the password field, and without the user having to enter the password (e.g., returns the Purchase Authentication Page to the Access Control Server regardless of whether the user response positing field is filled in by the user). If token 40 does not receive a valid 3-D Secure datum, it changes the display properties of the Purchase Authentication Page to make it visible to the user, and leaves it to the user to provide the password and submit the filled-in Purchase Authentication Page to the Access Control Server. In a fourth variation, the Access Control Server performs a fraud risk assessment of the transaction based on the information that the Directory Server has provided about the transaction. If the assessed risk of fraud is below a selected threshold, the Access Control Server presents the Purchase Authentication Page in hidden form to the user (e.g., invisible to the user) and allows token 40 to process the Purchase Authentication Page as it does in the third variation. If the assessed risk of fraud is above the selected threshold, Access Control Server presents the Purchase Authentication Page in visible form to the user, and token 40 provides the 3-D Secure datum to the Purchase Authentication Page but defers to the user to submit the Page to the Access Control Server. As indicated below, the Access Control Server can comprise codes that direct its data processor to perform the above tasks.

Figure 6:
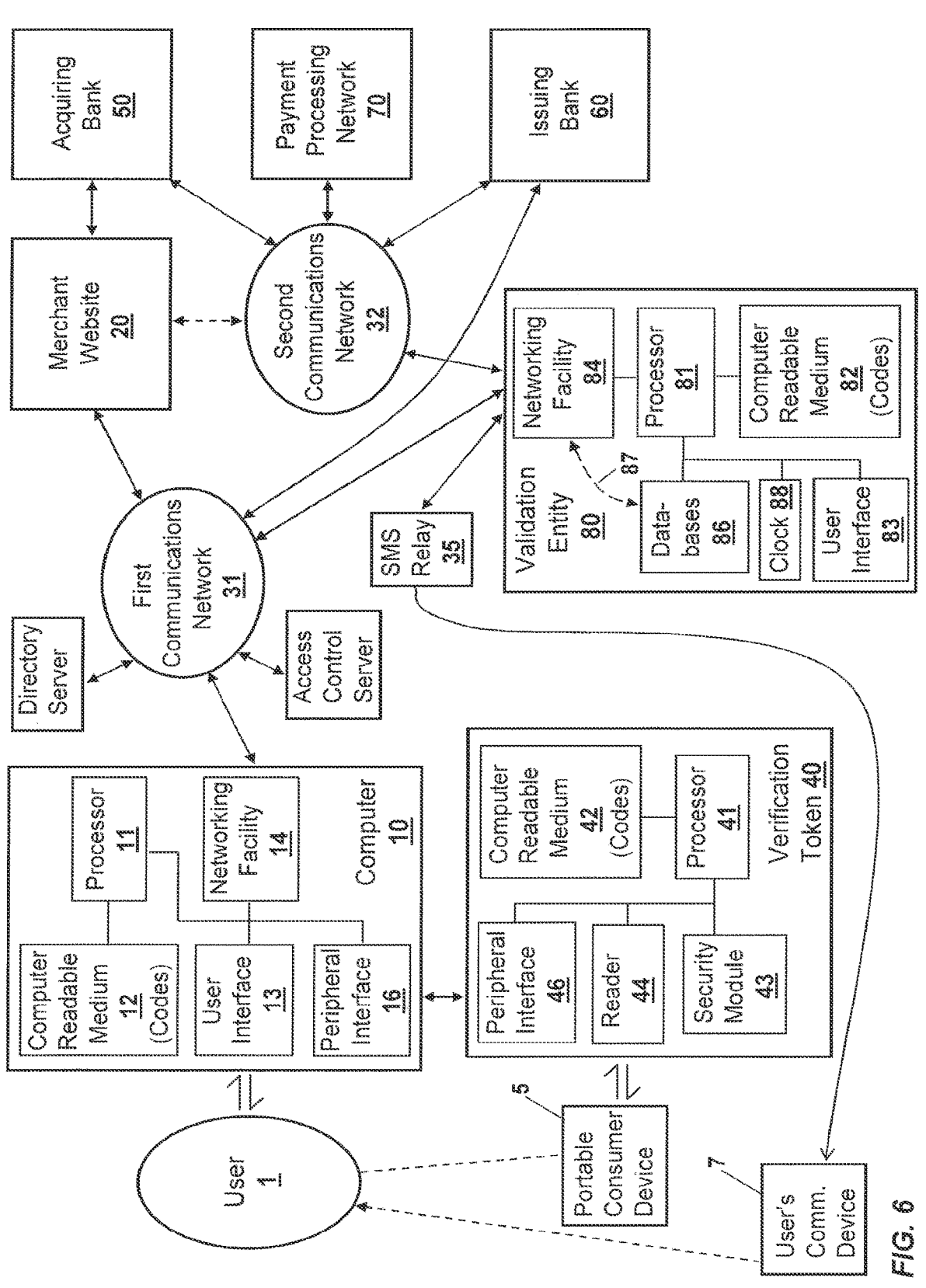
FIG. 6 illustrates exemplary embodiments of the invention.

Token 40, the user's computer 10, and validation entity 80 are described in greater detail with reference to FIG. 6. Shown in the figure are icons for a user 1, the user's portable consumer device 5, the user's communication device 7 (such as a cell phone), the user's computer 10, the merchant's website 20, and the first communications network 31 that enables the user's computer and the merchant's website to communicate with one another. The first communications network 31 may include the Internet, a telecommunications network (e.g., a wireless network, cell phone network, a telephone network, a cable network, or any combination thereof), a wide area network (WAN), a local area network (LAN), a home router or gateway coupled to one of the above networks, or any combination of the above. Also shown in FIG. 6 is acquiring bank 50 for the merchant, issuing bank 60 for the portable consumer device 5, a payment processing network 70, and second communications network 32 that enables the payment processing network 70 to communicate with each of the banks 50 and 60. The second communications network 32 may comprise the Internet (and therefore may overlap and share facilities with the first communications network 31), or may comprise one or more private networks, or combination of one or more private networks with the Internet. A private network may comprise a telecommunications network, a wide area network (WAN), a local area network (LAN), or any combination thereof. In some instances, the first and second communications networks 31 and 32 may be the same (such as a network using the Internet as the backbone). A communications network generally comprises a network of one or more communications links and two or more nodes that pass messages from one part of the network to another part. Each node comprises one or more pieces of electrical machinery, and each link may comprise one or more of the following: optical fibers, optical links, radio links, electrical wires. The components described so far are, for the most part, conventional and arranged in a conventional manner.

FIG. 6 illustrates a verification token 40 according to one embodiment of the invention, and a validation entity 80 according to another embodiment of the invention. These components, and the interactions between them and between other components shown in FIG. 6 are novel, and do not form part of the prior art. Verification token 40 has a reader 44 to read portable consumer device 5, and a peripheral interface 46 adapted to communicatively couple to a peripheral interface 16 of computer 10. Reader 46 may comprise one or more of the following: a magnetic stripe reader (which may include fingerprint sampling circuitry and security module), a card contact reader, and a contactless reader, the latter of which is commonly known as an RFID reader. Verification token 40 is configured to communicate to validation entity 80 by way of a networking facility 14 of computer 10. After user 1 fills a purchase cart on merchant website 20, the user may bring up the merchant's checkout page to provide the user's payment information and commit to the purchase. At this point, user 1 may present his or her portable consumer device 5 to a card reader 44 of verification token 40 to provide the device's identification information, as described above. The verification token 40 reads the identification information from the user's portable consumer device 5, and sends at least a portion of the identification information in a secure manner (e.g., in an encrypted form) to validation entity 80 to request 3-D secure datum and optionally a device verification value for the portable consumer device 5. For the sake of clarity, and without loss of generality, we can refer to the device verification value provided by validation entity 80 as a "dCVV2" value, so as to distinguish it from the dynamic "CVC3" or "dCVV" values generated by smartcards, which were described above, and from the CVV field found on the merchant's checkout page. Validation entity 80 applies one or more validation tests to verification token 40 and/or the identification information to obtain a level of confidence that the portable consumer device 5 was actually presented to verification token 40 to request the dCVV2 value. When the one or more validation tests are passed, and preferably with no tests being failed, validation entity 80 sends a 3-D secure datum and optionally a dCVV2 value to verification token 40.

In cases where the user's portable consumer device 5 generates a cryptogram (e.g., cryptogram 17), card reader 44 provides the user's device 5 with "dummy" transaction information that is known to both token 40 and validation entity 80. The dummy transaction information may include a static transaction amount and a static merchant name, depending upon the type of cryptogram to be generated. The dummy transaction information may be different for each token 40. The user's device 5 uses the transaction information to generate the cryptogram. The user's device typically has a counter value, often called the Application Transaction Counter (ATC), which is included in the cryptogram computation, and which is incremented with each transaction. The counter reduces the chances of a fraudster guessing the cryptogram value. In some cases, user's device 5 may need a PIN to activate the computation of the cryptogram. For this, token 40 may display a pop-up window on the user's computer 10 that requests the entry of a PIN by the user, and token 40 may provide the pin to the user's device 5 along with the request for the cryptogram.

A first validation test that validation entity 80 may apply pertains to verifying that verification token 40 is authentic. For this, verification token 40 may send its serial number to validation entity 80, along with a message encrypted by an encryption key, with the message and encryption key being known to token 40 and entity 80 (but not the general public), and with the encryption key further being uniquely assigned to the token's serial number (uniquely assigned to the token). Validation entity 80 has a database of serial numbers and corresponding uniquely assigned encryption keys, and can validate that verification token 40 has sent the correct message for the serial number. Validation of the correct message serves to authenticate verification token 40. If the first validation test is failed, validation entity 80 may record the serial number of the failed token 40 and the source IP address from which the failed token 40 made the request in a database (such as a database 86 described below). A second validation test that validation entity 80 may apply pertains to verifying that verification token 40 has not been involved in fraudulent transactions. For this, validation entity 80 may also have a database that tracks the serial numbers of verification tokens that have been used in fraudulent activities, and may check the serial number of verification token 40 against this database. The second validation test may further comprise checking the token serial number and/or the IP address from which an incoming dCVV2 request was originated (the source IP address of the message) against the previously-described database that stores token serial numbers and IP addresses associated with requests that have failed the first validation test. If a token serial number or IP address is found in this database, the second validation test may be deemed to have been failed. Checking the token serial numbers and/or the IP addresses in this way prevents replay attacks by fraudsters. It may be appreciated that the database of serial numbers of tokens that failed the first validation test may be combined with the database of serial numbers of tokens involved in fraudulent activities. This combined database, as well as the two other databases, may be generically termed as a database of serial numbers of suspicious tokens. If the first and second validation tests are passed (e.g., encrypted serial number matches value in database, and no fraudulent use and/or suspicious activity by the token), validation entity 80 may send a dCVV2 value to verification token 40, or may apply additional validation tests before sending a dCVV2 value. Such an additional validation test pertains to checking the digital fingerprint or variable datum of portable consumer device 5. Validation entity 80 may have a stored record of the digital fingerprint of portable consumer device 5 or the algorithm for generating the variable datum of device 5, and can validate the received identification information by comparing the fingerprint or variable datum provided in the received information with the fingerprint or variable datum that it obtains from its stored record for device 5. If the additional validation test is passed, validation entity 80 may send a 3D-secure datum and optionally a dCVV2 value to verification token 40. The additional validation test may be performed in addition to, or instead of, the previously described validation tests.

The dCVV2 value provided by validation entity 80 comprises a variable datum (e.g., a multi-digit number), and is used by the user to complete the purchase transaction. Verification token 40 may display the dCVV2 value to the user so that the user may enter the dCVV2 value into CVV field of the checkout page of the merchant's website, or verification token 40 may enter the dCVV2 value directly into the CCV field of the merchant's checkout page. After the dCVV2 value has been entered into the CVV field, the user may complete the purchase. This form of the dCVV2 value enables it to work within existing payment processing systems and flows. The merchant's website 20 then uses the dCVV2 value for the CVV in its authorization request for the purchase. The authorization request is sent to acquiring bank 50, which then forwards it to payment processing network 70 for authorization. Through a separate channel, validation entity 80 may send the dCVV2 value to payment processing network 70 and/or issuing bank 60, along with the account information (e.g., account number), so that the merchant's authorization request can be processed. This serves to notify payment processing network 70 and/or issuing bank 60 that a dCVV2 value for portable consumer device 5 was requested and provided to a merchant, and to expect the merchant to provide the dCVV2 value in an authorization request for the account.

Payment processing network 70 can compare incoming authorization requests from merchants (such as forwarded by acquiring banks) against the information it receives from validation entity 80 (such as by looking at account numbers), and can match (e.g., correlate) incoming authorization requests with validation information sent by validation entity 80. If a match is found, payment processing network 70 has a high degree of assurance that consumer portable device 5 was in the possession of user 1 at the time the purchase transaction was made. This provides a greater degree of assurance in comparison to the reliance on CCV values printed on the backs of credit cards. Payment processing network 70 and issuing bank 60 can then undertake the other actions that they perform to authorize the transaction, such as checking whether the merchant 20 is in good standing, and checking the account limit of user 1 to ensure that there are sufficient funds to cover the purchase amount of the transaction. In this case, payment processing network 70 does not need to validate the digital fingerprint and/or the variable datum of the portable consumer device 5, if those actions have been done by validation entity 80. (Payment processing network 70 may, however, perform those validation actions for merchant point-of-sales transactions.)

As a further feature, which is useful when multiple devices 5 have been allocated under one account number (e.g., multiple cards under one PAN for a household), the identification information that token 40 collects and provides to validation entity 80 may include a device identifier alone with the account number. This device identifier uniquely identifies one of the devices allocated under the account number. Provision entity 80 may further use the device identifier to obtain different 3D-secure datum values and/or different dCVV2 values for the different devices allocated under the account number. As a further feature, validation entity 80 may send to token 40 shipping address information and/or billing address information of the user that has been previously associated to the device, and token 40 may fill this information into corresponding fields on the merchant checkout page.

Computer 10. The user's computer 10 may comprise a desktop computer, a laptop computer, or any portable electronic device that has a networking facility and a peripheral interface for communicating with one or more peripheral devices. Computer 10 has one or more processors 11, a tangible computer-readable medium 12 coupled to processor (s) 11 that stores instruction codes (software) that direct processor(s) 11 and that stores data used by processor(s) 11, and a user interface 13 coupled to processor(s) 11. Networking facility 14 and peripheral interface 16, which were previously described above, are also coupled to processor(s) 11, with networking facility 14 also being coupled to first communications network 31. User interface 13 comprises one or more video output devices (e.g., displays, screens) and one or more input devices (e.g., keyboard, mouse, trackball, etc.) for user 1 to receive information from computer 10 and to provide input to computer 10. Computer-readable medium 12 may comprise a combination of semiconductor memory and non-volatile storage, such as one or more disk drives and/or non-volatile memory. Computer-readable medium 12 stores an operating system for computer 10, which enables processes and applications to be run by processor(s) 11. The operating system provides services to these processes and applications, and enables these processes and applications to access components of user interface 13, portions of computer-readable medium 12, networking facility 14, peripheral interface 16, and other components of computer 10. The operating system may be complex and full featured, such as found on desk-top computers, or simplified, such as found on cell phones, PDAs, and many other types of portable electronic devices.

Networking facility 14 of computer 10 may comprise software and hardware that enable a process running on computer 10 to communicate with a communications network, such as network 31, to send and receive messages, data, and the like to one or more entities coupled to the communications network. The hardware of facility 14 may comprise dedicated hardware separate from processor(s) 11, or the shared use of processor(s) 11, or a combination thereof. The software of facility 14 may comprise firmware, software stored in computer-readable medium 12 or another computer-readable medium, portions of the operating system, or a combination of any of the preceding items. Networking facility 14 is preferably a non-exclusive resource, allowing access to the communications network by other processes and applications being run by computer 10. Peripheral interface 16 of computer 10 comprises one or more wired and/or wireless connections that enables a peripheral device (e.g., a device that is separate from the computer's CPU and memory but which can be located inside or outside of the computer's housing) to communicate with the computer. Conventional wired connections include universal serial bus (USB) connectors ("USB ports"), serial ports, parallel ports, and PCMCIA ports. Conventional wireless connections include infra-red (IR) base stations and Bluetooth™ base stations that are built into computer 10 or that are coupled to a peripheral interface of computer 10.

Verification Token 40. In addition to reader 44 and peripheral interface 46 (described above), verification token 40 further comprises a processor 41, a tangible computer-readable medium 42 coupled to processor 41 holding data and codes that direct the operation of processor 41, a security module 43 coupled to processor 41 and adapted to securely store one or more encryption keys and to encrypt and decrypt data for token 40, a reader 44 coupled to processor 41 and adapted to read portable consumer devices 5, and a peripheral interface 46 coupled to processor 41 and adapted to communicate to computer 10 by way of peripheral interface 16. Processor 41 may comprise a conventional microprocessor, and computer-readable medium 42 may comprise a combination of semiconductor memory and non-volatile storage, such non-volatile memory. FIG. 7 illustrates an exemplary implementation of computer-readable medium 42, which include the storage of several datum elements (described in greater detail below), processor codes that direct the operation of processor 41, and processor memory which processor 41 may use in carrying out its tasks. Referring back to FIG. 6, security module 43 may comprise encryption and decryption circuitry (which may include one or more processors), and may comprise one or more encryption keys stored in a secured memory. Security module 43 may also include firewall security circuitry that protects verification token 40 from attacks from hackers conducted through peripheral interface 16. Reader 44 may comprise a convention reader, as described above. Peripheral interface 46 may comprise a wired or wireless connection adapted to communicate with peripheral interface 16 of computer 10. As indicated above, conventional wired connections include universal serial bus connectors ("USB ports"), serial ports, parallel ports, and PCMCIA ports. Conventional wireless connections may include infra-red and Bluetooth™ remote stations. When using a conventional wired connection with peripheral interface 46, verification token 40 may be detachably coupled to computer 10 at peripheral interface 16, such as at a USB port connector. FIG. 4 illustrates an exemplary verification token 40 with a USB port connector (male type) as part of its peripheral interface 46. Also illustrate in FIG. 4 is computer 10, its peripheral interface 16 having a USB port connector (female type) to which USB connector 46 is plugged into, the user interface 13 of computer (e.g., screen and keyboard), the user's portable consumer device 5 (RFID-type card), user 1, and the presentation of a dCVV2 value on user interface 13. Token 40 may further include a visual indicator, such as a light-emitting diode (LED), that it lights when it is ready to read a user's device 5, and may further include an audible indicator, such as a piezoelectric buzzer, that sounds when token 40 is finished with reading a user's device 5. The visual and audible indicators may be operated by the circuitry of reader 44. In other implementations, one or more of these indicators may be operated by processor 41 through I/O commands. Although FIG. 4 illustrates an embodiment of verification token 40 as something similar to a USB stick, the token may come in other forms. For example, it may be piece of hardware or other module installed into a computer, consumer device, or other device. In such implementations, verification token 40 is still adapted to communicatively coupled to a peripheral interface 16 of computer 10, as described above. In an implementation where verification token 40 is physically located within computer 10, token 40 may be communicatively coupled to computer 10 by way of an internal peripheral interface, such as to an internal USB hub located on the motherboard of computer 10, thereby providing an internal USB interface connection.

Referring back to FIG. 6, verification token 40 further comprises various codes embodied on computer-readable medium 42 that direct data processor 41 to perform respective actions (e.g. processor codes shown in FIG. 7). A first code directs data processor 41 to communicate with computer 10 by way of peripheral interface 46 so as to gain access networking facility 14 of computer 10. The first code may comprise code that directs data processor 41 to send a device driver to computer 10 and an instruction to install the device driver in the computer's operating system, wherein the device driver is a collection of instructions to be run by computer 10 that enables computer 10 to recognize the verification token and communicate with the verification token 40, and enables the token's data processor 41 to make function calls to various application program interfaces (API's) of the computer's operating system, such as those related to networking and accessing networking facility 14. So called "self-installing" drivers are known to the art, and can be used here. They comprise one or more function calls to an application programming interface (API) of the computer's operating system, such as the device manager's API. The first code may be configured to work with a selected operating system, such as Windows or Symbian OS, or may be configured to work with several operating systems. In the latter case, the first code may include several device drivers for the various operating systems, and instructions that query computer 10 for its operating system type and select (and install) the driver most appropriate for the computer's operating system. The device drivers may be stored in a section of computer-readable medium 42, as illustrated in the example of FIG. 7. The first code may further include, as an option, instructions that direct processor 41 to generate an I/O signal that causes the above-described visual indicator to be lit in response to processor 41 gaining access to networking facility 14 of computer 10.

Referring back to FIG. 6, a second code of verification token 40 directs data processor 41 to receive identification information read from portable consumer device 5 by the reader 44. The second code may include code that directs the data processor 41 to receive a universal resource identifier (URID) of a validation entity 80, as read from portable consumer device 5 by the reader 44. The second code may comprise instructions that direct processor 41 to contact reader 44 at periodic intervals through an I/O command to determine if the reader has any data for the processor, and to read the data when data is indicated as being present. The second code may further direct processor 41 to contact reader 44 through an I/O command to clear the data after processor 41 has read it, or reader 44 may be configured to clear the data after it has sensed that processor 41 has read it, or after a period of time greater than the periodic contact interval used by processor 41. In another implementation, reader 44 may be configured to generate an interrupt signal to processor 41 when data is present, and the second code may include instructions that direct processor 41 to respond to the interrupt signal by reading the data from reader 44 and clearing the interrupt. The second code may further include, as an option, instructions that direct processor 41 to generate an I/O signal that causes the above-described audible indicator to sound in response to processor 41 receiving data from reader 44. The above instructions may include conventional I/O instructions that direct the communications with reader 44 and the indicators. Different portable consumer device 5 may store and provide different URID's to different validation entities 80. A uniform resource identifier (URID) may comprise a uniform resource locator (URL), an Internet-protocol address (IP-address), or any other type of identifier that can identify an entity on a communications network. If a portable consumer device 5 does not provide a URID to validation entity 80, verification token 40 may store a URID to a default validation entity 80. In some configurations, some verification tokens 40 may be co-branded with respective issuing banks and only work for portable consumer devices that are co-branded with the same issuing banks, and each issuing bank may have its own validation entity 80 with its own URID. In such a configuration, these verification tokens 40 may store the URIDs to their respective co-branded validation entities 80. Instead of, or in addition to, this configuration, some verification tokens 40 may be associated with respective payment processing networks 70, and each such network may have its own validation entity 80. In such a configuration, these verification tokens 40 may store the URIDs to their respective associated validation entities 80. Accordingly, the second code of verification token 40 may be further configured to direct data processor 41 to only use a default URID stored by token 40, or to use a default URID if consumer portable device 5 does not provide token 40 with a URID to entity 80. As yet another implementation, verification token 40 may include code that directs processor 41 to select one of a number of URIDs stored in token 40 based on a bank number provided in the identification information or embedded in the account number. The above further direction and codes may be implemented with conventional I/O instructions, memory access instructions, and CPU logical and control instructions. One or more URIDs to validation entities may be stored in computer-readable memory 42, as illustrated in the example shown in FIG. 7.

Referring back to FIG. 6, a third code of verification token 40 directs data processor 41 to establish communications with validation entity 80 using networking facility 14 of computer 10. The operating system of computer 10 comprises one or more software modules and application programs, generically called "network services modules" herein, that can access networking facility 14 and set up communications sessions to entities on communications network 31. Such network services modules include Microsoft's Windows Communications Foundation (e.g., .NET 3.0, .NET 4.0, etc.), Apple's CFNetwork Framework, the networking section of the Unix and Linux operating system kernels, the OS Services Layer and the Base Services Layer of the Symbian operating system, Internet browsers, and the like. Each of these network services modules is non-exclusive (e.g., capable of serving more than one processor and more than one process/application) and provides an application programming interface (API) to a collection of functions that a processor can access using respective function calls. With these API facilities, a collection of function calls can be readily constructed for a processor to execute that enables the processor to establish a communications channel with an entity on a communications network coupled to networking facility 14, and to exchange messages and data with the entity. The third code of verification token 40 comprises such a collection of function calls to the API of a network services module of computer 10, including one or more function calls that provide the universal resource identifier (URID) for validation entity 80 and an instruction to establish a session with the validation entity. The session may be a secure socket layer (or secure transport layer) session (e.g., SSL session) with mutual authentication. As part of establishing the session in some implementations, the third code of verification token 40 may include directing data processor 41 to provide, or to cause to be provided, a network address for the token to the computer's network services module and to validation entity 80. The network address may be static or dynamic, the latter of which may be obtained through API function calls to the computer's network services module. The network address may an IP address.

If token 40 wishes to use an Internet browser for a network services module, it may further comprise API function calls to the computer's operating system to initiate an instance of the browser and provide it with access to the browser instance. In some implementations, such as when verification entity 40 stores the URID of validation entity 80, the third code may direct the data processor 41 to establish communications with validation entity 80 well before user 1 presents consumer portable device 5 to reader 44, and before processor 41 reads device data from reader 44. Verification token 40 and validation entity 80 may keep the communications session active until device 5 is presented to reader 44, and between times that device 5 is presented to reader 44, by intermittently exchanging "heartbeat" messages. For example, verification token 40 may periodically, aperiodically, or randomly send messages to validation entity 80 confirming its presence in the session, and validation entity 80 may send a reply message confirming its presence in the session.

The third code may be executed in response to data being received by processor 41 from reader 44, or may be executed prior to receiving data from reader 44. In the latter case, the third code may include, as an option, instructions that direct processor 41 to send an I/O command to reader 44 to enable its reading capability after processor 41 has established communications with validation entity 80.

A fourth code of verification token 40 directs the data processor 41 to transmit at least a portion of identification information to validation entity 80 by way of networking facility 14 of computer 10, wherein the identification information is transmitted in encrypted form. If an SSL session has been established, the fourth code may direct data processor 41 to pass the identification information to the computer's network services module using appropriate function calls to the API for the network services module, and the identification information may be transmitted in the SSL session, where the transmitted and received data are encrypted by a session key. For an additional layer of security, the fourth code may further comprise code that directs processor 41 to encrypt the identification information with the help of security module 43 using an encryption key stored in token 40 before providing it to networking facility 14. These instructions may include conventional I/O instructions that direct the communications with security module 43 to pass the identification information to module 43 and to receive back the encrypted information. An encryption key for this may be stored in computer-readable medium 42 or in security module 43.

A fifth code for some implementations of verification token 40 directs data processor 41 to obtain merchant identification information that identifies the merchant of merchant website 20 and/or a transaction information that identifies the transaction (such as cost amount of the transaction, a merchant transaction number, or the IP address of the user's computer), and the previously-described fourth code may further include code that directs the data processor 41 to transmit the merchant identification information and/or transaction information to validation entity 80 by way of the networking facility 14 of computer 10. The fifth code may further include code that directs data processor 41 to display a dialog box to user 1 on computer 10 that prompts the user to enter a merchant name or identifier into a dialog box, and/or transaction information such as a transaction amount, where the merchant identifier and transaction amount may be displayed on the merchant's checkout page. The code may comprise function calls to the graphical user interface of the operating system of computer 10 to open, read, and then close a dialog box on user interface 13. This code may also comprise code that directs processor 41 to execute function calls to the computer's internet browser to query the browser for the URL (or URID) or network address (e.g., IP address) of the entity that provided the content of its active browser session (which presumed to be the merchant's checkout page), and instructions that direct processor 41 to extract the merchant's name or identifier from the obtained URL or URID. Instead of extracting the merchant name or identifier from the obtained URL or URID, the fifth code may include code that directs processor 41 to execute function calls to the computer's internet browser to query a special field on its active browser session (which is the merchant's checkout page), where the special field has been pre-arranged by the merchant to contain the merchant's identifier and is known to token 40 for this purpose. The fifth code may further include code that directs processor 41 to collect a merchant transaction identifier or transaction amount (both being forms of transaction information) along with the merchant identifier, either by asking the user to enter this transaction identifier or transaction amount into the above-described dialog box, or by obtaining it from another special field on the merchant's checkout page, which has been pre-arranged by the merchant to contain this transaction identifier. The above-described codes can be readily augmented to implement this collection of the transaction identifier.

The above-described transaction identifier may comprise the network address (e.g., IP address) of the user's computer 10. Validation entity 80, merchant 20, and the Access Control Server will see the same network address for the user's computer 10 within any given time period for conducting a transaction. Validation entity 80 may obtain the network address of computer 10 from the token 40 (which in turn obtains it from the active browser session), or may obtain the network address from the source IP address of the network packets it receives from computer 10/token 40.

A sixth code of verification token 40 directs data processor 41 to receive, after transmitting said identification information, a 3-D secure participation indication, a 3-D secure datum, and an optional device verification value (e.g., dCVV2 value) from validation entity 80 by way of networking facility 14 of computer 10. This code may comprise function calls to the API of the computer's network services module to retrieve data sent by entity 80 in the session. Each of the 3-D secure participation indication, 3-D secure datum, and the dCVV2 value may be encrypted by validation entity 80, in which case the sixth code of verification token may further direct data processor 41 to decrypt the encrypted items, such as by using security module 43 (with input-output instruction calls to module 43). As indicated above, the participation indication may be incorporated into the 3-D Secure datum by having one or more selected values, such as a NULL value, indicate non-participation, and all other values indicate participation.

The sixth code further directs data processor 41 to examine the participation code (which may be the 3-D secure datum) to determine if the cardholder (e.g., device 5) participates in the 3-D secure system. If so, the six code further directs the data processor 41 to monitor the browser sessions of computer 10 to detect the presence of the Purchase Authentication Page sent to the user's computer 10 by the Access Control Server of the 3-D Secure System, and to insert the 3-D Secure datum that it received from validation entity 80 into the posting field located on the Purchase Authentication Page for the 3-D Secure datum. The sixth code may comprise function calls to the API of the Internet browser to obtain the page titles associated with the browser sessions to find a session that has a title indicative of the Purchase Authentication Page, and function calls to access the Purchase Authentication Page and insert the 3-D Secure datum in the posting field. These actions may involve accessing the data objects that the Internet browser stores for each of its browser sessions to view the page title or web address of the browser sessions to find the data object for the Purchase Authentication Page, and to write the 3-D Secure datum to the appropriate positing field of the found data object. Token 40 can then leave it to user 1 to fill in the other requested information in other positing fields on the Purchase Authentication Page according to the conventional 3-D secure system flow, and to return the page to the Access Control Server, such as by clicking a submit button. As is known in the art, returning the page can be accomplished by having the browser repost (e.g., refresh) the Purchase Authentication Page with additional parameters added to the URL (the original URL to the Access Control Server) that contain the information of the posting fields, preferably in encrypted form under an SSL session (e.g., an https posting).

In other implementations, Token 40 may be configured to send the Purchase Authentication Page back to the Access Control Server before the user has the opportunity to fill in the password or answer, and the Access Control Server may be configured to not look for the conventional user-provided information if the 3-D secure datum is present in the returned Purchase Authentication Page. For this, the sixth code may comprise function calls to the API of the Internet browser to direct the browser to return the Purchase Authentication Page back to the Access Control Server. The function calls to the API of an Internet browser are known to the art, and in view of this disclosure, it would be within the skill of a person in the art to construct the above-described function calls for the sixth code.

The sixth code may also include code that directs data processor 41 to display the received dCVV2 value to user 1, such as by way of the user interface 13 of computer 10 or a miniature LCD screen, or the like, integrated with verification token 40. In the former case, this code may comprise API function calls to the graphical user interface of the operating system of computer 10 to open a display box on user interface 13 to display the dCVV2 value in alphanumeric and/or graphical form. In the latter case, this code may comprise I/O instructions to the miniature LCD screen, or the like. User 1 may then enter the dCVV2 value into the CVV field of the merchant checkout page. In another implementation, verification token 40 may insert the received dCVV2 value in the CVV field of the merchant purchase page. In this case, the sixth code may further include code that directs data processor 41 to locate a browser session on the computer that has a form field for a device verification value, and to fill the field with the device verification value received from the validation entity. This can include function calls to the API of the Internet browser to search the active web page or all open web pages for an input field marked as CVV, and to input the dCVV2 value into the CVV field. Unlike an authorization code described above, a dCVV2 value in its clear form (e.g., not encrypted and not encoded) is preferably configured to be enterable into a CVV field of a merchant web page (e.g., checkout page).

In some implementations, the CVV field on the merchant's page may be configured as a hidden field that is not visible to the user. This may be done to ease the difficulty for the user in conducting the transaction, and to lessen the chances of the transaction falling through because of user confusion, technical difficulties, or the apparent demand for too much information. In this case, and as an option, the sixth code may comprise instructions that direct data processor 41 to locate a browser session on the computer that has a hidden field for a device verification value (e.g., the merchant's check out page), and to fill the field with the device verification value received from the validation entity. In this case, the device verification value need not be presented in visual form to the user. The hidden field can, in many web programming languages, be readily indicated by a tag identifier or browser variable that is known to both the merchant and token 40. If processor 41 cannot locate the hidden field, then the fifth code may further direct processor 41 to present the received device verification value to the user. These instructions can include function calls to the API of the Internet browser to search the active web page or all open web pages for the hidden field (as marked by the identifier or variable name), to input the dCVV2 value into the hidden field, and I/O instructions to an LCD screen or to computer 10 to visually present the dCVV2 value if the hidden field cannot be located, or function calls to the API of the Internet browser to visually present the dCVV2 value in a temporary browser window if the hidden field cannot be located.

In some configurations, validation entity 80 may provide a dynamic account number (often called a "dPAN" in the art) along with the dCVV2 value. For these configurations, the sixth code may be augmented to receive the dPAN along with the dCVV2 value, and to display the dPAN value to user 1 or to fill the value into an account field of the merchant purchase page, and include instructions similar to those described above for processing the dCVV2 value. Specifically, the sixth code may further include code that directs data processor 41 to display the received dPAN value to user 1, such as by way of the user interface 13 of computer 10 or a miniature LCD screen, or the like, integrated with verification token 40. In the former case, this code may comprise API function calls to the graphical user interface of the operating system of computer 10 to open a display box on user interface 13 to display the dPAN value in alphanumeric and/or graphical form. In the latter case, this code may comprise I/O instructions to the miniature LCD screen, or the like. In another implementation, verification token 40 may insert the received dPAN value in the account field of the merchant purchase page. In this case, the sixth code may further include code that that directs data processor 41 to locate a browser session on the computer that has form fields for an account number and device verification value (e.g., CVV field), and to fill the account field with the dPAN value and the device verification value field with the dCVV2 value received from the validation entity. This can include function calls to the API of the Internet browser to search the active web page or all open web pages for an input fields marked as "account number" (or "credit card number") and CVV, and to enter the dPAN value into the "account number" field and the dCVV2 value into the CVV field.

In some configurations, validation entity 80 may provide a billing address and/or shipping address (e.g., the user's residence address and/or business address) associated with the portable consumer device 5 along with the dCVV2 value. The address information may have been previously associated with the device 5 by the issuing bank or the user through the user's online management account for the device or token. For these configurations, the sixth code may be augmented to receive the billing address and/or shipping address along with the other information received from validation entity 80, and to fill the address into a corresponding fields of the merchant purchase page, using instructions similar to those described above for processing the dCVV2 value. Specifically, the sixth code may further include code that directs data processor 41 to receive the billing and/or shipping address information from validation entity 80 (which may be provided in a specific format with field indicators), to locate a browser session on the computer that has form fields for billing and/or shipping address(es) (e.g., street address, city, state, postal code, country), and to fill these fields with the address information received from the validation entity. These instructions can include function calls to the API of the Internet browser to search the active web page or all open web pages for input fields marked with indicators of billing address and/or shipping address, and function calls to fill these fields. Typically, the actions of token 40 to display or form fill the dPAN, dCVV2 value, and/or shipping address occur before the Purchase Authentication Page is sent to computer 10, and before token 40 provides the 3-D Secure value to the Purchase Authentication Page.

The use of function calls to various application programming interfaces (APIs) of the operating system of computer 10 its support modules, facilities, and its applications is well known to the software art, and one of ordinary skill in the art will be able to construct instructions and API function calls to implement the above-described codes and tasks in view of this disclosure without undue experimentation.

FIG. 8 illustrates an exemplary embodiment 140 of a method that can be used by verification token 40. Exemplary method 140 comprises a plurality of actions 141-146. Action 141 comprises establishing a communications link between the verification token and the computer, with the computer having a networking facility, as described above. Action 142 comprises establishing a communications session between the verification token and a validation entity using the computer's networking facility and a network services module therefor. Action 143 comprises reading identification information from a portable consumer device 5 into the verification token using a reader, such as reader 44. In some implementations, action 143 may precede either or both of actions 141 and 142. Action 144 comprises obtaining from the user's computer 10 (e.g., via a browser session) merchant identification information that identifies the merchant of merchant website 20 and/or a transaction information that identifies the transaction (such as cost amount of the transaction, a merchant transaction number, or the IP address of the user's computer), Action 144 is optional. In some implementations, action 144 may precede one or more of actions 141, 142, and 143. Action 145 comprises transmitting the read identification information and obtained merchant/transaction information from the verification token to the validation entity through the communications session, the identification information preferably being transmitted to the validation entity in an encrypted form. Action 145 may comprise directing the communications session to encrypt the identification information, and/or encrypting the identification information using an encryption key stored in the token. A triple DES based algorithm may be used for both encryptions. Action 146 comprises, after transmitting the identification information, receiving, at the verification token, 3-D secure datum and optionally a device verification value from the validation entity by way of the communications session. Action 146 may also include receiving a dPAN and/or address information, as described above.

FIG. 9 illustrates an exemplary embodiment 150 of a method for a user to use verification token 40 and the like. Exemplary method 150 comprises a plurality of actions 151-154. Action 151 comprises coupling a verification token, such as token 40, to a computer, such as computer 10, using a peripheral interface of the computer. Action 152 comprises presenting a portable consumer device 5 to the reader of the verification token to obtain a device verification value for the device. If device 5 has a magnetic stripe, action 152 may comprise swiping the magnetic stripe through a magnetic stripe reader of the verification token. If device 5 comprises a wireless communications interface, action 152 may comprise waving device 5 near the reader of verification token. Action 153 comprises receiving a Purchase Authentication Page from the Access Control Server and responding to the received page by providing the required information and returning the page. Action 154 comprises providing the obtained device verification value to an entity involved with a transaction between the user and the entity, such as a merchant. Action 154 may comprise entering the device verification value onto a webpage of entity, or conveying the value over the phone to a representative of the entity.

As indicated above, validation entity 80 may use a first validation test to validate verification token 40. For this, verification token 40 may send its serial number to validation entity 80, along with a message encrypted by an encryption key, with the message and encryption key being known to token 40 and entity 80 (but not the general public), and with the encryption key further being uniquely assigned to the token's serial number. Validation entity 80 has a database of serial numbers and the corresponding uniquely-assigned encryption keys (or stored algorithms for generating said keys), and can validate that verification token 40 has sent the correct message for the serial number. For this, verification token 40 may comprise a serial number and unique encryption key embodied in a computer-readable medium, the unique encryption key being unique to verification token 40 (see FIG. 7 for an exemplary implementation, "Serial Number" and "Datum for Encrypted message"), and code that directs data processor 41 to send the serial number and a message encrypted by the unique encryption key to validation entity 80. The message may be pre-stored on the computer-readable medium (e.g., stored in "Datum for Encrypted message" in FIG. 7), or derivable from information known to both verification token 40 and validation entity 80, such as a message derived from an algorithm applied to the current date, serial number of token 40, and/or session key of the communications session between token 40 and entity 80. In this manner, the message sent by token 40 to validation entity 80 is verifiable by validation entity 80 using information stored at the validation entity. The computer-readable medium for the above tasks may be located in computer-readable medium 42 and/or security module 43. The above codes may include I/O instructions to security module 43, and function calls to the API of the computer's network services module.

As an option, verification token 40 may send, from time to time, one or more pieces of machine-unique information of computer 10 to validation entity 80, which may check this information against a database of computer information associated with known fraudsters. Such machine-unique information may include the serial numbers of processors, disk drives, and operating systems of computer 10. Verification token 40 may comprise code that directs data processor 41 to obtain one or more pieces of machine-unique information from computer 10, and to send the machine-specific information to validation entity 80. This code may include function calls to the API of the computer's operating system to obtain the information, and function calls to the API of the computer's network services module to send the information to validation entity 80.

As another option, verification token 40 may be configured to prompt user 1 for a password to activate one or more features of token 40. The password may be stored on a computer-readable medium located in security module 43 or in computer-readable medium 42 (see FIG. 7 for an exemplary implementation of the latter). The password may be provided to user 1 on a piece of paper by the provider or seller of token 40. Token 40 may be sent to user 1 through the mail by or on behalf of an issuing bank, or may be purchased by user 1 in a store. Token 40 may be configured to require that the password be entered each time the user wishes to present a consumer portable device 5, and/or each time token 40 is coupled to a computer 10. For this, verification token 40 may further comprise code embodied on computer-readable medium 42 that directs data processor 41 to prompt the user to enter a password on a keyboard of computer 10, to read a password entered by the user, and to compare the entered password against a stored password embodied on the computer-readable medium. This code may comprise API function calls to the graphical user interface of the operating system of computer 10 to open a display box on user interface 13 to request and receive a password from user 1, I/O instructions, memory access instructions, and CPU logical and control instructions. Verification token 40 may further comprise one or more of the following:

(1) code embodied on computer-readable medium 42 that directs data processor 41 to initiate and/or allow the above-described communications with computer 10 in response to an entered password matching the stored password;

(2) code embodied on computer-readable medium 42 that directs data processor 41 to initiate and/or allow the above-described communications with validation entity 80 in response to an entered password matching the stored password;

(3) code embodied on computer-readable medium 42 that directs data processor 41 to activate reader 44 and/or to accept identification information from reader 44 in response to an entered password matching the stored password; and (4) code embodied on computer-readable medium 42 that directs data processor 41 to initiate and/or allow the above-described transmission of identification information to validation entity 80 in response to entered password matching the stored password.

These codes may be done with I/O instructions, memory access instructions, and CPU logical and control instructions. They, alone or in combination, prevent the transmission of identification information to entity 80 when the entered password is not the same as the stored password, and thereby comprise code embodied on the computer-readable medium that directs the data processor for doing so. One of ordinary skill in the art will be able to construct the instructions and API function calls to implement the above-described codes in view of this disclosure without undue experimentation. As further protection, validation token 40 may further comprise code embodied on computer-readable medium 42 that directs data processor 41 to establish a user name for the token by presenting user 1 with a dialog box to receive input designating a username, and by storing the username in computer-readable medium 42 (example shown in FIG. 7). The above codes for processing the password may be further augmented to include requesting a username for the token and comparing the received username with the stored username for a match, and including a match as a condition that must be met in each of the four above codes that initiate or allow various actions to be done. These codes may be done with I/O instructions, memory access instructions, and CPU logical and control instructions.

In further implementations, as further protection, validation token 40 may further comprise code embodied on computer-readable medium 42 that directs data processor 41 to establish one or more shipping addresses and/or billing addresses in the token that token 40 can use to fill into form fill locations of a merchant page. Each shipping address and/or billing address may be associated with a portable consumer device. The code may direct processor 41 to present a series of dialog boxes to the user by way of the computer's user interface 13 to receive the address information and the account number (or last four digits thereof) of the portable consumer device 5 that is to be associated to the address information, and to store the address information in a computer-readable medium, such as medium 42 (as illustrated by the example shown in FIG. 7). Token 40 may further comprise code embodied on computer-readable medium 42 that directs data processor 41 to access the address information in response to a request being sent to validation entity 80 (the address information may be selected among many stored addresses based on the account number sent in the request), and to fill the address information into appropriate locations of a merchant checkout page, such as when a dCVV2 value is received back from validation entity 80. The code may be configured to direct processor 41 to only fill in the address information when the locations for the information on the merchant checkout page are blank, and when validation entity 80 has not provided address information, as described above. The filling code may be further configured to direct data processor 41 to use shipping and/or billing information stored on portable consumer device 5 when shipping and/or billing information is not store in token 40 for the account number of device 5, and further if the locations for the shipping information on the merchant checkout page are blank and validation entity 80 has not provided address information, as described above. The filling code may include code that directs data processor 41 to locate a browser session on the computer that has a form fields for address information and/or a device verification value, and to fill the address fields with the selected address information. This can include function calls to the API of the Internet browser to search the active web page or all open web pages for an input field marked as name, address, city, postal code, country, and CVV, and to input the datum of the selected address information into the appropriate fields. The above codes may be implemented with API function calls, I/O instructions, memory access instructions, and CPU logical and control instructions.

In each of the embodiments described herein pertaining to verification token 40, token 40 may send the identification information pertaining to portable consumer device 5 to computer 10 in a number of forms, including: (1) unaltered form ("clear form"), (2) encrypted form, (3) hashed formed (e.g., encoded), (4) signed form, (5) or any combination of these forms. These forms may be generated by portable consumer device 5, verification token 40, computer 10, or any combination thereof. In addition, verification token 40 and validation entity 80 may perform a mutual authentication process before verification token 40 sends the identification information. The merchant information and transaction information may also be sent in any of the above forms.

In each of the embodiments described herein pertaining to verification token 40, the above codes of token 40 and the identification information read from device 5 by token 40 may be stored independently of computer 10 and may be secure from programs (including spyware and other malicious programs) running on computer 10. In such implementations, the identification information is put in secure form (e.g., encrypted, hashed, signed, or combination thereof) by verification token 40 before the information is provided to computer 10. Accordingly, securing the information is not dependent upon the security of computer 10. Symmetric or asymmetric keys may be used for encryption and signing. The keys for a verification token 40 may be unique with respect to other verification tokens (that is, the keys for a token may be unique to that token). Keys for a token, and particularly symmetric keys, may be based upon a uniquely assigned serial number for the verification token, which the token can communicate to validation entity 80 in an initial communication. Both the verification token and the validation entity may have a shared secret on how to derive a key from the token's serial number, such as by manipulating and/or replacing selected digits of the serial number. A number of keys may be derived from the unique serial number using respective shared secrets. Thus, the challenge and response messages used in a mutual authentication process between a verification token and a validation entity may be signed using respective keys derived from the serial number of the verification token.

Variations on the Token Providing the 3-D Secure Datum to the Purchase Authentication Page. As briefly described above, token 40 can provide the 3-D Secure datum to the Access Control Server in a variety of ways ("variations") besides placing the 3-D Secure datum on the Purchase Authentication Page in a dedicated posting field, where the field may be hidden from the user's view. In a first variation, validation token 40 enters the 3-D secure datum into the password field or answer field of the Purchase Authentication Page instead of the dedicated posting field, and returns the Page to the Access Control Server for the user. In this case, the Purchase Authentication Page does not need to include the posting field for the 3-D secure datum. The above-described sixth code for toke 40 remains unchanged except that (1) token 40 uses the password or answer posting field as the field to enter the 3-D Secure datum and the API function call for writing the datum is changed accordingly, and (2) Token returns the Purchase Authentication Page to the Access Control Server without user involvement (e.g., regardless of whether the user response positing field is filled in by the user), which may be implemented with the API function calls previously described above for the Token's sixth code. The Access Control Server is further configured to read the 3-D secure datum from the password field or answer field of the returned page. This enables the 3-D Secure datum to be more easily incorporated in the existing 3-D secure system since no modifications to the Purchase Authentication Page are needed. The Access Control Server may test the value of returned password or answer field against both its stored value of the user's password/answer or its stored value of the 3-D Secure datum in order to validate the purchase, from which point is continues with the processing flow of the 3-D Secure System. Security at the token side for this modification can be increased by password protecting access to token 40, as described above, so that the user must unlock the token with a password before the token can perform this action.

In a second variation, token 40 is further configured to append the 3-D Secure datum to password that the user's enters into the password field after the user enters the password, and before the page is sent to the Access Control Server. The Access Control Server, which has knowledge of the user's password, is further configured to separate the password and the 3-D Secure datum from the returned password field. Like the previous variation, this variation enables the 3-D Secure datum to be more easily incorporated in the existing 3-D secure system since no modifications to the Purchase Authentication Page are needed. This variation can be readily implemented by having the Access Control Server add script code to the Purchase Authentication page that: (1) adds a variable to the data object for the page's browser session, said variable being configured to receive the 3-D Secure datum from Token 40; and that (2) modifies the control of the page's submit button to include the action of appending the contents of this added variable to the contents of the posting field for the page's password/answer before the control sends the page back to the Access Control Server. In this implementation, token 40 writes the 3-D Secure datum to the added variable before the page is sent back. It is also possible for token 40 to replace the control script for the page's submit button to include new script that directs the browser to append the 3-D Secure datum to the contents of the posting field for the page's password/answer before the control sends the page back to the Access Control Server. In this case, the 3-D Secure datum can be incorporated into the modified script. The above changes can be accomplished by using well-known programming commands of the web-page language.

In the first variation, the Purchase Authentication Page may be briefly visible to the user before token 40 is able to return the page. This may cause some confusion for the user. To prevent this potential confusion, a third variation similar to the first variation is provided. In the third variation, the MPI or the Access Control Server sets the display characteristics of the Purchase Authentication Page so that the page is effectively invisible to the user. This can be accomplished by using well-known programming commands of the web-page language (e.g., HTML, XML, Java script, Perl script, etc.) that place the web page or page frame in an off-screen location or make the display size of the page or frame very small. The Access Control Server then checks its records for any information for the transaction that it may have previously stored during action # E described above, and specifically looks for an indication in its records on whether token 40 is present and communicatively coupled to computer 10. If such an indication is found, the Access Control Server waits for a selected period of time for token 40 to enter the 3-D Secure datum on the Purchase Authentication Page and to return the page. In this case, the sixth code of the Token may take any of the above-described forms which enter the 3-D secure datum in a dedicated posting field or in an existing posting field. If the Purchase Authentication Page is returned within the selected period of time, the Access Control Server proceeds in the manner describe in the previous embodiments. If the page is not returned within the selected period of time, the Access Control Server can send a message to the Internet browser to change the display characteristics of the page so that it is visible, or resend the page with visible display characteristics. Also, script code may be included in the page itself to change its display characteristics after a selected period of time to make the page visible to the user. In this way, the Access Control Server can continue with the conventional 3-D Secure processing flow in the case that token 40 is not able to post the 3-D Secure datum and/or return the page.

In a fourth variation, the Access Control Server performs a fraud risk assessment of the transaction based on the information that the Directory Server has provided to it about the transaction. If the assessed risk of fraud is below a selected threshold, the Access Control Server presents the Purchase Authentication Page in hidden form to the user (e.g., invisible to the user), which may comprise maintaining the page in hidden form if the merchant plug-in (MPI) previously placed the page in that form, and allows token 40 to process the Purchase Authentication Page as it does in the third variation. If the assessed risk of fraud is above the selected threshold, Access Control Server presents the Purchase Authentication Page in visible form to the user, and token 40 provides the 3-D Secure datum to the Purchase Authentication Page but defers to the user to enter the password or answer in the existing field of the Page, and to submit the Page to the Access Control Server. In this latter case, the Access Control Server can send a message to the Internet browser to change the display characteristics of the page so that it is visible, or resend the page with visible display characteristics. This variation enables improves the easy of use of the 3-D Secure System for low-risks transactions, while only imposing additional security tests for high risk transactions. The Access Control Server may look at several factors in generating the assessment of risk fraud for the transaction, such as the transaction amount, identity of the merchant, IP address of the user's computer (whether it is within a geographical location of the user), etc. As describe below, the Access Control server may comprise a data processor coupled to a computer readable memory and network services component, and code disposed on the memory that directs the data processor to perform the above tasks for one or more of the above variations.

Validation Entity 80. Having described various embodiments and implementations of verification token 40, various embodiments and implementations of validation entity are now described. Validation entity 80 comprises a system having one or more servers coupled to a communications network that can receive a request from a verification token 40 to process (e.g., to validate) the identification information that the token has read from a portable consumer device 5, and to provide a 3-D Secure participation indication and a 3-D Secure datum to token 40, and optionally a device verification value (dCVV2) to the token and to payment processing network 70, if the identification information passes one or more validation tests. One of the servers of entity 80 is shown in FIG. 6; the server comprises one or more processors 81 electrically coupled to each of a tangible computer-readable medium 82, a user interface 83, one or more databases 86, and a networking facility 84, the latter of which is coupled to first and second communications networks 31 and 32. User interface 83 comprises one or more video output devices (e.g., displays, screens) and one or more input devices (e.g., keyboard, mouse, trackball, etc.), which enable an administrator of entity 80 to receive information from the server and to provide input to the server. Computer-readable medium 82 may comprise a combination of semiconductor memory and non-volatile storage, such as one or more disk drives and/or non-volatile memory.

Computer-readable medium 82 stores an operating system for the server, which enables processes and applications to be run by processor(s) 81, and enables codes for directing the operation of processor(s) 81 to be run. The operating system provides services to these processes and applications, and enables these processes and applications to access components of user interface 83, portions of computer-readable medium 82, networking facility 84, and other components of entity 80. The operating system may be full featured. Specifically, the operating system provides one or more I/O communications modules that enable processor(s) 81 to communicate with user interface 83 and databases 86. Each I/O communications module has an application programming interface (API) with a collection of functions that a processor 81 can call in order to access the components. The operating system of entity 80 also comprises one or more network services modules that can access networking facility 84 and set up communications sessions to entities on communications networks 31 and 32, and with SMS relay server 35. Such network services modules include Microsoft's Windows Communications Foundation (e.g., .NET 3.0, .NET 4.0, etc.), Apple's CFNetwork Framework, the networking section of the Unix and Linux operating system kernels, and the OS Services Layer and the Base Services Layer of the Symbian operating system, and the like. Each of these network services modules can be non-exclusive (e.g., capable of serving more than one processor and more than one process/application) and each provides an application programming interface (API), which has a collection of functions that a processor 81 can call in order to manage communications with another entity. With these API facilities, a collection of API function calls can be readily constructed for a processor to execute that enables the processor to establish a communications channel with an entity on a communications network coupled to networking facility 84, and to exchange messages and data with the entity. The above operating system, modules, and APIs all include instructions that direct the operation of processor(s) 81.

One or more databases 86 may be configured as database servers, which processor(s) 81 can access via networking facility 84 over a private communications network 87, which is illustrated by the dashed line in FIG. 6. Validation entity 80 conventionally has a clock 88 for tracking time and dates for various applications. Clock 88 may be a simple counter of seconds, or fractions thereof, that can be read by processor 81 by an I/O operation, or may comprise a more complex arrangement of hardware or firmware that can provide the various components of the current date and time (year, month, day, hour, minute, and second) in various registers that can be read by processor 81 through the execution of one or more I/O operations.

Validation entity 80 can process identification information transmitted from a plurality of different verification tokens 40 (e.g., millions of tokens), and can process any number of transmissions by a particular token 40. Validation entity 80 applies one or more validation tests to verification token 40 and/or the identification information to obtain a level of confidence that the portable consumer device 5 was actually presented to verification token 40 to request 3-D Secure datum and optionally the dCVV2 value. When the one or more validation tests are passed, and preferably when none of the tests are failed, validation entity 80 sends a 3-D secure participation indication and 3-D secure datum to verification token 40, and optionally a dCVV2 value token 40 and payment processing network 70 along with the account number present in the identification. For these tasks, validation entity 80 may comprise code embodied on computer-readable medium 82 that directs data processor 81 to communicate with computer 10 and verification token 40 using networking facility 84 over communications network 31. This code may include instructions that establish a communications session with computer 10, including the option of establishing an SSL session with mutual authentication and encryption based on a triple DES algorithm, and instructions for sending and receiving messages to verification token 40 through the communications session. Validation entity 80 may further comprise code embodied on computer-readable medium 82 that directs data processor 81 to receive encrypted information (e.g., identification, merchant and transaction information) sent by verification token 40, and code that directs data processor 81 to decrypt the encrypted information. The information may be encrypted by a session key of an SSL session or by an encryption key stored in verification token 40 and known to validation entity 80, or may be doubly encrypted by both keys. The latter key may be uniquely assigned to the token. Validation entity 80 may further comprise code embodied on computer-readable medium 82 that directs data processor 81 to apply one or more validation tests as previously described above, and to send the 3-D secure indication, 3-D secure datum, and dCVV2 value to token 40 and to optionally send the dCVV2 value and account number to payment processing network 70, if a selected number of validation tests are passed. Data processor 81 may access databases 86 in performing the one or more validation tests. The validation tests and codes therefor are described below in greater detail. These codes and codes described below for validation entity 80 may be implemented in any number of programming languages.

Furthermore, one of ordinary skill in the art will be readily able to construct instructions to implement these codes in view of this disclosure without undue experimentation.

As described above, a first validation test that validation entity 80 may apply pertains to verifying that verification token 40 is authentic. For this, verification token 40 may send its serial number to validation entity 80, along with a test message encrypted by an encryption key, with the test message and encryption key (or corresponding decryption key) being known to token 40 and entity 80 (but not the general public), and with the encryption key further being uniquely assigned to the token's serial number. Validation entity 80 may access a database of token serial numbers and corresponding uniquely-assigned encryption keys (or corresponding decryption keys) in one of databases 86, and may determine whether verification token 40 has sent a correct test message for the serial number that the token provided. The test message may be fixed or variable; in the latter case it may be generated based on information known to both token 40 and entity 80. The test message may be encrypted and decrypted by a triple DES algorithm, which can be implemented by a number of well known sets of computer instructions using a single symmetric encryption key. The test message may also be encrypted by a first key of an asymmetric encryption key set at the verification token 40 and decrypted by the second key (the decryption key) of the asymmetric encryption key set at validation entity 80, which can be implemented by a number of well known sets of computer instructions. To validate the encrypted test message sent by token 40, entity 80 can decrypt the test message using the key that it has, and can compare the decrypted test message to a set of acceptable messages for a match. Entity 80 may also validate the encrypted test message in the reverse way by encrypting the set of acceptable messages and comparing the encrypted test message sent by token 40 to its set of encrypted acceptable messages. If the sent test message is correct, the first validation test can be deemed to have been passed, otherwise the first validation test is deems to have failed.

To implement the above validation test, validation entity 80 may comprise code embodied on computer-readable medium 82 that directs data processor 81 to receive one or more messages from verification token 40 via networking facility 84 that has the token's serial number and encrypted test message, code that directs data processor 81 to obtain from one of databases 86 a key that has been assigned to the received serial number of the token and one or more acceptable messages that can be accepted as the correct test message, and code that directs the data processor to validate the encrypted test message from the token using the encrypted test message, the obtained key, and the obtained one or more acceptable messages. The latter validation code may comprise code that directs data processor 81 to decrypt the encrypted test message using the obtained key, and code that directs data processor 81 to compare the decrypted test message to the one or more acceptable messages to determine if the first validation test has been passed (in the case of a match between the decrypted test message and an acceptable message), or has been failed (in the case of no such match). In addition, or as another approach, the above validation code may comprise code that directs data processor 81 to encrypt the obtained acceptable messages with the encryption key for token 40 (as found in the database according to the token's serial number), to compare the encrypted test message from token 40 to the one or more encrypted acceptable messages to determine if the first validation test has been passed (in the case of a match between the encrypted test message and an encrypted acceptable message), or has been failed (in the case of no such match). An acceptable message may be obtained by accessing it directly from one of databases 86, or by generating it from information stored in one or more of databases 86. As an option, if the first validation test is failed, validation entity 80 may record the serial number of the failed token 40 and the source IP address from which the failed token 40 made the request in one of databases 86. For this, validation entity 80 may further comprise code that directs data processor 81 to obtain the source IP address from the request message and to store the source IP address and the token's serial number as one record or two separate records in one of databases 86, which may be called the failed validation database 86. This information may be accessed as port of the second validation test described below. The above codes can be implemented with conventional I/O instructions, API function calls to databases, memory access instructions, CPU arithmetic and logic instructions, and CPU control instructions. In view of this disclosure, the codes may be implemented by one of ordinary skill in the art without undue experimentation.

As a second validation test, validation entity 80 may have a database in databases 86 that tracks the serial numbers of verification tokens that have been used in fraudulent activities (e.g., suspicious tokens), and validation entity 80 may check the serial number of verification token 40 against this database. If a check of this database indicates that verification token 40 has not been involved in fraudulent activity or is not otherwise suspicious, the second validation test can be deemed to have been passed. To assist in tracking fraudulent activity back to a verification token, validation entity 80 may send the serial number of token 40 along with the dCVV2 value and account number that it sends to payment processing network 70. If network 70 later finds out that the transaction processed with the account number provided by token 40 was fraudulent, it can send a message to that effect to validation entity 80, and entity 80 may then enter the serial number of the token into the database of tokens used in fraudulent activities. To implement the second validation test, validation entity 80 may comprise code embodied on computer-readable medium 82 that directs data processor 81 to receive a message from verification token 40 via networking facility 84 that has the token's serial number, code that directs data processor 81 to have the received serial number compared with serial numbers stored in a database of databases 86 that stores serial numbers of suspicious tokens used in fraudulent transactions to determine if the second validation test has been passed (no fraudulent activity), or has been failed (fraudulent activity). This code may further include instructions that direct processor 81 to obtain the source IP address of the message from token 40, and to compare the source IP address and the serial number of token 40 to IP addresses and serial numbers in the failed validation database 86 for a match. If a match is found, the second validation test may be deemed to have been failed. Checking the token serial numbers and IP addresses in this way prevents retry attacks by fraudsters. The above codes can be implemented with conventional I/O instructions, API function calls to databases, memory access instructions, CPU logic instructions, and CPU control instructions. In view of this disclosure, the codes may be implemented by one of ordinary skill in the art without undue experimentation.

As a third validation test, validation entity 80 may send a message to verification token 40 requesting that token 40 send it one or more pieces of computer-specific information about computer 10, such as the serial numbers of one or more of the following: the computer's processor, one or more of the computer's disk drives, the computer's operating system. Validation entity 80 may receive this information and check it against a database storing computer-specific information of suspicious computers known to have been involved in fraudulent activity. If a check of this database indicates that the computer 10 used by verification token 40 has not been involved in fraudulent activity, the third validation test can be deemed to have been passed. To assist in tracking fraudulent activity back to computer 10, validation entity 80 may send the serial number of token 40 and the computer-specific information along with the dCVV2 value and account number that it sends to payment processing network 70. If network 70 later finds out that the transaction processed with the account number provided by token 40 was fraudulent, it can send a message to that effect to validation entity 80, and entity 80 may then enter the serial number of the token into the database of suspicious tokens used in fraudulent activities, and the computer-specific information into the database of suspicious computers known to have been involved in fraudulent activity. To implement the third validation test, validation entity 80 may comprise code embodied on computer-readable medium 82 that directs data processor 81 to send a message to verification token 40 requesting computer-specific information (if verification token 40 has not sent such information beforehand without prompting), code that directs data processor 81 to receive one or more data messages from verification token 40 via networking facility 84 that have the token's serial number and the computer-specific information, and code that directs data processor 81 to have the received computer-specific information compared with computer-specific information stored in a database (of databases 86) that stores computer-specific information of suspicious computers used in fraudulent transactions to determine if the third validation test has been passed (no fraudulent activity), or has been failed (fraudulent activity). The above codes can be implemented with conventional I/O instructions, API function calls to databases, memory access instructions, CPU logic instructions, and CPU control instructions. In view of this disclosure, the codes may be implemented by one of ordinary skill in the art without undue experimentation.

By conducting one or more of the above three validation tests, validation entity 80 can obtain some degree of confidence that the identification information sent by token 40 is valid, and can, in some implementations, provide the 3-D Secure datum to token 40, and optionally the dCCV2 value to token 40 and payment processing network 70. In this case, verification token 40 does not need to send the digital fingerprint or the variable datum of the portable consumer device 5 in the identification information, and does not need to obtain these datum from device 5.

To increase the degree of confidence, validation entity 80 may perform a fourth validation test that compares a digital fingerprint received in the identification information, if present, with the stored copy of the valid digital fingerprint that entity 80 has for the account number specified by the identification information. If the digital fingerprints match to an acceptable degree (e.g., the degree of similarity, or correlation, of the two fingerprints being above a selected level of similarity), validation entity 80 can deem the fourth validation test as being passed. The degree of similarity between the two fingerprints may be assessed by applying a correlation function to the two fingerprints. Such correlation functions are well known to the art. Before receiving identification information for a portable consumer device 5 from a token, the issuing bank for the device may provide validation entity 80 with the valid digital magnetic fingerprint of the device, which entity 80 may store in one of databases 86. When validation entity 80 receives identification information from a verification token 40 for a specific portable consumer device 5, it accesses databases 86 for its record of the valid digital fingerprint, and compares the received fingerprint against the valid digital fingerprint to assess a degree of similarity, and to determine if the fourth validation test has been passed (e.g., the degree of similarity between the two fingerprints is above a selected level), or has been failed (e.g., the degree of similarity between the two fingerprints is below the selected level). To implement the fourth validation test, validation entity 80 may comprise code embodied on computer-readable medium 82 that directs data processor 81 to obtain the stored valid digital fingerprint for the account from one of databases 86, and code that directs data processor 81 to compare the received digital fingerprint and the stored valid digital fingerprint for similarity to determine if the forth test is passed (sufficient similarity) or failed (not sufficient similarity). The latter code may comprise code that directs data processor 81 to generating a value representative of the similarity between the two fingerprints by applying one or more correlation functions to the fingerprints, and comparing the value against a selected level. Such correlation functions, also known as probabilistic models, are known to the credit card art. The above codes can be implemented with conventional I/O instructions, API function calls to databases, memory access instructions, CPU arithmetic instructions, CPU logic instructions, and CPU control instructions. In view of this disclosure, the codes may be implemented by one of ordinary skill in the art without undue experimentation.

To also increase the degree of confidence over that provided by the first three validation tests described above, validation entity 80 may perform a fifth validation test that compares a variable datum (e.g., CVC3, dCVV, cryptogram) received as part of the identification information, if present, with a set of one or more acceptable values for the variable datum that validation entity 80 has for the account number provided as part of the identification information. If the values match, validation entity 80 can deem the fifth validation test as being passed. There are number of ways that the variable datum can be configured to vary with time. As some examples, the variable datum can be configured to have its value vary with each use of portable consumer device 5, and device 5 can provide a counter value in the datum or along with the datum. Validation entity 80 or a payment processing network can use the counter value to determine what value the variable datum should have for the given counter value. This determination may be done based on an algorithm that is a function of the counter value (and/or other possible variables), or a look-up table whose entries are correlated to the counter value (the table may be cyclically repeated). The algorithm may comprise one or more random number generators, each of which accepts a starting "seed" value, whose value can be selected to customize the algorithm to a particular portable consumer device 5. The values of the look-up table may be based on the output of the algorithm. The variable datum may also be based on time, date, or other information known to both verification token 40 and entity 80, which may or may not use a counter value. Additional ways of generating the values of a variable datum are discussed in U.S. patent application Ser. No. 10/642,878 entitled "Method and System for Generating a Dynamic Verification Value" filed on Aug. 18, 2003, and in U.S. patent application Ser. No. 11/764,376 entitled "On-Line Payment Transactions" filed on Jan. 29, 2008. Both of these applications are incorporated herein by reference in their entirely for all purposes. In some implementations, there may be slight differences in the starting information that device 5 and entity 80 use in generating their respective datum values, such as differences in the times of their clocks, and entity 80 may generate a set of acceptable datum values based on possible slight differences in the starting information, and may compare the datum value received from device 5 with each member of the set to determine if a match exists.

A cryptogram, which typically has more characters than a CVC3 value or a dCVV value, may be generated by an algorithm in a similar way as described above, except that a piece of transaction information is usually included as an input to the algorithm. As previously described below, if token 40 seeks a cryptogram from a cryptogram-enabled device 5, it provides device 5 with dummy transaction information which is known to both token 40 and validation entity 80, but not known to the general public. When the variable datum received by entity 80 from token 40 comprises a cryptogram (which may be deduced from the character length of the variable datum or the account number of the device 5), validation 80 may look up the dummy transaction information in one of its databases 86 based upon the serial number of token 40. Validation entity 80 may determine the identity of the issuing bank 60 for the device 5 based on the device's account number, and may request the current value of the card's Application Transaction Counter (ATC) from the issuing bank 60. Entity 80 may then generate the cryptogram based on the dummy transaction information, the ATC, and other information used in the algorithm, and compare the generated cryptogram with the cryptogram received from token 40. If the cryptograms match, validation entity 80 can deem the fifth validation test as being passed. In some implementations, there may be slight differences in the ATC values that device 5 and entity 80 use in generating their respective cryptograms, and entity 80 may generate a set of acceptable cryptograms based on small incremental differences in the ATC value, and may compare the cryptogram received from device 5 with each member of the set to determine if a match exists. If a match cannot be found, the fifth validation test is deemed to have been failed. As another approach, validation entity 80 may forward a request for the cryptogram's value to the issuing bank 60 along with a copy of the dummy transaction information. Validation entity 80 may then compare the cryptogram received back from the issuing back to that received from token 40 to determine whether there is a match. As yet another approach, validation entity 80 may forward the dummy transaction information and the cryptogram received from token 40 to the issuing bank 60 with a request that the bank determine whether the cryptogram is valid or not, and to send its determination to validation entity 80. Validation entity 80 may then determine that the fifth validation test is passed if the bank sends an indication that the cryptogram received from token 40 is valid, and failed otherwise.

Before receiving identification information for a portable consumer device 5 from a token, the issuing bank for the device may provide validation entity 80 with the look-up table, algorithm (including any seed values), or other data elements that the device uses to generate the device's variable datum (e.g., CVC3, dCVV, or cryptogram), which entity 80 may store in one of its databases 86. When validation entity 80 receives identification information from a verification token 40 for a specific portable consumer device 5, it accesses its record of the look-up table, algorithm, or other data elements for the specific device 5 to determine its value or set of values for the device's variable datum, and compares the received value for a variable datum (e.g., CVC3, dCVV, or cryptogram) against its value or set of acceptable values for the variable datum to determine if the fifth validation test has been passed (e.g., a match in values is found), or has been failed (e.g., a match has not been found). To implement the fifth validation test, validation entity 80 may comprise code embodied on computer-readable medium 82 that directs data processor 81 to access the one or more stored data elements used to obtain the variable datum for the account from one of databases 86, code that directs data processor 81 to obtain one or more acceptable values for the variable datum from the one or more stored data elements, and code that directs data processor 81 to compare the received variable datum and the one or more acceptable values for a match to determine if the fifth test is passed (a match is found) or failed (a match is not found). The code that directs data processor 81 to obtain one or more acceptable values may be based upon the look-up table method described above, or any of the algorithm based methods described above. The codes may include instructions that direct data processor 81 to determine if a received variable datum comprises a cryptogram, and if so, to obtain the dummy transaction information from a database 86 based upon the serial number of the token. Depending upon the implementation for processing cryptograms, the code may further include instructions that direct data processor 81 to determine the identity of the issuing bank and to obtain an ATC value for the device 5 from the bank, and to generate one or more acceptable values of the cryptogram using the dummy transaction information, the ATC value, and other inputs used in the algorithm. Also, the code may further include instructions that direct data processor 81 to send the account information and the dummy transaction information to the identified issuing bank with a request for one or more acceptable cryptogram values. Also, instead of directing processor 81 to obtain one or more acceptable cryptogram values and to compare the cryptogram received from token 40 to the acceptable cryptogram values, the code may include instructions that direct data processor 81 to obtain the dummy transaction information as described above, to identify the issuing bank as described above, to send the account information, dummy transaction information, and the cryptogram received from token 40 to the identified bank with a request that the bank send back an indication of whether or not the cryptogram is valid, and to pass or fail the fifth validation test based on the indication sent back by the issuing bank. The above codes can be implemented with conventional I/O instructions, API function calls to databases, memory access instructions, CPU arithmetic instructions, CPU logic instructions, and CPU control instructions. In view of this disclosure, the codes may be implemented by one of ordinary skill in the art without undue experimentation.

Validation entity 80 may be configured to perform one or more of the above validation tests, and may be configured to send the 3-D secure indication, 3-D secure datum, and dCVV2 value to token 40, and to optionally send the dCVV2 value and account number to payment processing network 70, if one or more of the tests are passes. Validation entity 80 may comprise code embodied on computer-readable medium 82 that directs data processor 81 to execute a selected one or more of the validation tests and track the pass/fail results, and code that directs data processor 81 to send a message to the 3-D Secure System Directory Server (Action # C of FIG. 5) with the account number (PAN) of device 5, the merchant identifier and/or the transaction identifier, and optionally a 3-D Secure datum. If a 3-D secure datum is sent, the entity 80 has code embodied on computer-readable medium 82 that directs data processor 81 to obtain the 3-D Secure datum. The 3-D Secure datum is preferably dynamic, meaning that it changes value for each transaction (fully dynamic) or each set of transactions (partially dynamic). In response, as previously described above, the Directory Server identifies the Access Control Server (ACS) for the PAN received from validation entity 80, and forwards the account number (PAN), the merchant identifier and/or the transaction identifier, and optionally a 3-D Secure datum to the identified Access Control Server (ACS). The Access Control Server (ACS) responds to the Directory Server by sending an indication of whether the card number is participating in the 3-D Secure service (the "participation indication"), and by sending a 3-D Secure datum if one was not previously provided by validation entity 80. The Access Control Server also saves the account number (PAN), the merchant identifier and/or the transaction identifier, and the 3-D Secure datum in a computer record for later reference. the Directory Server then forwards to validation entity 80 the participation indication and the 3-D Secure datum if one was not previously provided by validation entity 80. Validation entity 80 includes instructions that direct processor 81 to receive this message from the Directory Server, which may include an indication of the PAN (such as the PAN itself), the participation indication, and the 3-D Secure datum if entity 80 did not previously generate it. The code then directs processor 81 to send the participation indication, the 3-D secure datum, and optionally the dCVV2 value (described below) to verification token 40. The code may include instructions that direct processor 81 to determine if the received participation indication indicates a non-participation status; if so, the code directs processor 81 to modify the 3-D Secure datum to indicate a non-participation status in the case when validation entity 80 initially generated the 3-D secure datum.

Validation entity 80 may obtain the 3-D Secure datum by obtaining it from an entity of the 3-D Secure system, such as from an Access Control Server, or by generating the datum itself. The 3-D Secure datum may be generated according to any desired method, which one of ordinary skill in the art can readily implement without undue experimentation. The 3-D Secure datum may be generated by using a pseudorandom number generator, or by using an algorithm that takes a set of inputs. The advantage of the algorithm is that it can used by several entities of the 3-D secure datum to recreate the 3-D Secure datum from the base inputs in order to verify the authenticity of the 3-D Secure datum. The algorithm may comprise a hashing function that uses the inputs as variables to the hashing function. The inputs may include one or more of the following: a dynamic value and/or fixed value from the token (e.g., a incrementing counter value, a fixed serial number), a dynamic value and/or fixed value from portable consumer device 5 (e.g., the device's variable datum, the fixed PAN), a dynamic and/or fixed value from the issuer bank 60 (e.g., counter value, bank name or identifier), a dynamic or fixed value from computer 10 (e.g., dynamic IP address, fixed CPU serial number), a dynamic or variable value from Merchant 20 (e.g., transaction amount, merchant counter, merchant name or identifier), a dynamic or variable value from Validation entity 80. Validation entity 80 comprises code that directs its data processor 81 to obtain or generate the datum. The code can be implemented with conventional I/O instructions, memory access instructions, CPU arithmetic instructions, CPU logic instructions, and CPU control instructions. In view of this disclosure, the codes may be implemented by one of ordinary skill in the art without undue experimentation.

As indicated above, validation entity 80, may be further configured to obtain and send a dCVV2 value along with the 3-D Secure datum. Since the dCVV2 value is being sent to both the merchant (relayed through verification token 40) and the payment processing network 70 (which may forward it to the issuing bank), validation entity 80 may use any method to generate the dCCV2 value, and need not use the method used by portable consumer device 5 to generate the variable datum (e.g., the CVC3 or dCVV). Validation entity 80 may generate the dCVV2 values using a pseudo-random number generator or a look-up table, or a sequential counter (such as when distributing the values from that counter over different accounts). The dCVV2 generation process can be done on a per transaction basis (fully dynamic), or for a group of transactions (semi-dynamic), the latter being for a particular device 5 or a group of devices 5. If two or more devices 5 are assigned under a common account number, the identification information sent by token 40 may comprises a device identifier as well as an account number, and validation entity 80 may use the device identifier to distinguish between the devices and to generate different dCVV2 values for the devices that are under a common account number. Validation entity 80 may use a particular dCVV2 value for a particular device 5 over a selected time period (such as three days), and then select another dCVV2 value for the particular device for the next selected time period, and so on. Moreover, validation entity 80 may receive the dCVV2 values to use during the selected time periods from the issuing bank of the device 5 in advance of the selected time periods, and store them for later use, as determined by entity 80's clock. This permits validation entity 80 to omit the action of sending the dCVV2 values to payment processing network 70. The device verification value provided by validation entity 80 may have the same format as the CVC3s and dynamic CVVs ("dCVVs") output by existing smartcard credit cards (e.g., a string of 3 or 4 numbers). As another approach, validation entity 80 may send a message to the issuing bank 60 for portable consumer device 5 to request a value to provide as the dCVV2 value; this request may include the account number and any device identifier. The above codes and actions can be implemented with conventional I/O instructions, memory access instructions, CPU arithmetic instructions, CPU logic instructions, and CPU control instructions. In view of this disclosure, the codes may be implemented by one of ordinary skill in the art without undue experimentation.

As described above, validation entity 80 may send to token 40 the user's shipping address information and/or billing address information that has been previously associated to device 5. The association may be stored in a database 86 of validation entity 80 or at the issuing bank 60 for device 5. Validation entity 80 may further comprise code that directs data processor 81 to obtain address information for the consumer account indicated by the account number in the received identification information, either from a database 86 or from an issuing bank 60, and to send the address information to token 40 along with the device verification value if a selected number of validation tests have been passed, as described above. The above codes and actions can be implemented with conventional I/O instructions, database function calls, network function calls, memory access instructions, CPU arithmetic instructions, CPU logic instructions, and CPU control instructions. In view of this disclosure, the codes may be implemented by one of ordinary skill in the art without undue experimentation.

As indicated above, validation entity 80 may be configured to send a dynamic account number (dPAN) to verification token 40 and the payment processing network 70 along with 3-D Secure datum and the dCVV2 value. Validation entity 80 may contact the issuing bank 60 for device 5 to obtain the dPAN, or may read it from a list of dPANs previously sent to entity 80 by bank 60 or created by entity 80 or network 70, or may generate it from an algorithm previously provided to entity 80 by bank 60. Validation entity 80 may comprise code embodied on computer-readable medium 82 that directs data processor 81 to execute these actions, as desired by the issuing bank. When payment processing network received the dCCV2 value, dPAN value, and the account number for device 5, it may forward all three datum to the issuing bank 60 so that the issuing bank can correlate the dPAN to the account number of device 5. The above codes and actions can be implemented with conventional I/O instructions, memory access instructions, CPU arithmetic instructions, CPU logic instructions, and CPU control instructions. In view of this disclosure, the codes may be implemented by one of ordinary skill in the art without undue experimentation.

Verification entity 80 may further comprise code that directs processor 81 to send an alert text message to the personal communication device 7 of user 1 or send an alert e-mail message to an e-mail account of user 1 when one or more of the following events occurs: (1) when verification token 40 initiates communications with entity 80, (2) when verification token 40 reads a portable consumer device 5 of user 1, (3) when verification entity 80 receives identification information from a portable consumer device 5 or a verification token 40 associated with user 1, (4) when verification entity 80 validates said identification information, (5) when verification entity 80 sends a 3-D Secure datum and/or a dCVV2 value to verification token 40, and (6) when verification entity 80 denies a request for a 3-D Secure datum and/or a dCVV2 value. The alerts sent by entity 80 may include information related to the events that triggered the alerts, such as a portion of the account number involved. The alert text messages may be sent from networking facility 84 to an SMS relay server 35 that is coupled to one of communications networks 31 and 32, along with the phone number or network address of the user's communication device 7. The SMS relay server has an interface to one or more mobile communication networks, and can relay the text message to the phone number or network address provided by processor 81. Validation entity 80 may comprise the relay server. Email alerts may be sent directly to the user's e-mail account from networking facility 84. For this, networking facility 84 may comprise a conventional mail agent, which is well known to the art.

Validation entity 80 may comprise a website accessible to the user 1 that enables the user: (1) to create a password-protected management account associated with the serial number of the token, the latter of which may be provided on a slip of paper originally sent with the token; (2) to associate an e-mail address to be used for one or more of the above-described alerts; (3) to associate a mobile number and/or URID (e.g., network address) of the user's communications device 5 to be used for one or more of the above-described alerts; and (4) to select one or more of the above-described alert conditions The website may also enable the user to provide and associate the account numbers for one or more of the user's devices 5 with the password-protected account, and may further enable the user to associate the e-mails and mobile numbers for the alerts to particular devices 5 according to their account numbers. The website may also enable the user to associate a shipping address and/or billing address to one or more specific device account numbers, which validation entity 80 may provide to token 40 for each 3-D Secure datum and/or dCCV2 request made for such a specified device account number. This association may include an option that the user can select for a specified device account that directs entity 80 to obtain the address information from the issuing bank 60 for the specified device account. The website may also enable the user to associate a shipping address and/or billing address to the token itself, which validation entity 80 may provide to token 40 for each validation request in which a shipping address and/or billing address has not been associated to the device account number contained in the validation request.

One of databases 86 may be assigned to hold the above-described password-protected accounts of the users. When validation entity 80 receives a validation request from verification token 40, code in entity 80 can direct processor 81 to query this database 86 to find the user's password-protected account (e.g., identify the user from the token's serial number and/or the account number sent in the identification information), to determine what text message alerts and emails are to be generated and sent based on the parameters stored in the password-protected account, to identify the mobile phone number or universal resource identifier (e.g., network address) of the personal communication device to which to sent the messages, and/or to identify the email address to which to send the messages, and to send the determined messages to the identified destinations. One or more alerts pertaining to a particular validation request may be combined together into a single text message or email to the user. Entity 80 can also have code that directs data processor 81 to determine from the account record if any shipping address information or billing address information is to be sent with the validation fulfillment message (e.g., message having the 3-D Secure datum and/or dCVV2 value) by looking up the settings that the user may have provided for the device account number indicated in the dCVV2 request message, and to send the address information to token 40 according to the found settings. The above codes and actions can be implemented with HTML page codes, XML page codes, and the like (e.g., web pages), conventional I/O instructions, memory access instructions, database API function calls, CPU arithmetic instructions, CPU logic instructions, and CPU control instructions. In view of this disclosure, the codes may be implemented by one of ordinary skill in the art without undue experimentation.

In cases where validation entity 80 sends a dPAN to a verification token, it may send an e-mail alert and/or text alert to the user providing the user with a transaction number that has been associated with the dPAN. The transaction number can enable the user to more easily return goods purchased in the transaction. The transaction number is different from the dPAN and the account number, but enables the transaction conducted with the dPAN to be traced back to the merchant and the issuing bank. For this, entity 80 may comprise code that directs data processor 81 to access the user's management account based on the account number obtained from the identification information received from token 40 to obtain a mobile phone number or universal resource identifier (e.g., network address) of a personal communication device associated with the account number, or an email address associated with the account number, and to which the transaction number is to be sent. Entity 80 may further comprise code that directs data processor 81 to send the transaction number along with the dPAN, date, time, and dCVV2 value to the obtained phone number or universal resource identifier of the personal communication device, or the obtained email address. The code also directs data processor 81 to send this information to payment processing network 70 and/or issuing bank 60, along with the account number for correlation purposes. The code may also direct data processor 81 to send the transaction number to token 40, and token 40 may have code that directs its processor 41 to enter this information in a visible or hidden field of the merchant's checkout page. Token 40's code for this may be implemented in the same way as the code for entering the dCVV2 value. The above codes and actions can be implemented with database function calls, conventional I/O instructions, memory access instructions, database API function calls, CPU arithmetic instructions, CPU logic instructions, and CPU control instructions. In view of this disclosure, the codes may be implemented by one of ordinary skill in the art without undue experimentation.

FIG. 10 illustrates an exemplary embodiment 180 of a method that can be used by validation entity 80. Exemplary method 180 comprises a plurality of actions 181-186. Action 181 comprises establishing a communication link between validation entity 80 and a verification token 40 using a networking facility of validation entity 80. Action 182 comprises receiving encrypted identification information pertaining to device 5 and/or token information (e.g., serial number and encrypted message) sent by verification token 40. Action 183 comprises decrypting the encrypted information (e.g., encrypted identification information and/or encrypted message from the token). Action 184 comprises applying at least one validation test to the decrypted information. Action 185 comprises obtaining and transmitting, if a selected number of validation tests are passed, a 3-D Secure datum to verification token 40, and optionally a dCVV2 value to both token 40 and payment processing network 70, as described above. In some implementations, a dPAN may be transmitted as well, as described above. In some implementations, shipping address information and/or billing address information may be transmitted as well, as described above. Action 186 comprises identifying the user from the identification information, and sending text and/or email alerts to the user as specified in the user's password-protected account.

Yet further embodiments and implementations are described.

It may be appreciated that some implementations of verification token 40 may be configured to work with selected consumer payment devices 5, such as those issued by a selected bank, or configured to work with a selected merchant website 20.

In yet further implementations, verification token 40 may contain the URID of validation entity 80, which handles validation requests for several different co-branded portable consumer devices 5. In addition, each of these co-branded devices 5 may hold a URID to a co-branding merchant. The merchant URID is read by verification token 40 and provided to a validation entity along with the device's identification information. Validation entity 80 can send the validated identification information to the merchant URID.

Embodiments of the invention are not limited to authentication systems involving transactions. The same approach could be applied for other authentication systems. For example, embodiments could be used to authenticate a user using an online banking application. A cardholder may enter his user ID into a banking website. The cardholder can then present his or her portable consumer device to a verification token. The banking website can validate the User ID and the token credentials by communicating with a validation entity.

Embodiments of the invention are not limited to the above-described embodiments. For example, although separate functional blocks are shown for an issuer, payment processing system, and acquirer, some entities perform all of these functions and may be included in embodiments of invention.

Access Control Server Embodiments. An exemplary access control server may have the same components, operating system, and network services and other software services as validation entity 80 described above. This illustrated in FIG. 13. The description of the components and operating system and services of entity 80 are incorporated here by reference and applied to the Access Control Server shown in FIG. 13. The ACS has various codes disposed on the tangible computer readable medium directs the operation of the ACS's data processor to perform the various tasks described above. A specific description of some of these codes is provided here. A first code directs the ACS's data processor to send a Purchase Authentication Page to a computer, the Purchase Authentication Page having a user response posting field to receive a response from a user. This code may comprise code that generates conventional secure web pages. A second code directs the ACS's data processor to receive a returned Purchase Authentication Page from the computer, the returned Purchase Authentication Page having a user response disposed in the user response posting field and a 3-D secure datum. These codes may comprises the same instructions that entity 80 uses to receive communications, as described above. A third code directs the ACS's data processor to compare at least a portion of the received user response to a stored user response to make a first determination of whether a match exists. A fourth code directs the ACS's data processor to compare the received 3-D secure datum to a stored 3-D secure to make a second determination of whether a match exists. A fifth code directs the data processor to generate a Payer Authentication Response message based on at least the first and second determinations. The third, fourth, and fifth codes may be implements by ALU arithmetic instructions, ALU control operations, memory access instructions, and networking instructions. For some of the variations, the ACS may comprise a code that directs the data processor to obtain the received 3-D secure datum from the user response posting field of the returned Purchase Authentication Page, or a portion thereof. the ACS may comprise a code that directs the data processor to send the Purchase Authentication Page with page display parameters with the Page that cause the Page to not be visible or fully visible on the computer's display.

Another exemplary access control server may comprises the following codes: code that directs a data processor to send a Purchase Authentication Page to a computer with page display parameters that cause the Purchase Authentication Page to not be visible or to not be fully visible on the computer's display, the Purchase Authentication Page having a user response posting field to receive a response from a user; code that directs the data processor to receive a returned Purchase Authentication Page from the computer, the returned Purchase Authentication Page having a 3-D secure datum; code that directs the data processor to compare the received 3-D secure datum to a stored 3-D secure to make a determination of whether a match exists; and code that directs the data processor to generate a Payer Authentication Response message based on at least the determination.

Another exemplary access control server may comprises the following codes: A computer program product embodied on a computer-readable medium, the product comprising: code that directs a data processor to send a Purchase Authentication Page to a browser window or browser frame of a computer which is not be visible or not be fully visible on the computer's display, the Purchase Authentication Page having a user response posting field to receive a response from a user; code that directs the data processor to receive a returned Purchase Authentication Page from the computer, the returned Purchase Authentication Page having a 3-D secure datum; code that directs the data processor to compare the received 3-D secure datum to a stored 3-D secure to make a determination of whether a match exists; and code that directs the data processor to generate a Payer Authentication Response message based on at least the determination.

Another exemplary access control server may comprises the following codes: code that directs the data processor to obtain a risk assessment of a 3-D Secure System transaction associated with the Purchase Authenticate Page; code that directs the data processor to send page display parameters with the Purchase Authentication Page that cause the Purchase Authentication Page to not be visible or to not be fully visible on the computer's display if the risk assessment is below a threshold value; and code that directs the data processor to send page display parameters with the Purchase Authentication Page that cause the Purchase Authentication Page to be visible on the computer's display if the risk assessment is above the threshold value.

Another exemplary access control server may comprises the following codes: code that directs a data processor to obtain a risk assessment of a 3-D Secure System transaction; code that directs the data processor to generate a Purchase Authenticate Page for the -D Secure System transaction; code that directs the data processor to send the Purchase Authentication Page to a computer with page display parameters that cause the Purchase Authentication Page to not be visible or to not be fully visible on the computer's display if the risk assessment is below a threshold value; and code that directs the data processor to send the Purchase Authentication Page to the computer with page display parameters that cause the Purchase Authentication Page to be visible on the computer's display if the risk assessment is above the threshold value.

The above codes can be implemented with conventional I/O instructions, API function calls to databases, memory access instructions, CPU arithmetic and logic instructions, and CPU control instructions. In view of this disclosure, the codes may be implemented by one of ordinary skill in the art without undue experimentation. Also, in may be appreciated that the codes carry out method actions, which are summarized by one or more of the attached claims.

Token—Verification Entity Gateway Embodiments. In each of the embodiments described herein, the communications between computer 10 and validation entity 80 may be facilitated by, and/or conveyed through, a gateway (e.g., a proxy server, server entity, etc.) that is disposed between computer 10 and validation entity 80. Such a gateway is shown at 90 in FIG. 11. Gateway 90 may act as an intermediary between a plurality of verification tokens 40-A, 40-B, . . . and their associated computers 10-A, 10-B, . . . on the one side, and a plurality of validation entities 80-A, 80-B, . . . on the other side. Tokens 40-A, 40-B, . . . may be constructed and configured the same as token 40 shown in FIG. 6, and may interact with respective computers 10-A, 10B, . . . , respective users 1-A, 1-B, . . . , and respective portable consumer devices 5-A, 5-B, . . . . Computers 10-A, 10B, . . . may be the same as computer 10 shown in FIG. 6, and may be coupled to the first communications networks 31, as described above. First communications network 31, second communications network 32, merchant websites 20, acquiring banks 50, issuing banks 60, and payment processing network 70 are coupled to one another as described above. First and second communications networks 31, 32 are also coupled to a plurality of validation entities 80-A, 80-B, 80-C, . . . , each of which may be constructed and configured the same as validation entity 80 shown in FIG. 6.

In the below discussion of the embodiments and implementations shown in FIG. 11, a reference number without a suffix -A, -B, or -C generically refers to each of the suffixed items (e.g., entity 80 refers to each of 80-A, 80-B, 80-C).

Gateway 90 may receive one or more initial communications from one of verification tokens 40-A, 40-B, . . . (via one of computer 10-A, 10B, . . . in communication with the token), and may determine from information in the initial communication(s) an appropriate one of a plurality of validation entities 80-A, 80-B, 80-C, . . . to use to fulfill the token's request for a dCVV2 value. For example, each verification token 40-A, 40-B, . . . may be configured to operate with portable consumer devices 5 issued by many different issuing banks 60 or other such entities, and one or more of the validation entities 80 may be configured to process requests from portable consumer devices 5 issued by respective issuing banks 60 or other such entities. Gateway 90 may determine an appropriate one of validation entities 80-A, 80-B, 80-C, . . . based upon the identification information that the token read from a portable consumer device and sent to the gateway in an initial communication. For example, a portion of the account number in the identification information may comprises an unique identifier assigned to the bank 60 that issued the portable consumer devices 5 from which the identification information was read.

In one implementation, after gateway 90 has determined an appropriate validation entity for the token's request, the gateway may redirect the token to conduct further communications with the determined appropriate validation entity, or may direct the determined validation entity to contact the token to conduct further communications. In another implementation, all communications between the verification token and the determined appropriate validation entity may be conveyed through gateway 90 (after the gateway has initially determined the identity of the appropriate validation entity based upon one or more initial communications with the token). This latter implementation may comprise relatively simple passing through of communications between the token and the appropriate validation entity with minimal processing by gateway 90, or may comprise having the gateway virtually presenting itself as the appropriate validation entity to the verification token. Such virtual presentation may involve gateway 90 decrypting each message from the verification token, communicating with the appropriate validation entity to formulate a response to the token's message, and encrypting and sending a response message to the verification token. In each of the above implementations, and in other implementations, gateway 90 may also conduct one or more validation tests on behalf of the appropriate validation entity, particularly those related to validating the verification token. In this case, the gateway does not need to send to the determined appropriate validation entity those communications it receives from the token that pertain to validation tests that the gateway is handling. Gateway 90 may be associated with, or operated by, payment processing network 70 or the owner thereof. It may be appreciated that, in each of these implementations, Gateway 90 acts as an entity that can provide a 3-D secure datum and a device verification value (dCVV2 value) to token 40, just as in the case that validation entity 80 can provide a 3-D secure datum and a a device verification value to token 40 when entity 80 is directly contacted by token 40.

Figure 11:
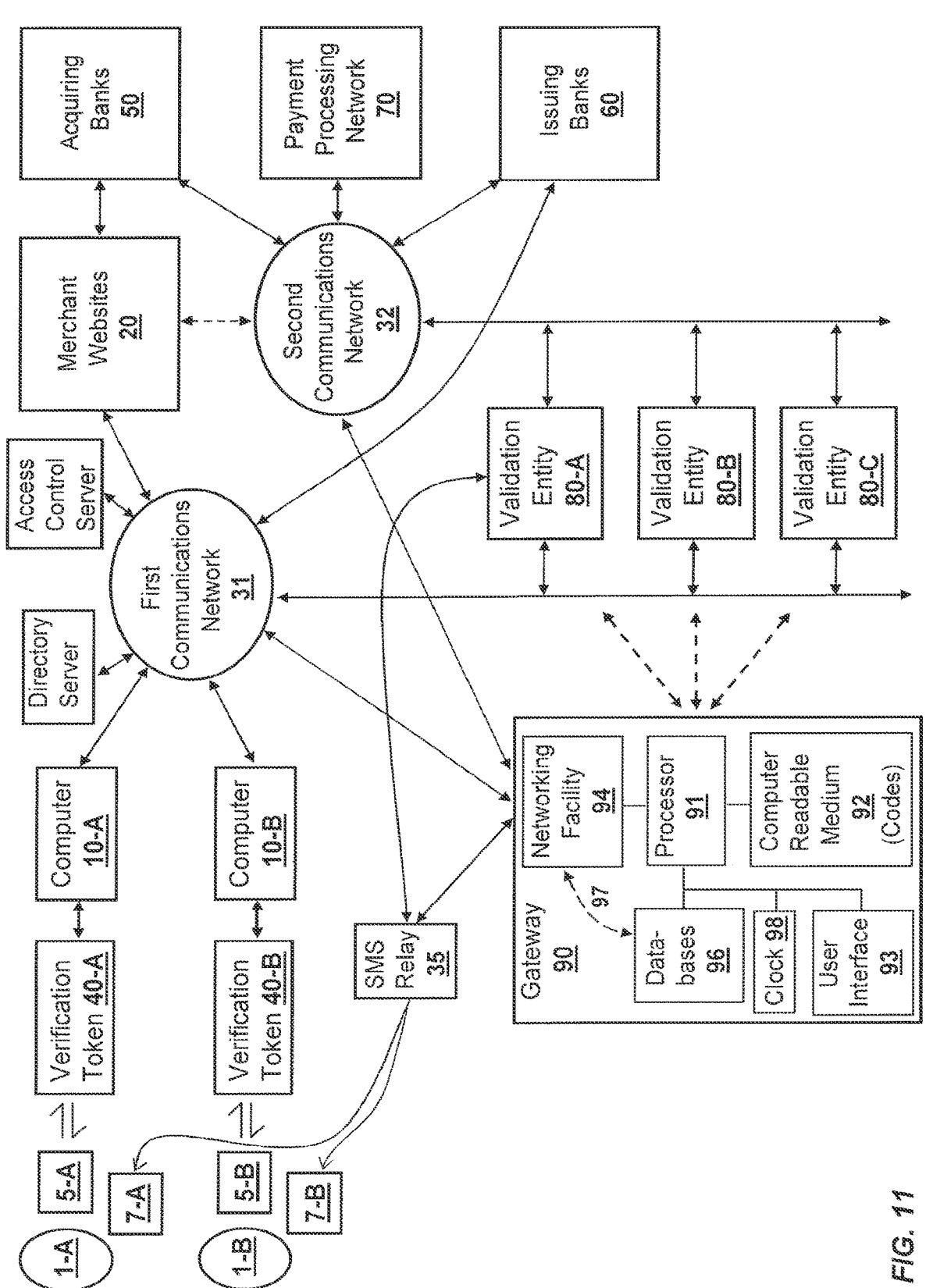
FIGS. 11 and 12 illustrate further embodiments of the invention.

Referring to FIG. 11, gateway 90 comprises a system having one or more servers coupled to a communications network that can receive a request from a verification token 40 to process, as described above. One of the servers of gateway 90 is shown in FIG. 11; the server comprises one or more processors 91 electrically coupled to each of a tangible computer-readable medium 92, a user interface 93, one or more databases 96, and a networking facility 94, the latter of which is coupled to first and second communications networks 31 and 32. User interface 93 comprises one or more video output devices (e.g., displays, screens) and one or more input devices (e.g., keyboard, mouse, trackball, etc.), which enable an administrator of gateway 90 to receive information from the server and to provide input to the server. Computer-readable medium 92 may comprise a combination of semiconductor memory and non-volatile storage, such as one or more disk drives and/or non-volatile memory.

Computer-readable medium 92 stores an operating system for the server, which enables processes and applications to be run by processor(s) 91, and enables codes for directing the operation of processor(s) 91 to be run. The operating system provides services to these processes and applications, and enables these processes and applications to access components of user interface 93, portions of computer-readable medium 92, networking facility 94, and other components of entity 90. The operating system may be full featured. Specifically, the operating system provides one or more I/O communications modules that enable processor(s) 91 to communicate with user interface 93 and databases 96. Each I/O communications module has an application programming interface (API) with a collection of functions that a processor 91 can call in order to access the components. The operating system of entity 90 also comprises one or more network services modules that can access networking facility 94 and set up communications sessions to entities on communications networks 31 and 32, and with SMS relay server 35. Such network services modules include Microsoft's Windows Communications Foundation (e.g., .NET 3.0, .NET 4.0, etc.), Apple's CFNetwork Framework, the networking section of the Unix and Linux operating system kernels, and the OS Services Layer and the Base Services Layer of the Symbian operating system, and the like. Each of these network services modules can be non-exclusive (e.g., capable of serving more than one processor and more than one process/application) and each provides an application programming interface (API), which has a collection of functions that a processor 91 can call in order to manage communications with another entity. With these API facilities, a collection of API function calls can be readily constructed for a processor to execute that enables the processor to establish a communications channel with an entity on a communications network coupled to networking facility 94, and to exchange messages and data with the entity. The above operating system, modules, and APIs all include instructions that direct the operation of processor(s) 91.

One or more databases 96 may be configured as database servers, which processor(s) 91 can access via networking facility 94 over a private communications network 97, which is illustrated by the dashed line in FIG. 11. Gateway 90 conventionally has a clock 98 for tracking time and dates for various applications. Clock 98 may be a simple counter of seconds, or fractions thereof, that can be read by processor 91 by an I/O operation, or may comprise a more complex arrangement of hardware or firmware that can provide the various components of the current date and time (year, month, day, hour, minute, and second) in various registers that can be read by processor 91 through the execution of one or more I/O operations.

Gateway 90 may comprise code embodied on computer-readable medium 92 that directs data processor 91 to communicate with a computer 10 and an associated verification token 40 using networking facility 94 over communications network 31. This code may include instructions that establish a communications session with computer 10, including the option of establishing an SSL session with mutual authentication and encryption based on a triple DES algorithm, and instructions for sending and receiving messages to verification token 40 through the communications session. Gateway 90 may further comprise code embodied on computer-readable medium 92 that directs data processor 91 to receive encrypted identification information sent by verification token 40, and code that directs data processor 91 to decrypt the encrypted identification information. The identification information may be encrypted by a session key of an SSL session or by an encryption key stored in verification token 40 and known to gateway 90, or may be doubly encrypted by both keys. The latter key may be uniquely assigned to the token, as described above. Gateway 90 may further comprise code embodied on computer-readable medium 92 that directs data processor 91 to determine, from the received identification information and/or the token's identity (e.g., the token's serial number), the appropriate one of the validation entities 80-A, 80-B, 80-C, . . . to be used for further processing of the request from verification token 40. For this, data processor 91 may access one of databases 96 for a correlation list that relates identification information (or portions thereof) to validation entities 80, and/or for a correlation list that relates token identifiers to validation entities 80, and may then compare the information received from the token 40 with the correlation list(s) to determine the appropriate one of the validation entities 80. Gateway 90 may further comprise code embodied on computer-readable medium 92 that directs data processor 91 to apply one or more validation tests as previously described above, and to continue processing the request from token 40 if a selected number of validation tests are passed. Various ways of continuing the processing are described below in various possible implementations of gateway 90. The above codes for gateway 90, and codes for gateway 90 described below, may be implemented in any number of programming languages. Furthermore, one of ordinary skill in the art will be readily able to construct instructions to implement these codes in view of this disclosure without undue experimentation.

In one implementation, gateway 90 may further comprise code embodied on computer-readable medium 92 that directs data processor 91 to send a communication to token 40 (by way of its associated computer 10) informing the token to contact the determined appropriate validation entity

80 to obtain a dCVV2 value. This communication may include a URID for the determined appropriate validation entity. Token 40 may then communicate with the determined appropriate entity 80 as described above, and no changes to entity 80 are needed. In this implementation of gateway 90, the code may further direct data processor 91 to send a communication to the determined appropriate validation entity 80 that informs the entity of the request from the token 40 (along with an indication of the identification information sent by token 40), and informs the entity that the token 40 will be contacting it for a dCVV2 value for the identification information (as sent to gateway 90 by the token 40). This communication by gateway 90 can serve as an additional security measure that assures the appropriate validation entity 80 that the subsequent contact by token 40 is legitimate.

In another implementation, gateway 90 may further comprise code embodied on computer-readable medium 92 that directs data processor 91 to send a communication to the determined appropriate validation entity 80 with an indication of the identification information received from the verification token 40, and with a request for the validation entity to generate a 3-D secure datum and a a dCVV2 value for the identification information and to send the 3-D secure datum and the dCVV2 value to the verification token 40 (by way of its associated computer 10). This communication may include a URID for the verification token 40. The codes of the validation entity 80 previously described above may be augmented to direct the entity's processor 81 to receive above-described communication from gateway 90, and to initiate communications with the requesting token 40. The codes of validation entity 80 need not need to direct the entity's processor 81 to receive the identification information from the requesting token (as that may have been provided to the entity by gateway 90); however, as an added security measure, the requesting token 40 may provide the identification information to entity 80, and the entity may include the code to receive the identification information from the token. In this implementation of gateway 90, the code for gateway 90 may further direct data processor 91 to send a communication to the verification token 40 (via the associate computer 10) informing the token that the determined appropriate validation entity 80 will be communication with it to potentially send a dCVV2 value.

In yet another implementation of gateway 90, the gateway may further comprise code embodied on computer-readable medium 92 that directs data processor 91 to: (1) send the initial communication from the requesting token 40 and/or an indication of the identification information sent by the requesting token 40 to the determined appropriate validation entity 80 to obtain a 3-D secure datum and a dCVV2 value; (2) to receive back a 3-D secure datum and a dCVV2 value from the appropriate validation entity 80; and (3) to send the 3-D secure datum and the dCVV2 value to the verification token 40. This implementation of gateway 90 enables a validation entity 80 to omit the code for establishing communications with the computer 10 used by the requesting verification token 40 (that task may be handled by gateway 90). Those codes of entity 80 described above that direct communications with token 40 may be modified to direct the communications to gateway 90 instead. This implementation of gateway 90 enables the requests from many tokens 40 to be grouped together for more efficient handling by entity 80. In addition, since gateway 90 is virtually presenting itself to the verification token 40 as a validation entity, gateway 90 can serve as an Internet firewall and protect the validation entities 80-A. 80-B, . . . from malicious Internet attacks.

In yet another implementation, gateway 90 handles the initial communications with token 40 to determine the appropriate validation entity 80, and then hands over the communication channel to the determined validation entity 80 to complete the fulfillment of the token's request. All communications between the requesting token 40 and the determined entity 80 may be conveyed through gateway 90. If gateway 90 has previously established an SSL session with the requesting token 40, gateway 90 may send the session key(s) and protocols to the determined entity 80 so that the entity can take over the session (e.g., take over encrypting the communications to the token with the session keys and protocols). For this implementation, gateway 90 may further comprise code embodied on computer-readable medium 92 that directs data processor 91 to (1) send a communication to the determined appropriate validation entity 80 with an indication that it is to handle further communications with the requesting token (as routed through gateway 90) and, optionally, session information (which may include SSL session keys and protocols), (2) to forward further communications that gateway 90 receives from the requesting token 40 to the determined entity 80, and (3) to forward communications that gateway 90 receives from the determined entity 80 to the requesting token 40. For this, gateway 90 may maintain a table in memory or one of its databases 96 that tracks channels that are currently being passed through gateway 90, with each record in the table having the identity of the requesting token, the determined validation entity, and session information. To carry out the above second action, the code may direct processor 91 to access the channel table to locate the determined entity 80 for the requesting token 40, an to then forward the communication packets from the requesting token to the entity that was located in the table. Gateway 90 may encapsulate these forwarded communication packets to preserve their header information, and may include an indication of the identity of the requesting token 40 for the benefit of the determined entity 80. To facilitate the above third action, the determined validation entity 80 may send its communication packets for the requesting token 40 to gateway 90 in encapsulated form, optionally along with an identifier that identifies the requesting token in the capsule. Gateway 90 can then include code that directs its data processor 91 to extract, from the encapsulated packet, the token identifier and the packet that is to be sent to the requesting token 40. If the extracted packet already has the destination address for the computer 10 coupled to the requesting token 40, then the encapsulated packet does not need to include the identity of the requesting token. If the extracted packet does not include the destination address, the code of gateway 90 may direct data processor 91 to determine the destination address from the extracted token identifier and the above-described table of channel information, and to insert the determined destination address into the extracted packet before sending it to computer 10. This action can provide an additional layer of security. In addition, since gateway 90 is virtually presenting itself to the verification token 40 as a validation entity, gateway 90 can serve as an Internet firewall and protect the validation entities 80-A. 80-B, . . . from malicious Internet attacks.

The above implementation of gateway 90 enables a validation entity 80 to omit the code for establishing communications with the computer 10 used by the requesting verification token 40 (that task is handled by gateway 90), and to include code that directs processor 81 to receive the indication from gateway 90 that it is to handle further communications with the requesting token 40 (as routed through gateway 90) and, optionally, to receive the session information for the further communications (which may include SSL session keys and protocols). Those codes of entity 80 described above that direct communications with token 40 may be modified to direct the communications through gateway 90. For this, validation entity 80 may further comprise code embodied on computer-readable medium 82 that directs data processor 81 to create and maintain a table in memory or one of its databases 86 that tracks channels that are have been handed over from gateway 90; each record in the table may have the identity of the requesting token, the identification information of gateway 90, and the session information. The communication codes of entity 80 may be modified to receive encapsulated communication packets from gateway 90, to extract from these packets the communication packets from token 40, and to consult the above table to find the identity of token 40 and session information if such cannot be determined from source address of the extracted communication packets or any token identity sent by gateway 90 in the capsulated packets. The communication codes of entity 80 may also be modified to encapsulate the communication packets for token 40 in packets to be sent to gateway 90, optionally along with an identifier that identifies the requesting token in the capsule, and to send the encapsulated communication packets to gateway 90.

Figure 12:
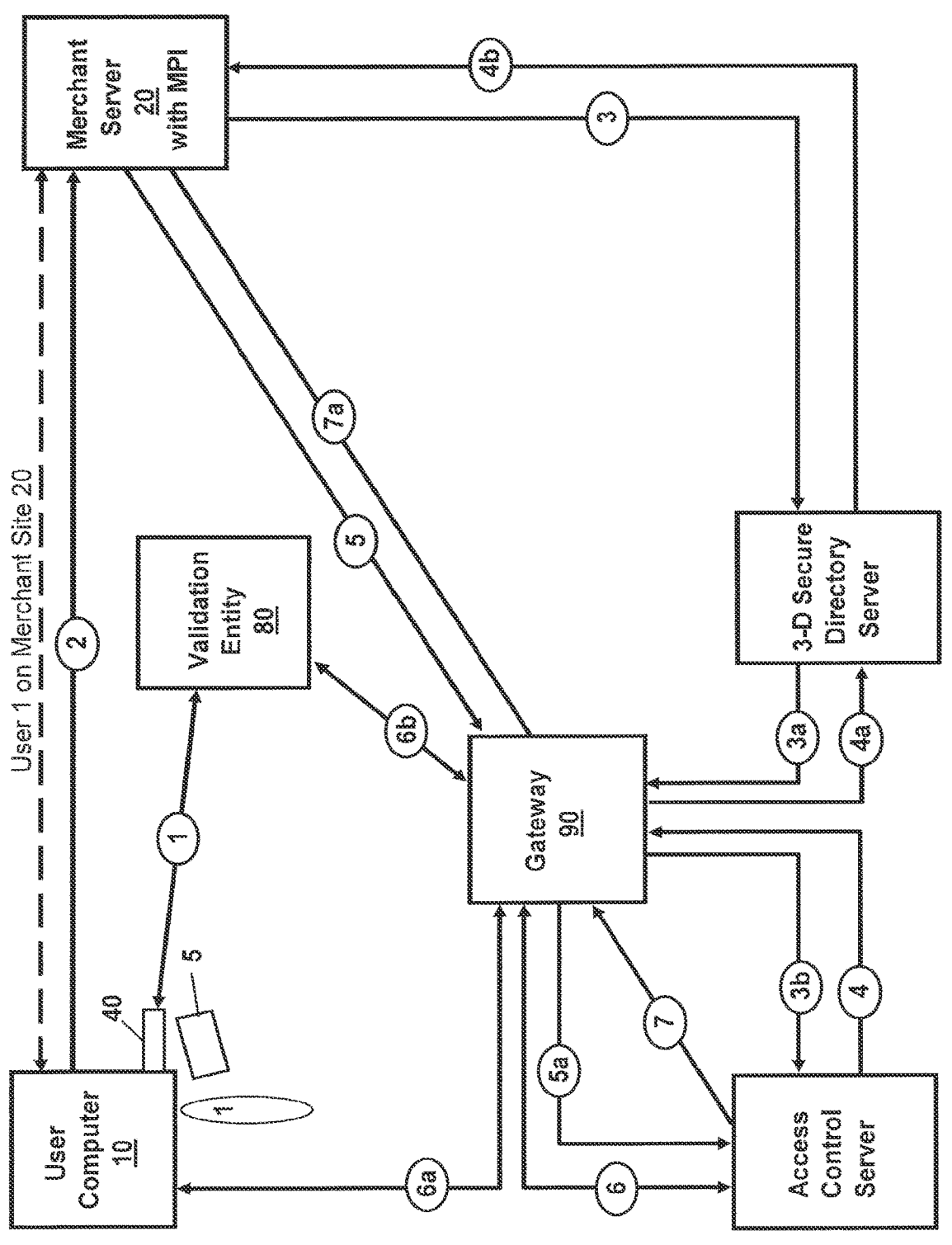

3-D Secure Gateway Embodiments. The Interfacing capability of gateway 90 may instead be used to provide an intermediary interface between many entities of the 3-D Secure System, as illustrated in FIG. 12. Such an intermediary interface has the ability to track a large segment of transactions conducted in the 3-D Secure System for the purposes of security and analysis. It should be pointed out that the components illustrate in FIG. 12 may be interconnected to one another according to the topology shown in FIG. 11. These entities are physically separated from one another, and have separate and distinct network addresses on the communication networks 31 and 32. A number of actions are illustrated in FIG. 12. In action #1, user 1 present portable consumer device 5 to token 40 to obtain the card's identification information and to obtain the 3-D Secure datum and dCVV2 value from validation entity 80, as described above. In action #2, user 1 provides, with the optional help from token 40 as described above, the payment information to merchant 20. In action #3, merchant 20's Merchant Server Plug-in (MPI) sends the device's card number (account number, PAN), and other user device information if applicable, to the Directory Server in a verification request (VEReq). In action #3*a*, the Directory Server sends a secure communication to gateway 90 providing the information it has received from the merchant's MPI along with a request that it determine if the user's device 5 (e.g., PAN) participates in the 3-D Secure System (e.g, a verification request, or VEReq). Gateway 90 is configured to receive this request from the Directory Server, which is normally sent to the Access Control Server directly. Based on the value of the PAN that merchant 20 provides it and routing information provided by the Directory Server, gateway 90 determines the identity of Access Control Server (ACS) that handles 3-D Secure requests for device 5 (e.g., for the PAN). In action #3*b*, gateway 90 sends a secure communication to the determined Access Control Server providing the device's PAN and a request that it return a determination of whether the PAN participates in (e.g., is enrolled in) the 3-D Secure System (Verification request, or VEReq). In action #4, the determined Access Control Server makes this determination, and sends a verification response to gateway 90 that includes the determination. In action #4a, gateway 90 sends this verification response containing the determination to the Directory Server in a secure communication, which in turn sends it to merchant 20's MPI in action #4b as a Verification Response (VERes). If the determination indicates non-participation, no further action under the 3-D system and gateway 90 occurs. If the determination indicates participation, gateway 90 creates an Authentication record to for further processing, the Record including details about the Verification Request (VEReq) and the Verification Response (VERes), information provided in the request and response, including the PAN, the identity of the Access Control Server that handles 3-D Secure requests for the PAN, and the date and time of the request. This Authentication Record will be accessed and augmented with further information in subsequent actions described below related to fulfilling a Payer Authentication Request (PAReq). If the determination indicates participation, gateway 90 also includes in the verification response sent in action #4a a uniform resource locator (URL) to itself to which the MPI can contact to begin the 3-D Secure Payer Authentication process with user 1. This URL may include a parameter or other indication that identifies the Authentication Record that gateway 90 just created for the PAN.

Merchant 20's Merchant Plug-In (MPI) opens a communication frame or window on the cardholder's browser on computer 10, which will be subsequently used to present the Purchase Authentication Page to the user. In action #5, merchant 20's MPI sends a Payer Authentication Request (PAReq) to gateway 90 via the communication frame or window that the MPI opened on the cardholder's browser. The MPI's PAReq includes the URL to gateway 90 provided in the VERes communication that the MPI received from the Directory Server, and the URL to the communication frame or window on the user's computer 10. Gateway 90 uses the PAN provided in the MPI's PAReq and/or the parameter or indication in the URL to Gateway 90 (as described above) to locate its Authentication Record for the Payer Authentication Request (PAReq), and from that record determines the Access Control Server that handles Payer Authentication Requests for the PAN provided in the MPI's PAReq. In action #5a, gateway 90 sends a modified Payer Authentication Request (modified PAReq) to the determined Access Control Server indicated in the Authentication Record. The modified PAReq contains the same information as the MPI's PAReq, but instead provides a URL to Gateway 90 rather than the URL to the communication frame or window on the user's computer 10. (The URL to Gateway 90 may include a parameter or indication that identifies the Authorization Record for the request on Gateway 90.) Gateway 90 records receipt of the MPI's PAReq and transmission of the modified PAReq, including the details, dates and times of these requests, in the Authentication Record for the request.

In response to receiving the modified PAReq from Gateway 90, the Access Control Server generates the Purchase Authentication Page, including a blank hidden posting field for a 3-D Secure datum if appropriate, and sends it to the URL for Gateway 90 that was provided in the modified PAReq, rather than to the communication frame or window on the user's computer 10. This is shown as action #6 in FIG. 12. Gateway 90 receives the Purchase Authentication Page from the Access Control Server. The URL that Gateway 90 receives from the Access Control Server preferably includes a parameter or indication that identifies the Authorization Record on Gateway 90 for the request so that Gateway 90 can readily locate the record and obtain from there the URL to the communication frame or window on the user's computer 10. Gateway 90 then forwards the received Purchase Authentication Page to the communication frame or window on the user's computer 10. This is shown as action #6a in FIG. 12. Gateway 90 then records receipt of the ACS's Purchase Authentication Page and transmission of the Purchase Authentication Page to computer 10, including the details, dates and times thereof, in the Authentication Record for the request.

At this point, user 1 and token 40 fill in the Purchase Authentication Page as described above, such as with token 40 entering the 3-D Secure datum into the hidden posting field that was previously generated by the Access Control Server and the user entering a password in a password posting field. The filled in page is then returned to Gateway 90. This is also shown as action #6a. The URL that Gateway 90 provided to computer 10 may include a parameter or indication that identifies the Authorization Record for the request on Gateway 90 so that Gateway 90 can locate the Authorization Record. Gateway 90 examines the filled-in Purchase Authentication Page to see if a 3-D Secure datum is present. If the presence of the 3-D Secure datum is detected, Gateway 90 determines the identity of the validation entity 80 for portable consumer device 5, such as by looking at the PAN recorded in the Authorization Record, and sends a secure communication to validation entity 80 to request the 3-D Secure datum that it last sent to computer 10 for device 5 (e.g., the last 3-D secure datum provided for the PAN). This is illustrated by Action #6b in FIG. 12. The Validation entity 80 returns a 3-D secure datum to Gateway 90, which is also illustrate by action #6b. Gateway 90 records the receipt of the filled-in Purchase Authentication Page from computer 10 and the receipt of the 3-D secure datum from validation entity 80 in the Authentication Record for the request.

Gateway 90 then compares the 3-D Secure datum received in the filled-in Purchase Authentication Page from computer 10 to the 3-D Secure datum received from validation entity 80. Gateway 90 sends the filled-in Purchase Authentication Page to the Access Control Server with an indication of whether the two 3-D secure datums matched, where the indication may be sent in a hidden status field of the filled-in Purchase Authentication Page, and stores an indication thereof in the Authentication Record for the request. This is also indicated as action #6 in FIG. 12. A matching of the datums provides a degree of assurance to the Access Control Server that the user's device 5 was actually present during the transaction. The Access Control Server can then generate the Purchase Authentication Response (PARes) according to its criteria, which may include weightings that depend upon whether the datums matched and upon whether the password/answer was correct. Typically, the ACS will generate a positive PARes when the password/answer is correct and the datums matched, and will generate a negative PARes if the password/answer is incorrect, regardless of whether the datums matched. If the datums do not match, but the password/answer is correct, the ACS may generate a positive PARes for a transaction amount below a threshold level, and a negative PARes for a transaction amount above a threshold level. If Gateway 90 does not find a 3-D secure datum in the filled-in Purchase Authentication Page, it may send an indication of that fact to the ACS along with the filled-in Purchase Authentication Page, and the ACS may generate the PARes according to a set of conventional criteria.

After it generates the PARes, the Access Control Server sends the PARes to Gateway 90. This is indicated as action #7 in FIG. 12. Gateway 90 receives this with an indication or URL parameter that identifiers the Authorization Record. Gateway 90 records the PARes in the Authorization Record, and locates from the record the URL to the communication frame or window on the user's computer 10. Using this URL, Gateway 90 then sends the received PARes to the communication frame or window on the user's computer 10. This is illustrated as action #7a in FIG. 12. Merchant 20's MPI receives the Payer Authentication Response (PARes) by way of the communication frame or window on the user's computer 10. The MPI validates the PARes signature (either by performing the validation itself or by passing the message to a separate Validation Server). If appropriate, the merchant 20 proceeds with the authorization exchange with its acquirer 50. The acquirer 50 processes the authorization request with the payment processing network 70 and returns the authorization response to the merchant 20.

With that description, it may be appreciated that Gateway 90 can be readily constructed to operate in the above manner, with the following codes embodied on memory 92 that direct its data processor 91 to perform various actions. The following codes handle the processing of the Verification Request (VEReq) and Verification Response (VERes). A first code directs data processor 91 to receive, at gateway server 90, a verification request from a 3-D Secure Directory Server for a determination of whether a personal account number is enrolled in a 3-D Secure system. A second code directs data processor 91 to determine the identity of a 3-D Secure Access Controller that handles verification requests for the personal account number of the received verification request. A third code directs data processor 91 to send a communication to the determined Access Control Server providing personal account number and a request that it return a verification response that includes an indication of whether the personal account number is enrolled in a 3-D Secure system. A fourth code directs data processor 91 to receive, at the gateway server, a verification response from the determined Access Control Server, to modify the verification response to include a uniform resource locator pointing to the gateway server, and to send the modified verification response to the Directory Server.

The following codes handle the processing of the Payer Authentication Request (PAReq), a Purchase Authentication Page, and Purchase Authentication Response (PARes). A fifth code directs data processor 91 to receive, at the gateway server, a Payer Authentication Request generated by a 3-D Secure Merchant Plug-in and sent by a user computer, to modify the Payer Authentication Request to include a uniform resource locator to the gateway server, and to send the modified Payer Authentication Request to the determined Access Control Server. A sixth code directs data processor 91 to receive, at the gateway server, a Purchase Authentication Page from the determined Access Control Server, to modify the Purchase Authentication Page to include a uniform resource locator to the gateway server, and to send the modified Purchase Authentication Page to the user computer. A seventh code directs data processor 91 to receive, at the gateway server, a returned Purchase Authentication Page from the user computer, to detect the presence of a 3-D Secure datum in the Purchase Authentication Page, and to obtain the 3-D Secure datum if present. An eighth code directs data processor 91 to determine a personal account number associated with the returned Purchase Authentication Page, to determine the identity of a validation entity that handles verification requests for the determined personal account number, and to send a request to the validation entity for the last 3-D Secure datum issued by the validation entity. A ninth code directs data processor 91 to receive, at the gateway server, a 3-D Secure datum from the validation entity and to compare the 3-D Secure datum obtained from the returned Purchase Authentication Page to the 3-D Secure datum received from the validation entity to determine if there is a match between the two 3-D Secure datums. A tenth code directs data processor 91 to modify the returned Purchase Authentication Page to include a uniform resource locator to the gateway server and a validation indication based upon whether the two 3-D Secure datums matched, and to send the modified Purchase Authentication Page to the determined Access Control Server. An eleventh code directs data processor 91 to receive, at the gateway server, a Purchase Authentication Response from the determined Access Control Server, and to send the Purchase Authentication Response to the user computer.

The following codes handle the creation and recording of information in the Authentication Record. The fourth code includes instructions to create an authentication record if the verification response comprised a determination that the personal account number is enrolled in a 3-D Secure system, the authorization record including at least the personal account number, and preferably other information such as the date of the request and the identity of the Access Control Server for the personal account number. The fourth code may further include instructions to record information about the verification request and information about the verification response in the authorization record. The fifth code may include instructions to record information about the received Payer Authentication Request and information about the modified Payer Authentication Request in the authorization record. The sixth code may include instructions to record information about the received Purchase Authentication Page and information about the modified Purchase Authentication Page in the authorization record. The seventh may code includes instructions to record information about the returned Purchase Authentication Page in the authorization record, and the tenth code may include instructions to record information about the modified returned Purchase Authentication Page in the authorization record. The information that may be recorded for each of these items may comprises all or a portion of each item, plus the date and time in which the item was processes.

With that description, it may be appreciated that Gateway 90 can be configured to perform the following method actions: receiving verification request from a 3-D Secure Directory Server for a determination of whether a personal account number is enrolled in a 3-D Secure system; determining the identity of a 3-D Secure Access Controller that handles verification requests for the personal account number of the received verification request; sending a communication to the determined Access Control Server providing the personal account number and a request that it return a verification response that includes an indication of whether the personal account number is enrolled in a 3-D Secure system; receiving a verification response from the determined Access Control Server; sending the verification response to the Directory Server; receiving a Payer Authentication Request generated by a 3-D Secure Merchant Plug-in and sent by way of a user computer; sending the received Payer Authentication Request to the determined Access Control Server; receiving a Purchase Authentication Page from the determined Access Control Server; sending the received Purchase Authentication Page to the user computer. receiving a returned Purchase Authentication Page from the user computer; obtaining a 3-D Secure datum from the Purchase Authentication Page; determining a personal account number associated with the returned Purchase Authentication Page; obtaining a valid 3-D Secure datum for the determined personal; comparing the 3-D Secure datum obtained from the returned Purchase Authentication Page to the valid 3-D Secure datum to determine if there is a match between the two 3-D Secure datums; sending the returned Purchase Authentication Page to the determined Access Control Server with a validation indication that is generated based upon at least whether the two 3-D Secure datums matched. It may be appreciated that sending the returned Purchase Authentication Page to the determined Access Control Server may comprises modifying the returned Purchase Authentication Page to include a validation indication that is generated based upon at least whether the two 3-D Secure datums matched; and sending the modified returned Purchase Authentication Page to the determined Access Control Server.

The above codes can be implemented with conventional I/O instructions, API function calls to databases, memory access instructions, CPU arithmetic and logic instructions, and CPU control instructions. In view of this disclosure, the codes may be implemented by one of ordinary skill in the art without undue experimentation. Also, in may be appreciated that the codes carry out method actions, which are summarized by one or more of the attached claims.

From the above descriptions, it may be appreciated that validation entities 80 and gateway 90 are separate entities from computers 10, and are separate entities from verification tokens 40. It may also be appreciated that in several embodiments and implementations thereof that computers 10, validation entities 80, and gateway 90 are addressed as separate network nodes on communications network 31 (e.g., have different network addresses in the communication packets), and that tokens 40 communicate through the network nodes of computers 10 to entities 80 and/or gateway 90 (e.g., computers 10 construct and decode network communication packets for tokens 40). it may be also appreciated that, in several embodiments and implementations of token 40, token 40 may unconditionally send the read identification information to validation entity 80 and/or gateway 90 without requiring a validation between the token and the user, such as may be provided by the entry of a PIN or the provision of a biometric sample (e.g., fingerprint); and that token 40 may send the read identification information in a relatively short amount of time (such as within one minute of being read, and typically within ten seconds).

It may be appreciated that Embodiments of the invention enable a user to obtain a 3-D secure datum and a dynamic device verification value for a portable consumer device 5, such as a credit card, which the user can provide to a 3-D secure system and a merchant site, respectively, for completing a purchase transaction. The dynamic device verification value reduces the potential for fraud by third parties that may fraudulently obtain the account number of the portable consumer device (e.g., through skimming). In addition, the interaction of the portable consumer device with the verification token 40 enables the token to effectively inform the validation entity 80 that the portable consumer device 5 was physically in the presence of the token at the time the request for the device verification value was made, thereby providing a "card present" status for online purchases made with the portable consumer device. Embodiments of the invention also have utility in providing device verification values to the user in a highly secure manner, thereby enhancing security and reducing fraudulent use of credit cards. Moreover, embodiments of the present invention provide these services and benefits to the user with a very high "ease of use" factor.

It should be understood that various embodiments of the present invention as described above can be implemented in the form of control logic using computer software in a modular or integrated manner. Based on the disclosure and teachings provided herein, a person of ordinary skill in the art will know and appreciate other ways and/or methods to implement embodiments of the present invention using hardware and a combination of hardware and software.

Any of the software components or functions described in this application, may be implemented as software code to be executed by a processor using any suitable computer language such as, for example, C, C++, C#, Java, C++ or Perl using, for example, conventional or object-oriented techniques. The software code may be stored as a series of instructions, or commands on a computer-readable medium, such as a random access memory (RAM), a read only memory (ROM), a magnetic medium such as a hard-drive or a floppy disk, or an optical medium such as a CD-ROM. Any such computer-readable medium may reside on or within a single computational apparatus, and may be present on or within different computational apparatuses within a system or network.

The above description is illustrative and is not restrictive. Many variations of the invention and embodiments thereof will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A method performed by a user device including a verification token component, the method comprising:

reading, by a card reader of the verification token component removably coupled to the user device, identification information from a payment card based on an interaction between the verification token component and the payment card;

transmitting the identification information to a validation entity, wherein the identification information is used to validate the payment card;

receiving, by the verification token component from the validation entity, a first secure datum when the payment card is validated;

displaying a communication frame received from a merchant server;

displaying an authentication page received on the communication frame;

modifying the authentication page by inserting, by the verification token component, the first secure datum into a posting field of the authentication page;

transmitting, to an access control server, the authentication page filled in with the first secure datum, wherein the access control server receives a second secure datum from the validation entity, and determines if the first secure datum matches the second secure datum; and transmitting, to the merchant server through the communication frame, an authentication response generated by the access control server in response to the authentication page, wherein the authentication response indicates whether the payment card was physically presented to the verification token component removably coupled to the user device.

2. The method of claim 1, wherein the first secure datum is different from a previous or subsequent first secure datum obtained with the verification token component.

3. The method of claim 1, wherein the communication frame on the user device is controlled by the merchant server to transmit the authentication page to the access control server.

4. The method of claim 1, wherein the first secure datum is received by the verification token component from the validation entity after the validation entity validates information received from the verification token component.

5. The method of claim 1, wherein the verification token component comprises a data processor and a computer readable medium comprising code, executable by the data processor, for causing the verification token component to read payment card identification information from the payment card, the payment card being used by a user of the user device.

6. The method of claim 1, wherein the access control server is configured to receive the authentication page filled in with the first secure datum, the authentication page having a user response disposed in a user response posting field, compare at least a portion of the user response to a stored user response to make a first determination of whether a match exists, compare the first secure datum to a stored secure datum to make a second determination of whether a match exists, and generate the authentication response based on at least the first and second determinations.

7. The method of claim 1, wherein the merchant server includes a merchant plug-in that validates a signature included in the authentication response.

8. The method of claim 1, further comprising:

receiving, by the user device from the merchant server, the communication frame via a first communication network.

9. The method of claim 1, wherein the identification information includes a PAN.

10. The method of claim 1, further comprising:

retrieving, by the verification token component, transaction or merchant information from the communication frame provided by the merchant server; and transmitting the transaction or merchant information along with a portion of the identification information to the validation entity.

11. A user device comprising:

a verification token component, a processor; and a computer readable medium comprising code, executable by the processor, to implement a method comprising:

reading, by a card reader of the verification token component coupled to the user device, identification information from a payment card based on an interaction between the verification token component and the;

transmitting the identification information to a validation entity, wherein the identification information is used to validate the payment card;

receiving, by the verification token component from the validation entity, a first secure datum when the payment card is validated;

displaying a communication frame received from a merchant server;

displaying an authentication page received on the communication frame;

modifying the authentication page by inserting, by the verification token component, the first secure datum into a posting field of the authentication page;

transmitting, to an access control server, the authentication page filled in with the first secure datum, wherein the access control server receives a second secure datum from the validation entity, and determines if the first secure datum matches the second secure datum; and transmitting, to the merchant server through the communication frame, an authentication response generated by the access control server in response to the authentication page, wherein the authentication response indicates whether the payment card was physically presented to the verification token component removably coupled to the verification token component.

12. The user device of claim 11, further comprising:

portable payment card, wherein the payment card is configured to generate a cryptogram using a value known to the verification token component and the validation entity.

13. The user device of claim 11, wherein the verification token component is physically incorporated in the user device.

14. The user device of claim 11, wherein the verification token component comprises a first indicator indicating that verification token component is ready to read the identification information from the payment card, and a second indicator indicating when the verification token component acquired the identification information from the payment card.

15. The user device of claim 11, wherein the verification token component comprises a magnetic stripe reader, a contact card reader or a contactless reader.

16. The user device of claim 11, wherein the verification token component comprises a peripheral interface adapted to communicatively couple to a peripheral interface of the user device.

17. A method comprising:

receiving, by a user device including a verification token component removably coupled to the user device, identification information from a payment card based on an interaction between a card reader if the verification token component and the payment card;

transmitting, by the user device, the identification information to a server computer, wherein the identification information is used to validate the payment card;

receiving, by the verification token component of the user device from the server computer, a secure datum if the payment card is validated;

receiving, by the user device, a payer authentication request message from a merchant associated with a transaction;

modifying, by the verification token component of the user device, a purchase authentication page by inserting the secure datum into a posting field of the purchase authentication page associated with the transaction;

transmitting, by the user device, the purchase authentication page to an access control server;

receiving, by the user device from the access control server, a payer authentication response from the access control server, wherein the payer authentication response is based at least in part on a comparison of the secure datum electronically sent in the purchase authentication page to secure datum stored at the access control server; and transmitting, by the user device, the payer authentication response to the merchant, wherein the merchant initiates an authorization exchange with an acquirer for the transaction based at least in part on the payer authentication response.

18. The method of claim 17, wherein the user device comprises a personal computer in operative communication with the verification token component coupled to the personal computer.

19. The method of claim 17, wherein the interaction with the payment card comprises near-field communication.

20. The method of claim 17, further comprising:

receiving a dynamic verification value; and sending the dynamic verification value to the merchant, wherein the dynamic verification value is included in an authorization request message by the merchant for the transaction.

\* \* \* \* \*